(12) United States Patent
Ishii et al.

(10) Patent No.: US 10,354,152 B2
(45) Date of Patent: Jul. 16, 2019

(54) DRIVING ASSISTANCE SYSTEMS AND METHODS

(71) Applicant: Panasonic Intellectual Property Corporation of America, Torrance, CA (US)

(72) Inventors: Yasunori Ishii, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 75 days.

(21) Appl. No.: 15/834,777

(22) Filed: Dec. 7, 2017

(65) Prior Publication Data
US 2018/0181824 A1 Jun. 28, 2018

(30) Foreign Application Priority Data

Dec. 27, 2016 (JP) .................................. 2016-254515
Aug. 8, 2017 (JP) .................................. 2017-153627

(51) Int. Cl.
*G06K 9/00* (2006.01)
*G06K 9/42* (2006.01)
(Continued)

(52) U.S. Cl.
CPC ..... *G06K 9/00805* (2013.01); *G06K 9/00798* (2013.01); *G06K 9/42* (2013.01);
(Continued)

(58) Field of Classification Search
CPC .. B60W 2420/42; B60W 50/14; G08G 1/166; G08G 1/09623; G08G 1/167; G05D 2201/0213; G06T 7/70
See application file for complete search history.

(56) References Cited

U.S. PATENT DOCUMENTS

2011/0260888 A1\* 10/2011 Fossier ..................... G09F 9/33
340/933
2011/0267203 A1\* 11/2011 Lee ......................... G08G 1/164
340/928
(Continued)

FOREIGN PATENT DOCUMENTS

JP 2007-193577 8/2007
JP 2009-116527 A 5/2009

OTHER PUBLICATIONS

Kojima, Kazuhiro, et al. "NaviView: visual assistance by virtual mirrors at blind intersection." Proceedings. 2005 IEEE Intelligent Transportation Systems, 2005.. IEEE, 2005. (Year: 2005).*
(Continued)

*Primary Examiner* — Li Liu
(74) *Attorney, Agent, or Firm* — Greenblum & Bernstein, P.L.C.

(57) ABSTRACT

An information processing apparatus capable of assisting safe driving of a vehicle at a place such as an intersection where the view from the vehicle is obstructed or restricted is provided. A detection processing unit detects a traffic mirror in an image and an object in the traffic mirror on the basis of image information representing an image captured by an image capturing apparatus mounted in a vehicle. And a calculating unit calculates a difference between a size of the detected traffic mirror and a reference size and calculates a size of the object by using the calculated difference. Driving assist information for the vehicle is generated on the basis of the calculated size of the object, and the generated driving assist information is output.

18 Claims, 42 Drawing Sheets

(51) Int. Cl.
*G08G 1/0968* (2006.01)
*G08G 1/04* (2006.01)
*G08G 1/16* (2006.01)
*G08G 1/01* (2006.01)
*G08G 1/0962* (2006.01)
*G06K 9/62* (2006.01)
*G06T 3/40* (2006.01)

(52) U.S. Cl.
CPC ......... *G08G 1/0112* (2013.01); *G08G 1/0116* (2013.01); *G08G 1/04* (2013.01); *G08G 1/0968* (2013.01); *G08G 1/09623* (2013.01); *G08G 1/166* (2013.01); *B60R 2300/00* (2013.01); *B60R 2300/60* (2013.01); *B60R 2300/80* (2013.01); *B60R 2300/8033* (2013.01); *G06K 9/6269* (2013.01); *G06T 3/40* (2013.01)

(56) References Cited

U.S. PATENT DOCUMENTS

2016/0179093 A1\* 6/2016 Prokhorov ............ B60W 40/00
701/2
2018/0018878 A1\* 1/2018 Kitano .................... B60R 21/00

OTHER PUBLICATIONS

The Extended European Search Report from the European Patent Office (EPO) dated May 11, 2018 for the related European Patent Application No. 17202039.8.

\* cited by examiner

| CHANGE IN SIZE | SIGNIFICANCE OF POTENTIAL HAZARD | VEHICLE CONTROL INFORMATION |
|---|---|---|
| DECREASE (MOVES AWAY) | LOW | NO CHANGE |
| NO CHANGE (STATIONARY) | LOW | NO CHANGE |
| GRADUALLY INCREASE | INTERMEDIATE | DECELERATE |
| SUDDENLY INCREASE | HIGH | DECELERATE+RECOGNIZE POSITION OF TARGET AND MOVE IN DIRECTION TO BE AWAY FROM TARGET |

| CHANGE IN SIZE PER PERIOD | SIGNIFICANCE OF POTENTIAL HAZARD | VEHICLE CONTROL INFORMATION |
|---|---|---|
| DECREASE (MOVES AWAY) | LOW | TEMPORARILY STOP AND THEN START TRAVELING |
| NO CHANGE (STATIONARY) | LOW | TEMPORARILY STOP AND THEN START TRAVELING |
| INCREASE | HIGH | TEMPORARILY STOP AND THEN START TRAVELING AFTER CONFIRMING PASSAGE OF TARGET WITH SENSOR |

FIG. 20

| CHANGE IN SIZE | SIGNIFICANCE OF POTENTIAL HAZARD | | |
|---|---|---|---|
| | PERSON | BICYCLE | MOTOR CYCLE/ AUTOMOBILE |
| DECREASE (MOVES AWAY) | LOW | INTERMEDIATE | HIGH |
| NO CHANGE (STATIONARY) | LOW | INTERMEDIATE | HIGH |
| GRADUALLY INCREASE | INTERMEDIATE | HIGH | HIGH |
| SUDDENLY INCREASE | HIGH | HIGH | HIGH |

FIG. 21

| CHANGE IN SIZE PER PERIOD | SIGNIFICANCE OF POTENTIAL HAZARD | | |
|---|---|---|---|
| | PERSON | BICYCLE | MOTOR CYCLE/ AUTOMOBILE |
| DECREASE (MOVES AWAY) | LOW | INTERMEDIATE | HIGH |
| NO CHANGE (STATIONARY) | LOW | INTERMEDIATE | HIGH |
| INCREASE | HIGH | HIGH | HIGH |

FIG. 22

| CHANGE IN SIZE | SIGNIFICANCE OF POTENTIAL HAZARD | |
|---|---|---|
| | PERSON (CHILD/ELDERLY PERSON) | PERSON (OTHERS) |
| DECREASE (MOVES AWAY) | LOW | INTERMEDIATE |
| NO CHANGE (STATIONARY) | LOW | INTERMEDIATE |
| GRADUALLY INCREASE | INTERMEDIATE | HIGH |
| SUDDENLY INCREASE | HIGH | HIGH |

FIG. 23

| CHANGE IN SIZE PER PERIOD | SIGNIFICANCE OF POTENTIAL HAZARD | |
|---|---|---|
| | PERSON (CHILD/ELDERLY PERSON) | PERSON (OTHERS) |
| DECREASE (MOVES AWAY) | LOW | INTERMEDIATE |
| NO CHANGE (STATIONARY) | LOW | INTERMEDIATE |
| INCREASE | HIGH | HIGH |

FIG. 24

| CHANGE IN SIZE | SIGNIFICANCE OF POTENTIAL HAZARD | |
|---|---|---|
| | PERSON (BEHAVING NOT CARELESSLY) | PERSON (BEHAVING CARELESSLY) |
| DECREASE (MOVES AWAY) | LOW | HIGH |
| NO CHANGE (STATIONARY) | LOW | HIGH |
| GRADUALLY INCREASE | INTERMEDIATE | HIGH |
| SUDDENLY INCREASE | HIGH | HIGH |

FIG. 25

| CHANGE IN SIZE PER PERIOD | SIGNIFICANCE OF POTENTIAL HAZARD | |
|---|---|---|
| | PERSON (BEHAVING NOT CARELESSLY) | PERSON (BEHAVING CARELESSLY) |
| DECREASE (MOVES AWAY) | LOW | HIGH |
| NO CHANGE (STATIONARY) | LOW | HIGH |
| INCREASE | HIGH | HIGH |

FIG. 32
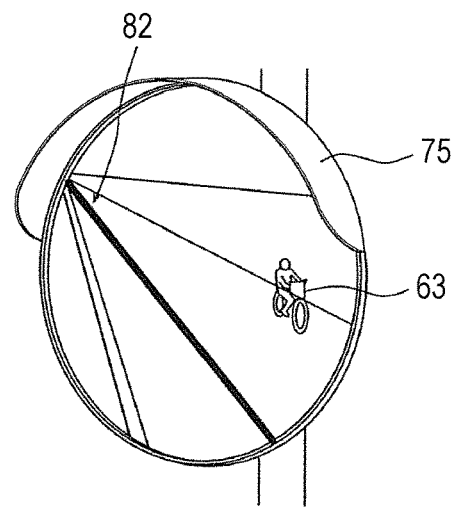
FIG. 33
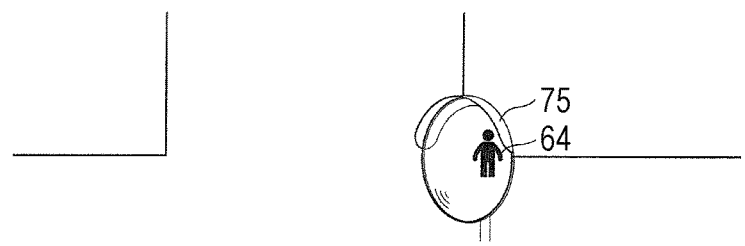
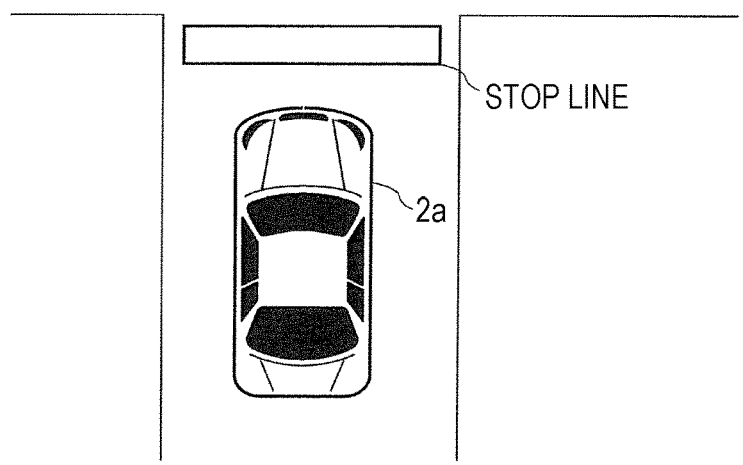

FIG. 35
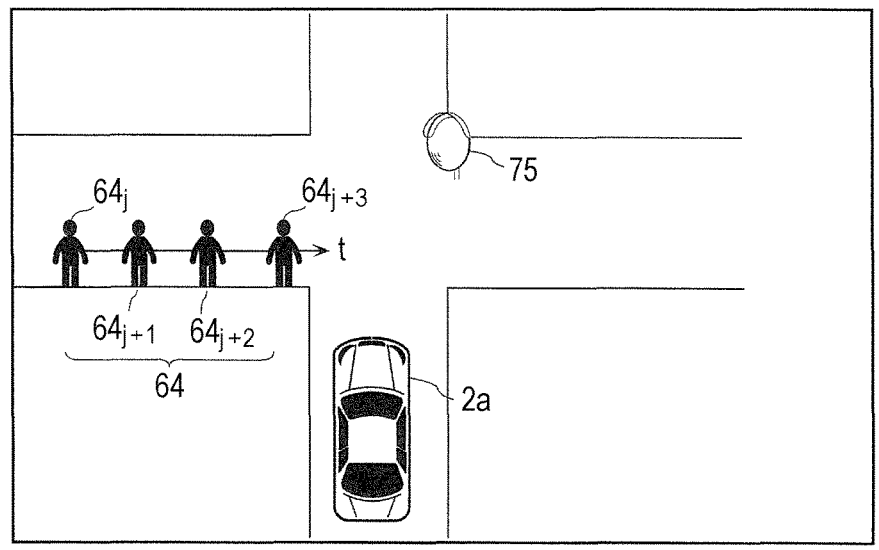
FIG. 36
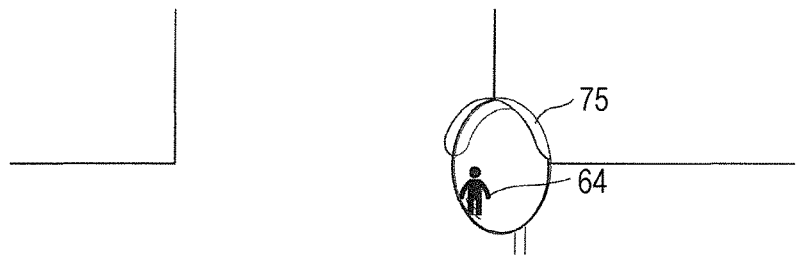
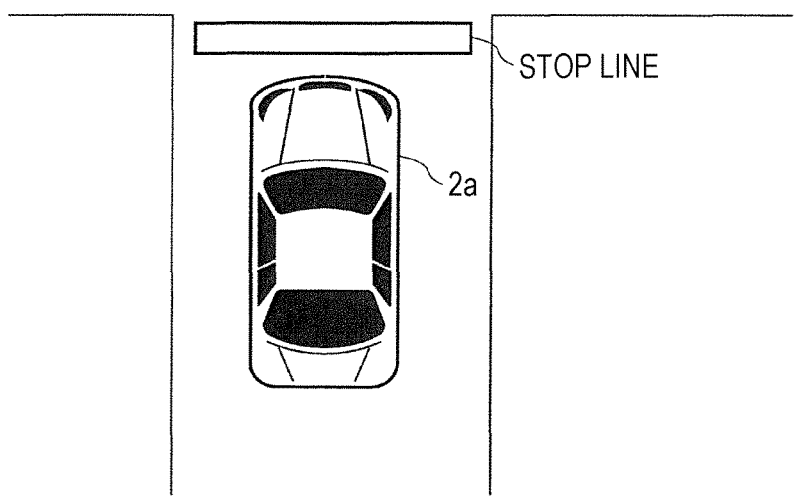

FIG. 40

| POSITION IN TRAFFIC MIRROR | CHANGE IN SIZE PER PERIOD | SIGNIFICANCE OF POTENTIAL HAZARD | VEHICLE CONTROL INFORMATION |
|---|---|---|---|
| PROXIMAL SIDE | DECREASE | LOW | TEMPORARILY STOP AND THEN START TRAVELING |
| PROXIMAL SIDE | NO CHANGE | LOW | TEMPORARILY STOP AND THEN START TRAVELING |
| PROXIMAL SIDE | INCREASE | INTERMEDIATE | TEMPORARILY STOP AND THEN START TRAVELING SLOWLY |
| DISTAL SIDE | DECREASE | LOW | TEMPORARILY STOP AND THEN START TRAVELING |
| DISTAL SIDE | NO CHANGE | LOW | TEMPORARILY STOP AND THEN START TRAVELING |
| DISTAL SIDE | INCREASE | HIGH | TEMPORARILY STOP AND THEN START TRAVELING AFTER CONFIRMING PASSAGE OF TARGET WITH SENSOR (START TRAVELING IN CASE OF TIMEOUT) |

FIG. 43

| POSITION IN TRAFFIC MIRROR | CHANGE IN SIZE PER PERIOD | SIGNIFICANCE OF POTENTIAL HAZARD | | |
|---|---|---|---|---|
| | | PERSON | BICYCLE | MOTOR CYCLE/ AUTOMOBILE |
| PROXIMAL SIDE | DECREASE | LOW | INTERMEDIATE | HIGH |
| PROXIMAL SIDE | NO CHANGE | LOW | INTERMEDIATE | HIGH |
| PROXIMAL SIDE | INCREASE | INTERMEDIATE | HIGH | HIGH |
| DISTAL SIDE | DECREASE | LOW | INTERMEDIATE | HIGH |
| DISTAL SIDE | NO CHANGE | LOW | INTERMEDIATE | HIGH |
| DISTAL SIDE | INCREASE | HIGH | HIGH | HIGH |

FIG. 44

| POSITION IN TRAFFIC MIRROR | CHANGE IN SIZE PER PERIOD | SIGNIFICANCE OF POTENTIAL HAZARD | |
|---|---|---|---|
| | | PERSON (CHILD/ELDERLY PERSON) | PERSON (OTHERS) |
| PROXIMAL SIDE | DECREASE | LOW | INTERMEDIATE |
| PROXIMAL SIDE | NO CHANGE | LOW | INTERMEDIATE |
| PROXIMAL SIDE | INCREASE | INTERMEDIATE | HIGH |
| DISTAL SIDE | DECREASE | LOW | INTERMEDIATE |
| DISTAL SIDE | NO CHANGE | LOW | INTERMEDIATE |
| DISTAL SIDE | INCREASE | HIGH | HIGH |

| POSITION IN TRAFFIC MIRROR | CHANGE IN SIZE PER PERIOD | SIGNIFICANCE OF POTENTIAL HAZARD | |
|---|---|---|---|
| | | PERSON (BEHAVING NOT CARELESSLY) | PERSON (BEHAVING CARELESSLY) |
| PROXIMAL SIDE | DECREASE | LOW | HIGH |
| PROXIMAL SIDE | NO CHANGE | LOW | HIGH |
| PROXIMAL SIDE | INCREASE | INTERMEDIATE | HIGH |
| DISTAL SIDE | DECREASE | LOW | HIGH |
| DISTAL SIDE | NO CHANGE | LOW | HIGH |
| DISTAL SIDE | INCREASE | HIGH | HIGH |

FIG. 56

| INSTALLED PLACE OF TRAFFIC MIRROR | OBJECT REFLECTED IN TRAFFIC MIRROR | SECOND SIGNIFICANCE OF POTENTIAL HAZARD | VEHICLE CONTROL INFORMATION |
|---|---|---|---|
| FIRST SIGNIFICANCE OF POTENTIAL HAZARD: HIGH | PRESENT | HIGH | DECELERATE + RECOGNIZE POSITION OF TARGET AND MOVE IN DIRECTION TO BE AWAY FROM TARGET |
| FIRST SIGNIFICANCE OF POTENTIAL HAZARD: HIGH | ABSENT | INTERMEDIATE | DECELERATE |
| FIRST SIGNIFICANCE OF POTENTIAL HAZARD: INTERMEDIATE | PRESENT | INTERMEDIATE | DECELERATE |
| FIRST SIGNIFICANCE OF POTENTIAL HAZARD: INTERMEDIATE | ABSENT | LOW | NO CHANGE |
| FIRST SIGNIFICANCE OF POTENTIAL HAZARD: LOW | PRESENT | INTERMEDIATE | DECELERATE |
| FIRST SIGNIFICANCE OF POTENTIAL HAZARD: LOW | ABSENT | LOW | NO CHANGE |

FIG. 57

| INSTALLED PLACE OF TRAFFIC MIRROR | OBJECT REFLECTED IN TRAFFIC MIRROR | SECOND SIGNIFICANCE OF POTENTIAL HAZARD | VEHICLE CONTROL INFORMATION |
|---|---|---|---|
| FIRST SIGNIFICANCE OF POTENTIAL HAZARD: HIGH | PRESENT | HIGH | TEMPORARILY STOP AND THEN START TRAVELING AFTER CONFIRMING PASSAGE OF TARGET WITH SENSOR |
| FIRST SIGNIFICANCE OF POTENTIAL HAZARD: HIGH | ABSENT | INTERMEDIATE | TEMPORARILY STOP AND THEN START TRAVELING |
| FIRST SIGNIFICANCE OF POTENTIAL HAZARD: INTERMEDIATE | PRESENT | INTERMEDIATE | TEMPORARILY STOP AND THEN START TRAVELING |
| FIRST SIGNIFICANCE OF POTENTIAL HAZARD: INTERMEDIATE | ABSENT | LOW | NO CHANGE |
| FIRST SIGNIFICANCE OF POTENTIAL HAZARD: LOW | PRESENT | INTERMEDIATE | TEMPORARILY STOP AND THEN START TRAVELING |
| FIRST SIGNIFICANCE OF POTENTIAL HAZARD: LOW | ABSENT | LOW | NO CHANGE |

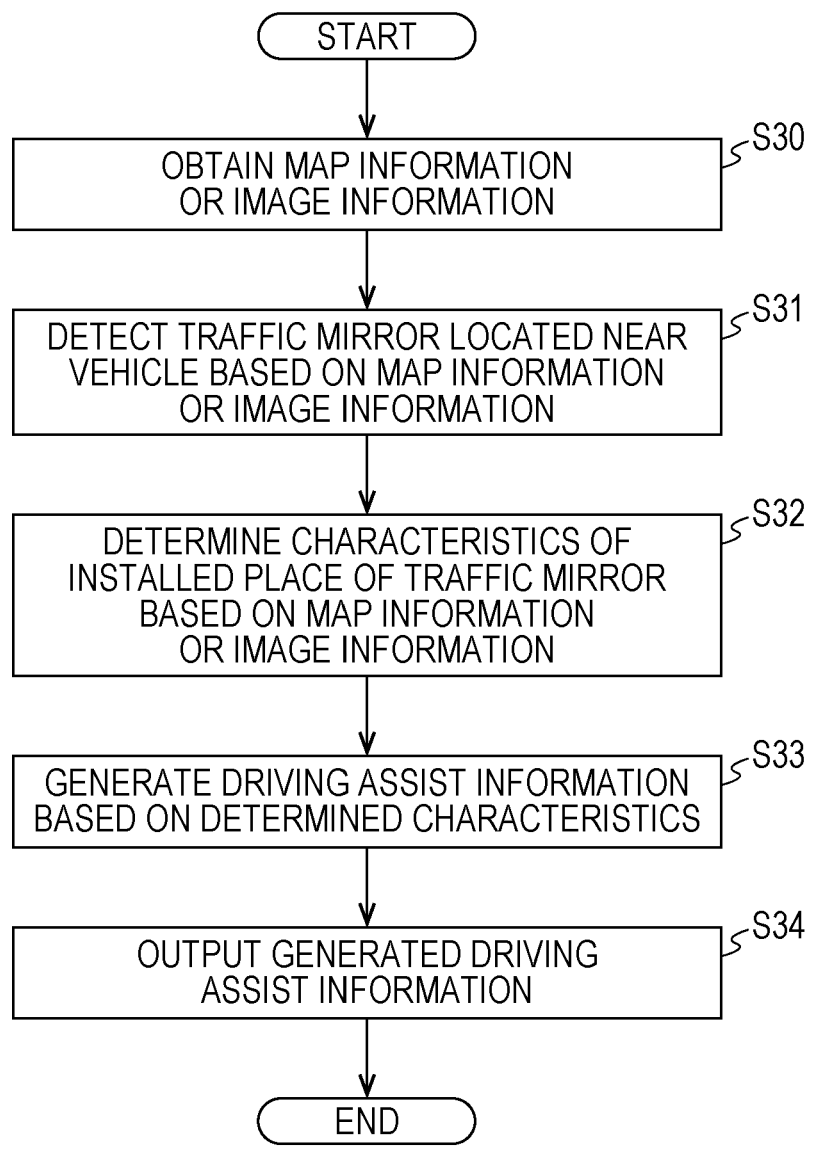

FIG. 60

| INSTALLED PLACE OF TRAFFIC MIRROR | OBJECT REFLECTED IN TRAFFIC MIRROR | SECOND SIGNIFICANCE OF POTENTIAL HAZARD | | |
|---|---|---|---|---|
| | | PERSON | BICYCLE | MOTOR CYCLE/ AUTOMOBILE |
| FIRST SIGNIFICANCE OF POTENTIAL HAZARD: HIGH | PRESENT | HIGH | HIGH | HIGH |
| FIRST SIGNIFICANCE OF POTENTIAL HAZARD: HIGH | ABSENT | INTERMEDIATE | HIGH | HIGH |
| FIRST SIGNIFICANCE OF POTENTIAL HAZARD: INTERMEDIATE | PRESENT | INTERMEDIATE | HIGH | HIGH |
| FIRST SIGNIFICANCE OF POTENTIAL HAZARD: INTERMEDIATE | ABSENT | LOW | INTERMEDIATE | HIGH |
| FIRST SIGNIFICANCE OF POTENTIAL HAZARD: LOW | PRESENT | INTERMEDIATE | HIGH | HIGH |
| FIRST SIGNIFICANCE OF POTENTIAL HAZARD: LOW | ABSENT | LOW | INTERMEDIATE | HIGH |

FIG. 61

| INSTALLED PLACE OF TRAFFIC MIRROR | OBJECT REFLECTED IN TRAFFIC MIRROR | SECOND SIGNIFICANCE OF POTENTIAL HAZARD | |
|---|---|---|---|
| | | PERSON (CHILD/ELDERLY PERSON) | PERSON (OTHERS) |
| FIRST SIGNIFICANCE OF POTENTIAL HAZARD: HIGH | PRESENT | HIGH | HIGH |
| FIRST SIGNIFICANCE OF POTENTIAL HAZARD: HIGH | ABSENT | INTERMEDIATE | HIGH |
| FIRST SIGNIFICANCE OF POTENTIAL HAZARD: INTERMEDIATE | PRESENT | INTERMEDIATE | HIGH |
| FIRST SIGNIFICANCE OF POTENTIAL HAZARD: INTERMEDIATE | ABSENT | LOW | INTERMEDIATE |
| FIRST SIGNIFICANCE OF POTENTIAL HAZARD: LOW | PRESENT | INTERMEDIATE | HIGH |
| FIRST SIGNIFICANCE OF POTENTIAL HAZARD: LOW | ABSENT | LOW | INTERMEDIATE |

FIG. 62

| INSTALLED PLACE OF TRAFFIC MIRROR | OBJECT REFLECTED IN TRAFFIC MIRROR | SECOND SIGNIFICANCE OF POTENTIAL HAZARD | |
|---|---|---|---|
| | | PERSON (BEHAVING NOT CARELESSLY) | PERSON (BEHAVING CARELESSLY) |
| FIRST SIGNIFICANCE OF POTENTIAL HAZARD: HIGH | PRESENT | HIGH | HIGH |
| FIRST SIGNIFICANCE OF POTENTIAL HAZARD: HIGH | ABSENT | INTERMEDIATE | HIGH |
| FIRST SIGNIFICANCE OF POTENTIAL HAZARD: INTERMEDIATE | PRESENT | INTERMEDIATE | HIGH |
| FIRST SIGNIFICANCE OF POTENTIAL HAZARD: INTERMEDIATE | ABSENT | LOW | HIGH |
| FIRST SIGNIFICANCE OF POTENTIAL HAZARD: LOW | PRESENT | INTERMEDIATE | HIGH |
| FIRST SIGNIFICANCE OF POTENTIAL HAZARD: LOW | ABSENT | LOW | HIGH |

DRIVING ASSISTANCE SYSTEMS AND METHODS

BACKGROUND

1. Technical Field

The present disclosure relates to an information processing apparatus, an information processing method, and a recording medium.

2. Description of the Related Art

At places such as intersections where the view from a driver of a vehicle is obstructed or restricted, traffic accidents such as minor and major collisions with another vehicle or a pedestrian, for example, are likely to occur. Therefore, there are expectations for the development of a technology for predicting a potential hazard that can result in traffic accidents at places such as intersections to successfully prevent the traffic accidents from occurring.

For example, Japanese Unexamined Patent Application Publication No. 2007-193577 discloses a technique that helps drivers drive vehicles more safely by using data recorded by driving recorders. According to Japanese Unexamined Patent Application Publication No. 2007-193577, a driving recorder records data representing a driving situation of a vehicle when an unusual event occurs. If it is predicted that the same driving situation as that indicated by the data recorded by the driving recorder is likely to occur, a warning is given to the driver. Since the technique can increase the safety in this way, the technique allows vehicles to travel more safely.

In such a method for predicting a potential hazard by directly using data recorded by driving recorders, however, it is sometimes difficult to record a sufficient amount of data indicating the driving situation of an unusual event because such an unusual event that can result in a "hiyari-hatto" (hazardous) situation occurs in a short period of time. Consequently, it is difficult to predict the occurrence of the same driving situation and, by extension, a potential hazard that can result in a traffic accident. In other words, with the technique according to the related art, it is difficult to predict a potential hazard that can result in a traffic accident and to provide driving assist such as controlling a vehicle or warning a driver. Since the recording conditions become worse, for example, the recordable area becomes narrower, especially at places where the view from the vehicle is obstructed or restricted, data recorded by driving recorders is apt to be insufficient.

SUMMARY

One non-limiting and exemplary embodiment provides an information processing apparatus and the like capable of assisting safe driving of vehicles at places such as intersections where the view from the vehicles is obstructed or restricted.

In one general aspect, the techniques disclosed here feature an apparatus including a processor and a memory storing thereon a computer program, which when executed by the processor, causes the processor to perform operations including: detecting, by using an image captured by an image capturing apparatus mounted in a vehicle, a traffic mirror in the image and an object in the traffic mirror; calculating a difference between a size of the traffic mirror and a reference size and calculating a size of the object by using the difference; generating driving assist information for the vehicle by using the size of the object; and outputting the driving assist information.

According to aspects of the present disclosure, an information processing apparatus and the like capable of assisting safe driving of vehicles at places such as intersections where the view from the vehicles is obstructed or restricted are successfully implemented.

It should be noted that general or specific embodiments may be implemented as a system, a method, an integrated circuit, a computer program, a computer-readable recording medium such as a Compact Disc-Read Only Memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 20 is an explanatory diagram illustrating an example of a hazard prediction process performed by the output processing unit in accordance with a first modification of the first embodiment;

FIG. 21 is an explanatory diagram illustrating an example of the hazard prediction process performed by the output processing unit in accordance with the first modification of the first embodiment;

FIG. 22 is an explanatory diagram illustrating an example of a hazard prediction process performed by the output processing unit in accordance with a second modification of the first embodiment;

FIG. 23 is an explanatory diagram illustrating an example of a hazard prediction process performed by the output processing unit in accordance with the second modification of the first embodiment;

FIG. 24 is an explanatory diagram illustrating an example of a hazard prediction process performed by the output processing unit in accordance with a third modification of the first embodiment;

FIG. 25 is an explanatory diagram illustrating an example of a hazard prediction process performed by the output processing unit in accordance with the third modification of the first embodiment;

FIG. 32 is a diagram illustrating an example of a position of an object in a traffic mirror in accordance with the second embodiment;

FIG. 33 is an explanatory diagram describing the significance of a potential hazard in the case where an object is located on the distal side in a traffic mirror in accordance with the second embodiment;

FIG. 35 is an explanatory diagram describing the significance of a potential hazard in the case where the object is located on the distal side in the traffic mirror in accordance with the second embodiment;

FIG. 36 is an explanatory diagram describing the significance of a potential hazard in the case where the object is located on the proximal side in the traffic mirror in accordance with the second embodiment;

FIG. 40 is an explanatory diagram illustrating another example of an output process performed by an output processing unit in accordance with the second embodiment;

FIG. 43 is an explanatory diagram illustrating an example of a hazard prediction process performed by the output processing unit in accordance with a first modification of the second embodiment;

FIG. 44 is an explanatory diagram illustrating an example of a hazard prediction process performed by the output processing unit in accordance with a second modification of the second embodiment;

FIG. 56 is an explanatory diagram illustrating an example of an output process performed by the output processing unit in accordance with the third embodiment;

FIG. 57 is an explanatory diagram illustrating an example of the output process performed by the output processing unit in accordance with the third embodiment;

FIG. 58 is a flowchart illustrating an outline of an information processing method performed by a system in accordance with the third embodiment;

FIG. 60 is an explanatory diagram illustrating an example of a second hazard significance determination process performed by a second hazard significance determining unit in accordance with a first modification of the third embodiment;

FIG. 61 is an explanatory diagram illustrating an example of the second hazard significance determination process performed by the second hazard significance determining unit in accordance with a second modification of the third embodiment; and FIG. 62 is an explanatory diagram illustrating an example of the second hazard significance determination process performed by the second hazard significance determining unit in accordance with a third modification of the third embodiment.

DETAILED DESCRIPTION

Figure 1:
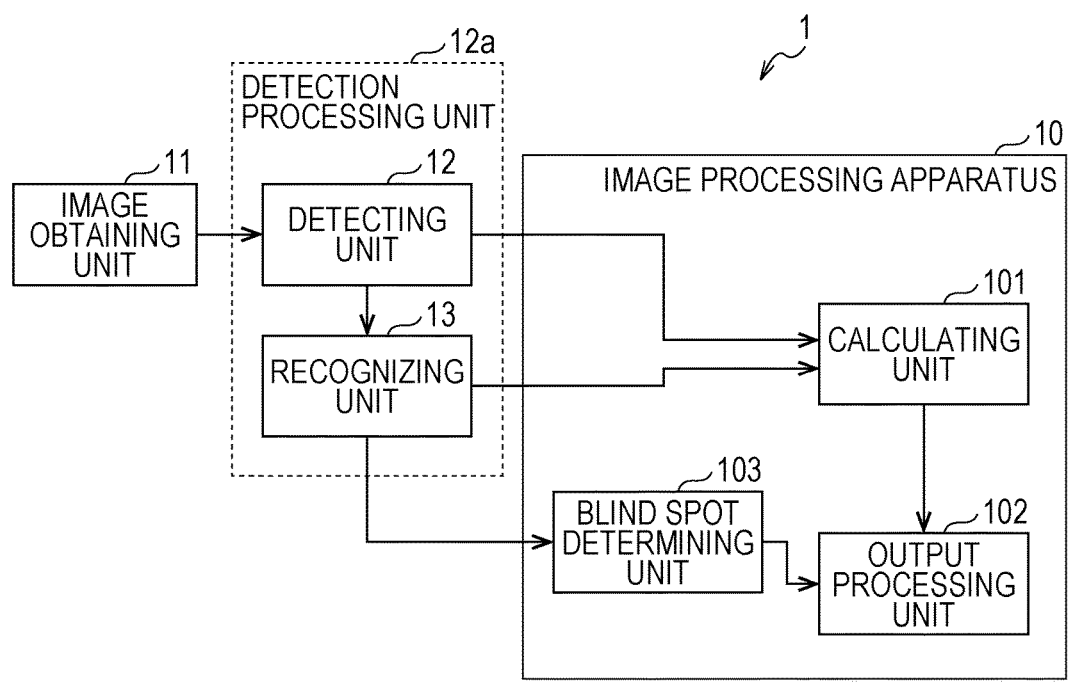
FIG. 1 is a block diagram illustrating an example of a configuration of a system in accordance with a first embodiment.

An apparatus according to an aspect of the present disclosure includes a processor and a memory storing thereon a computer program, which when executed by the processor, causes the processor to perform operations including detecting, by using an image captured by an image capturing apparatus mounted in a vehicle, a traffic mirror in the image and an object in the traffic mirror; calculating a difference between a size of the traffic mirror and a reference size and calculating a size of the object by using the difference; generating driving assist information for the vehicle by using the size of the object; and outputting the driving assist information.

With such a configuration, driving assist information for a vehicle is successfully output by using a traffic mirror at places such as intersections where the view from the vehicle is obstructed or restricted. Thus, the apparatus can assist safe driving of the vehicle.

For example, the difference may include a scaling ratio of the traffic mirror relative to the reference size In addition, for example, the size of the object may be calculated by enlarging or reducing the object in the traffic mirror by using the scaling ratio.

In addition, for example, the driving assist information may be generated in accordance with change information regarding a change in the size of the object in at least two consecutive time-series images.

In addition, for example, if the change information indicates an increase in the size of the object, the driving assist information may include at least one of information for causing the vehicle to decelerate and information for causing the vehicle to move in a direction to be away from the object.

With such a configuration, the safety of an object and a vehicle that are approaching an intersection can be guaranteed.

In addition, for example, if the change information indicates an increase in the size of the object, the driving assist information may include information for causing the vehicle to start traveling after the object moves away from the vehicle.

With such a configuration, the safety of an object and a vehicle that are approaching an intersection can be guaranteed.

In addition, for example, in the generating, the driving assist information for the vehicle may be generated by using a state of the vehicle in addition to the size of the object.

With such a configuration, appropriate control can be performed in accordance with a state (such as a traveling state or a stationary state) of a vehicle.

In addition, for example, the driving assist information may be generated in accordance with a potential hazard predicted, from the change information, if the vehicle travels in a direction to be closer to the traffic mirror.

In addition, for example, the driving assist information may be generated in accordance with the size of the object.

With such a configuration, a potential hazard can be predicted without performing processing using change information regarding a change in size.

In addition, for example, the driving assist information may include control command information regarding a behavior of the vehicle.

In addition, for example, the driving assist information may include indication information to be provided to an occupant of the vehicle.

In addition, for example, the operations may further include recognizing an attribute of the object reflected in the traffic mirror, and in the generating, the driving assist information may be generated in accordance with the attribute of the object.

In addition, for example, in the outputting, if the attribute of the object indicates a person, the driving assist information that changes depending on information regarding an age of the object may be output.

In addition, for example, in the generating, if the attribute of the object indicates a person, the driving assist information may be generated depending on whether the object is behaving carelessly.

In addition, for example, in the generating, the driving assist information may be generated if the object detected in at least one image among a plurality of consecutive time-series images is not detected in an image subsequent to the at least one image in time series.

In addition, for example, in the generating, the driving assist information may be generated if the object is detected in different sizes in at least two consecutive time-series images among the plurality of consecutive time-series images and the object is not detected in an image subsequent to the at least two consecutive time-series images in time series.

A method according to an aspect of the present disclosure includes detecting, by using an image captured by an image capturing apparatus mounted in a vehicle, a traffic mirror in the image and an object in the traffic mirror; calculating a difference between a size of the traffic mirror and a reference size and calculating a size of the object by using the difference; generating driving assist information for the vehicle by using the size of the object; and outputting the driving assist information.

A non-transitory recording medium, according to an aspect of the present disclosure, stores thereon a computer program, which when executed by a processor, causes the process to perform operations including detecting, by using an image captured by an image capturing apparatus mounted in a vehicle, a traffic mirror in the image and an object in the traffic mirror; calculating a difference between a size of the traffic mirror and a reference size and calculating a size of the object by using the difference; generating driving assist information for the vehicle by using the size of the object; and outputting the driving assist information.

Embodiments of the present disclosure will be described below with reference to the accompanying drawings.

Each embodiment described below merely provides a specific example of the present disclosure. The values, shapes, components, steps, the order of steps, etc., described in the following embodiments are merely illustrative and are not intended to limit the present disclosure. Among the components in the following embodiments, a component not recited in any of the independent claims indicating the most generic concept is described as an optional component. In addition, a configuration of each embodiment may be combined with configuration(s) of other embodiments.

First Embodiment

Configuration of System 1

FIG. 1 is a block diagram illustrating an example of a configuration of a system 1 in accordance with a first embodiment.

The system 1 illustrated in FIG. 1 is mounted in a vehicle, for example, an automobile and outputs driving assist information for the vehicle. The system 1 includes an information processing apparatus 10, an image obtaining unit 11, and a detection processing unit 12a. Details of configurations of these components will be described below. Note that the configuration of the system 1 is not limited to the one illustrated in FIG. 1, and the image obtaining unit 11 and the detection processing unit 12a may be included in the information processing apparatus 10.

Traffic mirrors are often installed at places where the view from the vehicle is obstructed or restricted. For example, traffic mirrors are convex mirrors that are installed, as safety confirmation aids, on the road so that drivers can see the scenery that is directly invisible to the drivers at intersections where the view from the vehicle is obstructed or restricted or blind corners where the view ahead is difficult to see. The information processing apparatus 10 assists safer driving of the vehicle by using traffic mirrors. Note that traffic mirrors used in the following description include circular or quadrangular physical mirrors. Traffic mirrors may include circular or quadrangular electronic mirrors that display an image of the directly invisible scenery.

Image Obtaining Unit 11

Figure 2:
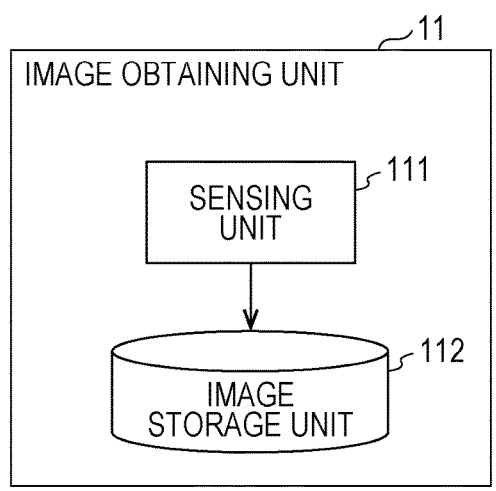
FIG. 2 is a diagram illustrating an example of a functional configuration of an image obtaining unit in accordance with the first embodiment.
Figure 3:
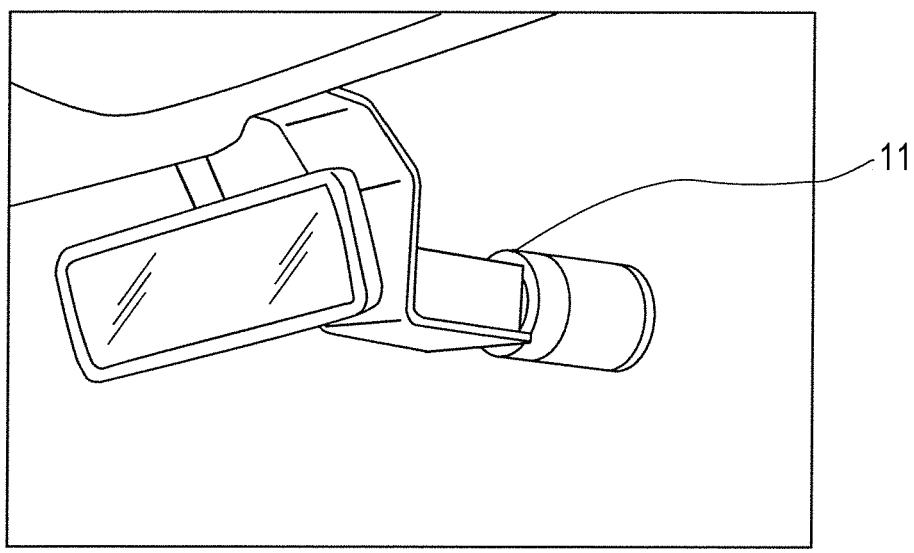
FIG. 3 is a diagram illustrating an example of how the image obtaining unit is mounted in a vehicle in accordance with the first embodiment.
Figure 4:
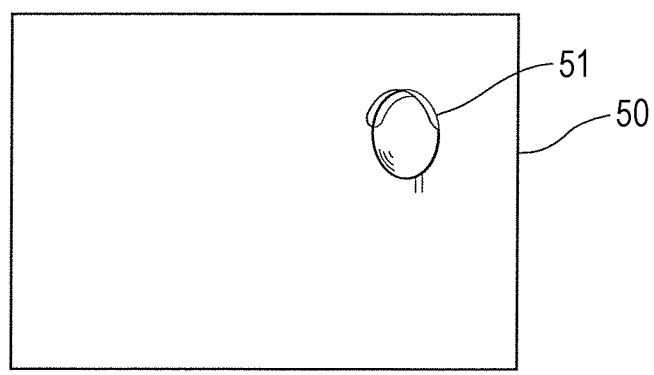
FIG. 4 is an explanatory diagram of an example of an image obtained by the image obtaining unit in accordance with the first embodiment.

FIG. 2 is a diagram illustrating an example of a functional configuration of the image obtaining unit 11 according to the first embodiment. FIG. 3 is a diagram illustrating an example of how the image obtaining unit 11 is mounted in a vehicle in accordance with the first embodiment. FIG. 4 is an explanatory diagram of an example of an image obtained by the image obtaining unit 11 in accordance with the first embodiment.

The image obtaining unit 11 obtains image information representing an image captured by an image capturing apparatus mounted in the vehicle. In the first embodiment, the image obtaining unit 11 includes a sensing unit 111 and an image storage unit 112 as illustrated in FIG. 2. The image obtaining unit 11 is, for example, an on-board camera as illustrated in FIG. 3 and is mounted in a vehicle.

The sensing unit 111 captures consecutive time-series images of the scenery ahead of the traveling vehicle and stores the images in the image storage unit 112. In the first embodiment, the sensing unit 111 is a video image recording apparatus, such as a camera. The sensing unit 111 may include a visible-light camera that captures images based on visible light and an indium gallium arsenide (InGaAs) camera that captures images based on infrared radiation. In this case, the sensing unit 111 may capture images based on visible light at daytime and capture images based on infrared radiation at nighttime.

The image storage unit 112 includes a hard disk drive (HDD) or a memory, for example. The image storage unit 112 stores images captured by the sensing unit 111.

A case where an image of the scenery ahead of the traveling vehicle that is captured by the sensing unit 111 at a place such as an intersection where the view from the vehicle is obstructed or limited contains an image of a traffic mirror 51 as in an image 50 illustrated in FIG. 4, for example, will be described as an example.

Detection Processing Unit 12a

The detection processing unit 12a detects, on the basis of image information representing an image captured by the image capturing apparatus mounted in the vehicle, a traffic mirror contained in the image and an object reflected in the traffic mirror. The detection processing unit 12a may further recognize an attribute of the object reflected in the traffic mirror. In the first embodiment, the detection processing unit 12a includes a detecting unit 12 and a recognizing unit 13.

Detecting Unit 12

On the basis of image information representing an image captured by the image capturing apparatus mounted in the vehicle, the detecting unit 12 detects a traffic mirror contained in the image. More specifically, the detecting unit 12 detects a traffic mirror contained in an image that is obtained as a result of continuously capturing images of the scenery ahead of the traveling vehicle in time series. Note that the scenery subjected to image capturing may be other than the scenery ahead of the vehicle. For example, when the vehicle travels backward, the scenery subjected to image capturing may be the scenery behind the vehicle.

In the first embodiment, the detecting unit 12 detects the traffic mirror 51 contained in the image 50 illustrated in FIG. 4 obtained by the image obtaining unit 11, for example. Examples of a method for detecting a traffic mirror in an image include a method based on simple circle or quadrangle detection and a method based on statistical image recognition. The method for detecting a traffic mirror in an image will be described below with reference to the drawings.

Figure 5:
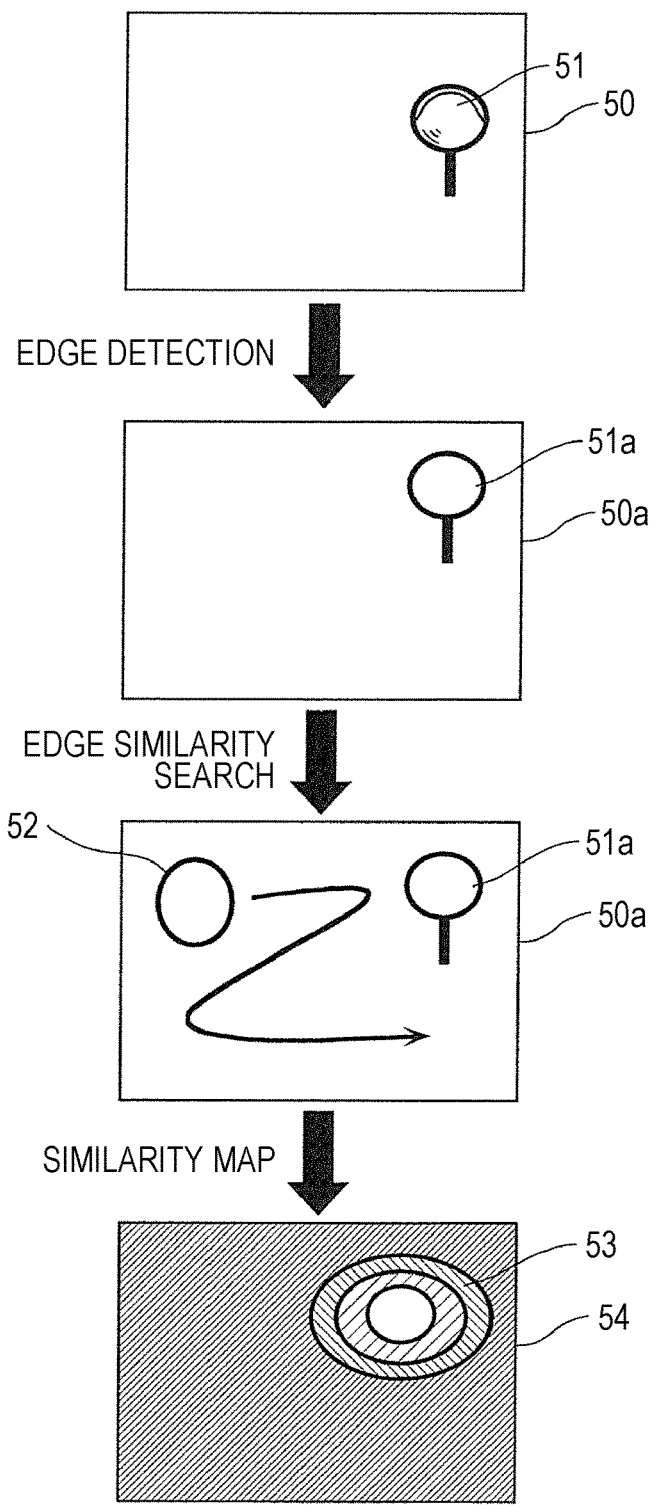
FIG. 5 is an explanatory diagram of traffic mirror detection based on simple circle or quadrangle detection.

FIG. 5 is an explanatory diagram of traffic mirror detection based on simple circle or quadrangle detection. Note that components that are the same or substantially the same as those illustrated in FIG. 4 are denoted by the same reference signs to omit a detailed description thereof.

The detecting unit 12 first performs edge detection on the image 50 obtained by the image obtaining unit 11 and illustrated in FIG. 5, for example. Consequently, the detecting unit 12 detects an edge 51a corresponding to the shape of a traffic mirror as indicated in an image 50a.

Then, the detecting unit 12 performs an edge similarity search in the image 50a in which the edge 51a has been detected. More specifically, the detecting unit 12 performs a scan using a filter (mirror shape filter 52) for detecting a shape such as a circle or a quadrangle in the image 50a to search for an edge that is similar to the mirror shape filter 52. Note that the mirror shape filter 52 is a filter for detecting the outline of a traffic mirror. For example, a Sobel filter or a Canny filter can be used as the mirror shape filter 52.

The detecting unit 12 then creates a similarity map 54, for example, and detects, as the traffic mirror 51, a circle at a position 53 having the high similarity in the similarity map 54.

If the position, in the similarity map, of the subject contained in the image obtained by the image obtaining unit 11 is known, a filter for detecting a shape such as a circle or a quadrangle may be selectively used on the basis of information regarding the shape of the traffic mirror that can be estimated from the position.

Figure 6:
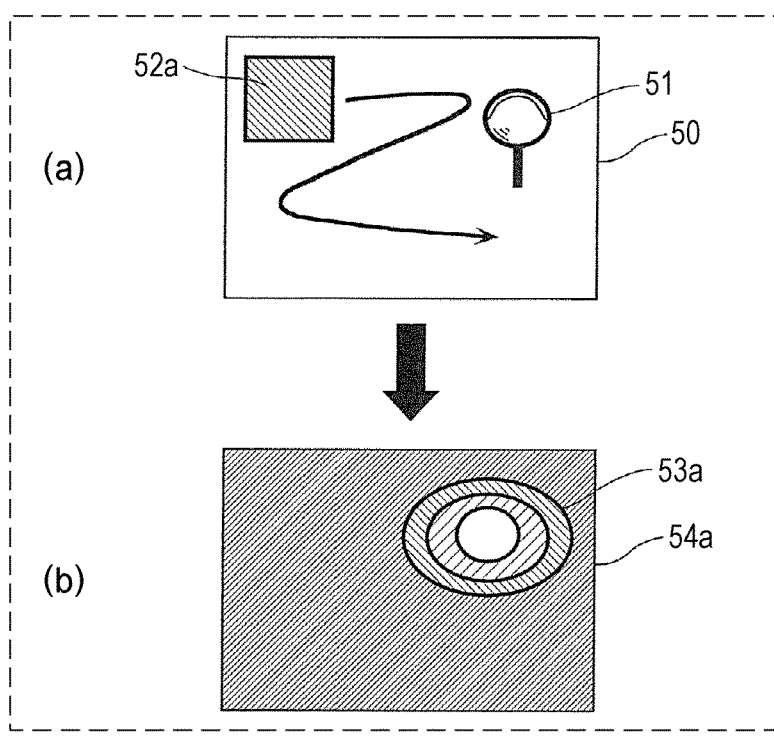
FIG. 6 is an explanatory diagram of traffic mirror detection based on statistical image recognition.

FIG. 6 is an explanatory diagram of traffic mirror detection based on statistical image recognition. Note that the components that are the same or substantially the same as those illustrated in FIG. 4 are denoted by the same reference signs to omit a detailed description thereof.

For example, the detecting unit 12 performs a scan using a matching area 52a containing circles of different sizes in the image 50 obtained by the image obtaining unit 11 and illustrated in FIG. 6(a), for example.

As a result, the detecting unit 12 creates a similarity map 54a representing, based on each position in the image 50 and the size of each circle at the position, a similarity with the circle as illustrated in FIG. 6(b).

Then, the detecting unit 12 detects, as the traffic mirror 51, a circle at a position 53a having the high similarity in the similarity map 54a.

Note that statistical image recognition is not limited to the case described with reference to FIG. 6. The detecting unit 12 may include a classifier (based on deep learning, support vector machine, or the like) that has performed learning by using numeral traffic-mirror images and non-traffic-mirror images. In this case, the detecting unit 12 may determine, at each position in the image 50, whether an image at the position is a traffic-mirror image by using this classifier to detect the traffic mirror 51.

Recognizing Unit 13

The recognizing unit 13 recognizes an object reflected in the traffic mirror on the basis of image information representing an image captured by the image capturing apparatus mounted in the vehicle. More specifically, the recognizing unit 13 recognizes an object reflected in the traffic mirror contained in the image obtained by the image obtaining unit 11. The recognizing unit 13 may recognize an attribute of the object reflected in the traffic mirror.

In the first embodiment, the recognizing unit 13 recognizes a position and a size of an object such as a person, a bicycle, or an automobile that moves (hereinafter, referred to as a moving object) in the traffic mirror detected by the detecting unit 12 in an image. Examples of a method for recognizing a moving object in a traffic mirror contained in an image include a method based on machine learning, such as deep learning, for example. A method for recognizing a moving object in a traffic mirror contained in an image will be described below with reference to FIG. 7.

Figure 7:
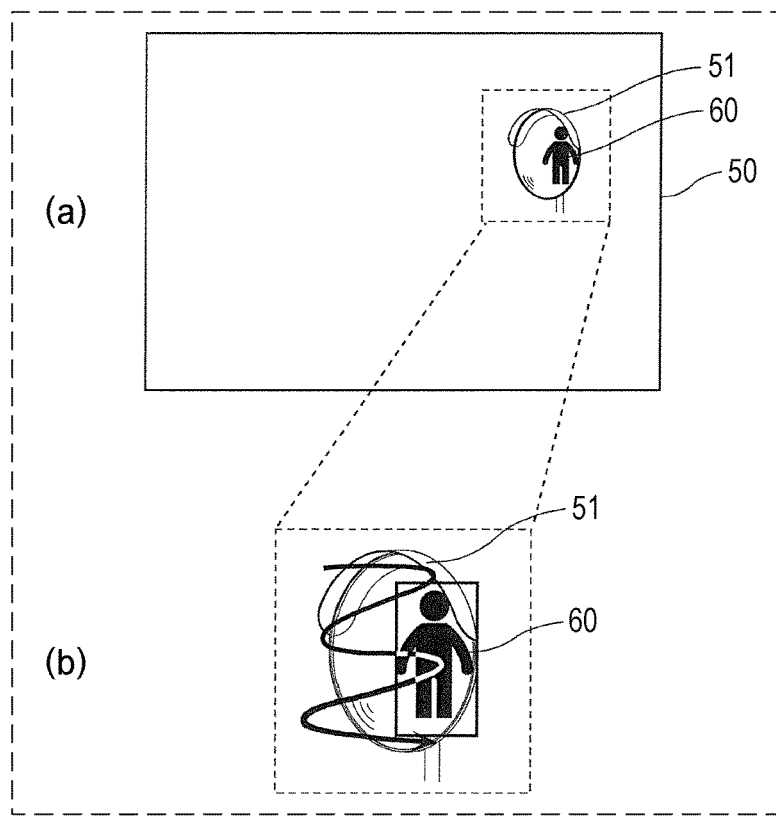
FIG. 7 is an explanatory diagram of a deep-learning-based recognition method of a moving object reflected in the traffic mirror.

FIG. 7 is an explanatory diagram of a deep-learning-based recognition method for recognizing a moving object reflected in a traffic mirror. FIGS. 7(a) and 7(b) illustrate an example case where a person 60 is reflected in the traffic mirror 51, that is, the person 60 is in the traffic mirror 51. Note that the components that are the same or substantially the same as those illustrated in FIG. 4 are denoted by the same reference signs to omit a detailed description thereof.

The recognizing unit 13 performs a recognition process to recognize the person 60 while changing the position and the size of the area of the traffic mirror 51 detected by the detecting unit 12 in the image 50 illustrated in FIG. 7(a), for example, in a manner as illustrated in FIG. 7(b), for example.

The recognizing unit 13 performs in advance learning for recognizing moving objects (i.e., a person, a bicycle, and an automobile) and other objects so that the recognizing unit 13 is able to perform the recognition process above. With such learning, the recognizing unit 13 successfully recognizes that a moving object is reflected in a traffic mirror if the reliability of an object recognized to be in the traffic mirror exceeds a threshold and the object has the largest size. In addition, upon recognizing that a moving object is reflected in a traffic mirror, the recognizing unit 13 outputs the position and the size of the moving object. The term "reliability" refers to a value indicating the likelihood of the recognition result being a shape or outline of a moving object such as a person, a bicycle, or an automobile. The recognizing unit 13 recognizes that no moving object is reflected in the traffic mirror if the reliability of the object recognized to be in the traffic mirror does not exceed the threshold.

Information Processing Apparatus 10

The information processing apparatus 10 according to the first embodiment will be described next.

The information processing apparatus 10 according to the first embodiment outputs driving assist information for the vehicle by using a traffic mirror. In the first embodiment, the information processing apparatus 10 includes a calculating unit 101, an output processing unit 102, and a blind spot determining unit 103 as illustrated in FIG. 1. Details of these components will be described below.

Calculating Unit 101

The calculating unit 101 calculates a difference between the size of the traffic mirror detected by the detection processing unit 12a and a reference size and calculates the size of the object by using the calculated difference. The difference includes a scaling ratio of the traffic mirror relative to the reference size. The size of the object is calculated by enlarging or reducing the object reflected in the traffic mirror in accordance with the difference.

Figure 8:
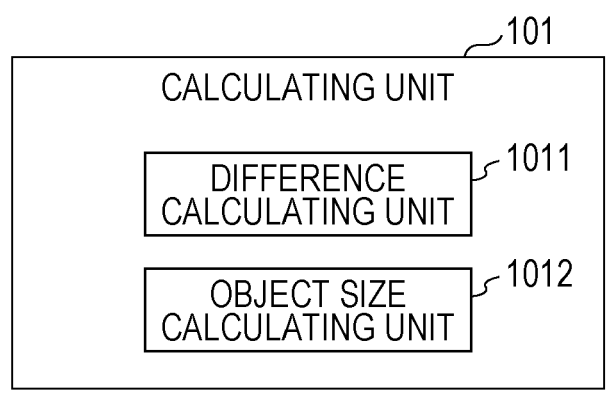
FIG. 8 is a diagram illustrating an example of a functional configuration of a calculating unit in accordance with the first embodiment.

FIG. 8 is a diagram illustrating an example of a functional configuration of the calculating unit 101 according to the first embodiment.

As illustrated in FIG. 8, the calculating unit 101 according to the first embodiment includes a difference calculating unit 1011 and an object size calculating unit 1012.

The difference calculating unit 1011 calculates a difference between the size of the traffic mirror detected by the detecting unit 12 and a reference size. More specifically, the difference calculating unit 1011 calculates a difference between the reference size and the size of the traffic mirror that is detected by the detecting unit 12 in an image obtained by continuously capturing images of the scenery ahead of a traveling vehicle in time series. In the first embodiment, the difference calculating unit 1011 calculates, for example, a scaling ratio of the size of the traffic mirror contained in the image obtained by image capturing relative to the reference size. The reference size is a size indicated by a height and a width of a predetermined traffic mirror.

Note that the reference size may be set to the largest size of the traffic mirror contained in a plurality of images captured in a predetermined period of time or the size of the traffic mirror contained in an image that is the immediately preceding frame of the frame of interest. In addition, the difference calculating unit 1011 may calculate, as the difference, an amount of change in size of the object, which is determined by enlarging or reducing the object reflected in the traffic mirror in accordance with the scaling ratio calculated from at least two consecutive time-series images.

In addition, the difference calculating unit 1011 may calculate the difference from a single image. Specifically, the reference size is a pre-stored value, and the difference calculating unit 1011 calculates the scaling ratio on the basis of the size of the traffic mirror contained in a single image and the stored reference size. Note that the reference size may be associated with a distance to the subject and may be corrected in accordance with a distance between the vehicle and the traffic mirror contained in the image.

The object size calculating unit 1012 calculates the size of an object by using the difference calculated by the difference calculating unit 1011. More specifically, the object size calculating unit 1012 calculates the size of the object by using the object reflected in the traffic mirror recognized by the recognizing unit 13 and the difference calculated by the difference calculating unit 1011. In the first embodiment, the object size calculating unit 1012 calculates the size of the object reflected in the traffic mirror by enlarging or reducing the object recognized by the recognizing unit 13 in accordance with the difference calculated by the difference calculating unit 1011.

An example of a calculation process performed by the calculating unit 101 thus configured is now described with reference to the accompanying drawing.

Figure 9:
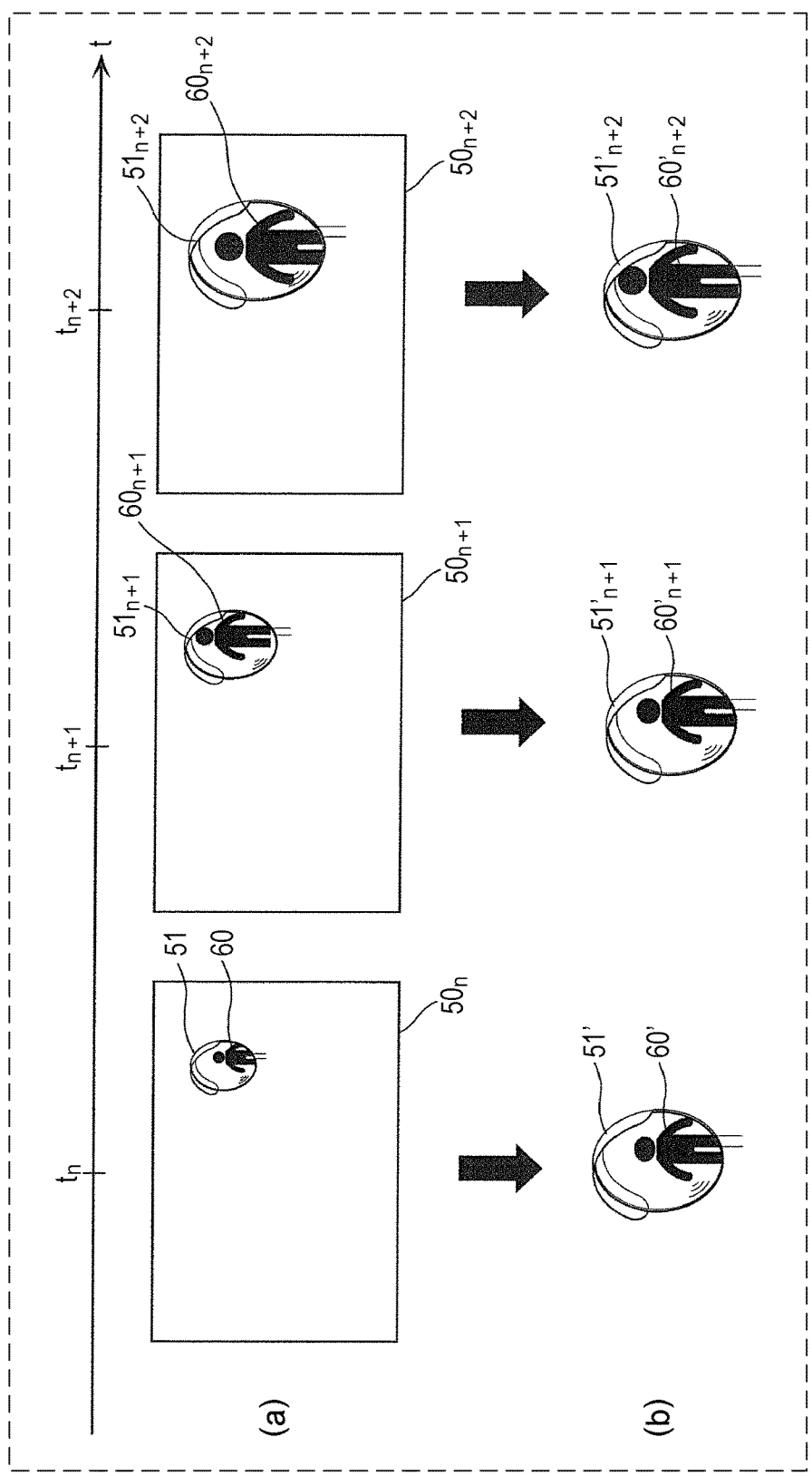
FIG. 9 is an explanatory diagram illustrating an example of a calculation process performed by the calculating unit in accordance with the first embodiment.

FIG. 9 is an explanatory diagram illustrating an example of the calculation process performed by the calculating unit 101 according to the first embodiment. Note that components that are the same or substantially the same as those illustrated in FIG. 4 are denoted by the same reference signs to omit a detailed description thereof.

Images $50_n$, $50_{n+1}$, and $50_{n+2}$ illustrated in FIG. 9(a) are consecutive time-series images of the scenery ahead of a traveling vehicle that are captured at time points $t_n$, $t_{n+1}$, and $t_{n+2}$, respectively. The images $50_n$, $50_{n+1}$, and $50_{n+2}$ respectively contain traffic mirrors 51, $51_{n+1}$, and $51_{n+2}$, and persons 60, $60_{n+1}$, and $60_{n+2}$ are reflected respectively in the traffic mirrors 51, $51_{n+1}$, and $51_{n+2}$. Sizes of the traffic mirrors 51, $51_{n+1}$, and $51_{n+2}$ are represented by the width and the height and are, for example, $(w_{1a}, h_{1a})$, $(w_{1b}, h_{1b})$, and $(w_{1c}, h_{1c})$, respectively. The detecting unit 12 detects the sizes of the traffic mirrors 51, $51_{n+1}$, and $51_{n+2}$. FIG. 9(b) illustrates traffic mirrors 51', $51'_{n+1}$, and $51'_{n+2}$, which are enlarged to the reference size.

In this case, the difference calculating unit 1011 of the calculating unit 101 calculates scaling ratios in the cases where the traffic mirrors 51, $51_{n+1}$, and $51_{n+2}$ contained in the images $50_n$, $50_{n+1}$, and $50_{n+2}$ are enlarged or reduced to the reference size, respectively. In the case where the reference size is set to $(w_s, h_s)$, for example, the difference calculating unit 1011 calculates scaling ratios to be $w_s/w_{1a}$, $w_s/w_{1b}$, and $w_s/w_{1c}$ when the traffic mirrors 51, $51_{n+1}$, and $51_{n+2}$ are enlarged or reduced to the reference size, respectively. Alternatively, the difference calculating unit 1011 may calculate the scaling ratios to be $h_s/h_{1a}$, $h_s/h_{1b}$, and $h_s/h_{1c}$.

Then, the calculating unit 101, specifically, the object size calculating unit 1012, calculates the sizes of persons 60', $60'_{n+1}$, and $60'_{n+2}$ in the case where the traffic mirrors 51, $51_{n+1}$, and $51_{n+2}$ and the persons 60, $60_{n+1}$, and $60_{n+2}$ are enlarged in accordance with the scaling ratios $w_s/w_{1a}$, $w_s/w_{1b}$, and $w_s/w_{1c}$ calculated by the difference calculating unit 1011 as illustrated in FIG. 9(b).

Blind Spot Determining Unit 103

In the case where an object that is detected (recognized) by the detection processing unit 12a in at least one image among a plurality of consecutive time-series images is not detected (recognized) by the detection processing unit 12a in an image subsequent to the at least one image, the blind spot determining unit 103 determines that the subsequent image is a blind spot image in which the object may be present at a blind spot of the traffic mirror. In other words, the blind spot determining unit 103 determines whether a moving object that has been seen in the traffic mirror is no longer seen therein in the consecutive time-series images and determines that the image in which the moving object is no longer seen is a blind spot image.

An example of a blind spot determination process performed by the blind spot determining unit 103 thus configured will be described with reference to a drawing.

Figure 10:
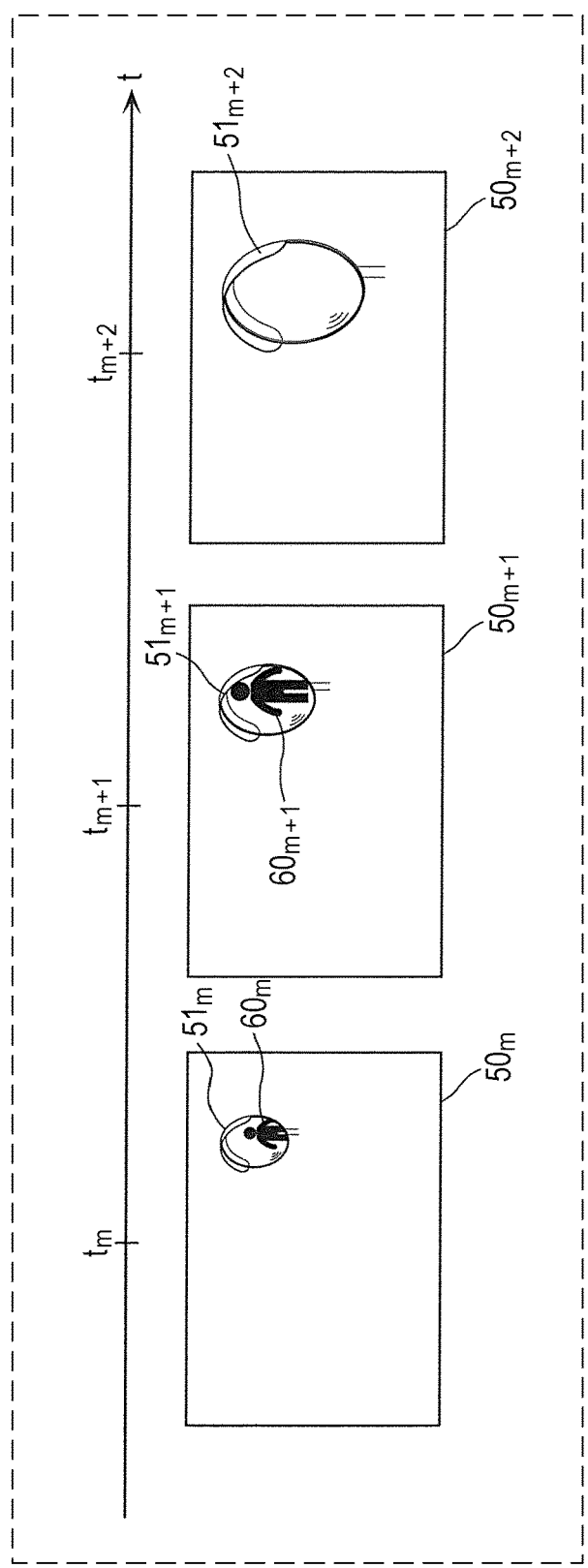
FIG. 10 is an explanatory diagram illustrating an example of a blind spot determination process performed by a blind spot determining unit in accordance with the first embodiment.

FIG. 10 is an explanatory diagram illustrating an example of the blind spot determination process performed by the blind spot determining unit 103 in accordance with the first embodiment. Note that components that are the same or substantially the same as those illustrated in FIG. 4 are denoted by the same reference signs to omit a detailed description thereof.

Images $50_m$, $50_{m+1}$, and $50_{m+2}$ illustrated in FIG. 10 are obtained by continuously capturing images of the scenery ahead of the traveling vehicle in time series at time points $t_m$, $t_{m+1}$, and $t_{m+2}$, respectively. The images $50_m$, $50_{m+1}$, and $50_{m+2}$ respectively contain traffic mirrors $51_m$, $51_{m+1}$, and $51_{m+2}$, and persons $60_m$ and $60_{m+1}$ are reflected respectively in the traffic mirrors $51_m$ and $51_{m+1}$.

In this case, the persons $60_m$ and $60_{m+1}$ recognized by the recognizing unit 13 are reflected in the traffic mirrors $51_m$ and $51_{m+1}$ contained in the consecutive time-series images $50_m$ and $50_{m+1}$, respectively. In contrast, no person is reflected in the traffic mirror $51_{m+2}$ contained in the image $50_{m+2}$ following the image $50_{m+1}$, and thus no person is recognized. Therefore, the blind spot determining unit 103 determines that the image $50_{m+2}$ is a blind spot image. A reason why the blind spot determining unit 103 is able to determine a blind spot image in this way will be described with reference to FIG. 11.

Figure 11:
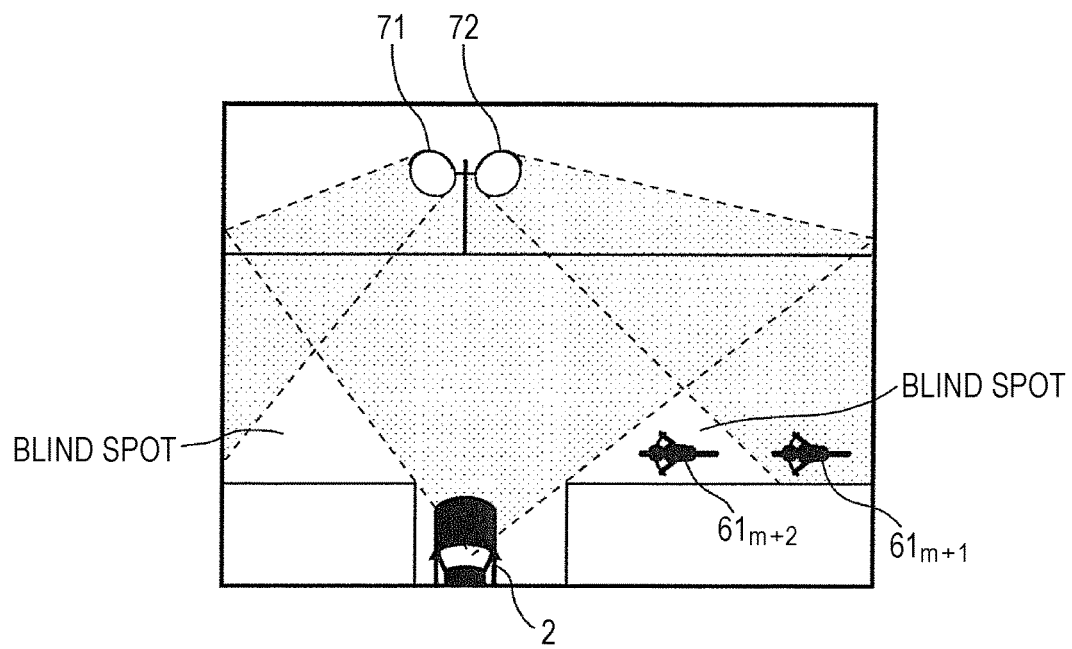
FIG. 11 is an explanatory diagram of blind spots of traffic mirrors.

FIG. 11 is an explanatory diagram of blind spots of traffic mirrors.

Traffic mirrors have angles of view and thus have blind spots, that is, blind spot areas. For example, FIG. 11 illustrates an example case where a moving object $61_{m+1}$, which is a person riding a bicycle, moves to a position of a moving object $61_{m+2}$ and enters the blind spot area of a traffic mirror 72 while a vehicle 2 is temporarily stationary at an intersection. In this case, the driver of the vehicle 2 that is temporarily stationary is able to recognize the moving object $61_{m+1}$ reflected in the traffic mirror 72 but is not able to recognize the moving object $61_{m+2}$ in the traffic mirror 72. The moving object $61_{m+2}$ is present even though the moving object $61_{m+2}$ is not reflected in the traffic mirror 72. Thus, the blind spot determining unit 103 performs a determination process as described above and determines that the image $50_{m+2}$ is a blind spot image in which a moving object which is a person may be present at a blind spot of the traffic mirror $51_{m+2}$.

If the blind spot determining unit 103 determines a blind spot image, the output processing unit 102 generates and outputs vehicle control information for causing the vehicle to be temporarily stationary until the person becomes visible directly from the vehicle or is seen in the traffic mirror. In addition, in the case where the person is not seen in the traffic mirror even after a predetermined period passes since the blind spot determining unit 103 has determined the blind spot image, the blind spot determining unit 103 may determine that timeout has occurred and may perform the blind spot determination process from the start. In the case where a moving object such as a person does not become visible in the traffic mirror even after a predetermined period of time, the moving object such as a person present in a blind spot area of the traffic mirror may have entered a house or a store and, as a result, the moving object such as a person does not become visible even if the driver waited for a long time. Thus, it is determined that timeout has occurred in such a case.

Further, in the case where an object having different sizes are detected (recognized) by the detection processing unit 12a in at least two consecutive time-series images among a plurality of images and the object is not detected (recognized) by the detection processing unit 12a in an image subsequent to the at least two consecutive time-series images, the blind spot determining unit 103 may determine that the subsequent image is a blind spot image. A description about this case will be given with reference to FIG. 10, for example. The size of the person $60_{m+1}$ reflected in the traffic mirror $51_{m+1}$ contained in the image $50_{m+1}$ is larger than the size of the person $60_m$ reflected in the traffic mirror $51_m$ contained in the image $50_m$ that precedes the image $50_{m+1}$ in time series. This indicates that the person 60 is approaching the intersection. The person is no longer in the traffic mirror $51_{m+2}$ contained in the image $50_{m+2}$ subsequent to the image $50_{m+1}$ in time series. This indicates that the person 60 has entered the blind spot near the intersection. Thus, the blind spot determining unit 103 is able to determine that the image $50_{m+2}$ is a blind spot image on the basis of the result of comparison between the size of the person $60_{m+1}$ in the traffic mirror $51_{m+1}$ contained in the image $50_{m+1}$ and the size of the person $60_m$ in the traffic mirror $51_m$ contained in the preceding image $50_m$ in time series and the presence or absence of the person 60 in the image $50_{m+2}$. With such a configuration, in the case where the person 60 moves away from the intersection to enter a blind spot, an image in which the person 60 is no longer reflected in the traffic mirror 51 is not determined to be a blind spot image. Thus, a circumstance in which the vehicle is caused to be stationary unnecessarily in a safe situation is successfully avoided.

Output Processing Unit 102

The output processing unit 102 generates driving assist information for a vehicle on the basis of the size of the object calculated by the calculating unit 101 and outputs the generated driving assist information. The driving assist information is generated in accordance with change information regarding a change in size of the object in at least two consecutive time-series images and is output. If the change information indicates an increase in the size, the driving assist information includes at least one of information for causing the vehicle to decelerate and information for causing the vehicle to move in a direction to be away from the object. In addition, if the change information indicates an increase in the size, the driving assist information includes information for causing the vehicle to start traveling after the object moves away from the vehicle. The driving assist information may be control command information regarding a behavior of the vehicle or indication information to be provided to an occupant of the vehicle.

Figure 12:
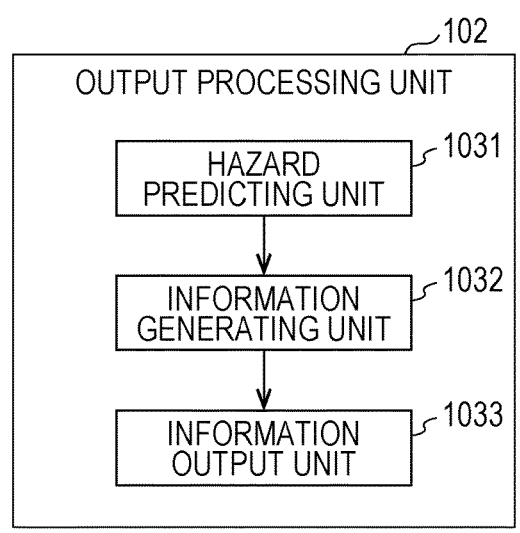
FIG. 12 is a diagram illustrating an example of a functional configuration of an output processing unit in accordance with the first embodiment.

FIG. 12 is a diagram illustrating an example of a functional configuration of the output processing unit 102 in accordance with the first embodiment.

In the first embodiment, the output processing unit 102 includes a hazard predicting unit 1031, an information generating unit 1032, and an information output unit 1033 as illustrated in FIG. 12.

The hazard predicting unit 1031 predicts a potential hazard anticipated if a vehicle travels without any precautions, on the basis of the size of the object calculated by the calculating unit 101. The potential hazard may be the significance of a potential hazard or the type of a potential hazard (e.g., minor collision, major collision, or collision with a pedestrian or bicyclist when making a turn). The hazard predicting unit 1031 determines the significance of a potential hazard in accordance with an amount of change in the size of the object in at least two consecutive time-series images. The significance of a potential hazard is successfully predicted in accordance with, for example, an amount of change in the size of the object, which will be described.

Figure 13:
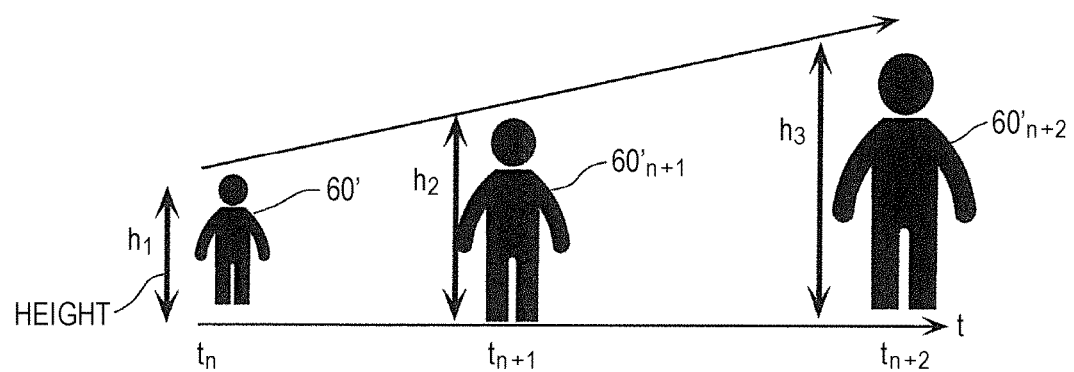
FIG. 13 is a conceptual diagram illustrating an amount of change in size of an object illustrated in FIG. 9(b)

FIG. 13 is a conceptual diagram illustrating an amount of change in the size of the object illustrated in FIG. 9(b). Components that are the same or substantially the same as those illustrated in FIG. 9(b) are denoted by the same reference signs to omit a detailed description thereof. FIG. 13 conceptually illustrates the persons $60'$, $60'_{n+1}$, and $60'_{n+2}$ which are objects reflected in the respective traffic mirrors enlarged or reduced to the reference size and which have the sizes calculated by the object size calculating unit 1012.

The size of the person 60 that increases in an order of the person $60'$, the person $60'_{n+1}$, and the person $60'_{n+2}$ as illustrated in FIG. 13 indicates that the person 60 is approaching the traffic mirror 51, that is, the intersection. When the amount of change in the size between the persons $60'$, $60'_{n+1}$, and $60'_{n+2}$ is large, the speed at which the person 60 is approaching the traffic mirror 51 and an amount of change in the speed are large. Thus, the hazard predicting unit 1031 determines that the significance of a potential hazard is high. That is, when the amount of change in the size between the persons $60'$, $60'_{n+1}$, and $60'_{n+2}$ is large, it can be determined that the person 60 is rapidly approaching the intersection where the traffic mirror 51 is installed and the likelihood of the person 60 hitting or colliding with a vehicle having the information processing apparatus 10 mounted therein is high. In this way, the hazard predicting unit 1031 is able to predict the significance of a potential hazard in accordance with an amount of change in the size of an object.

The information generating unit 1032 generates driving assist information for the vehicle on the basis of the size of the object calculated by the calculating unit 101. The information generating unit 1032 may generate driving assist information for the vehicle in accordance with the size of the object. For example, the information generating unit 1032 may generate driving assist information in accordance with change information regarding a change in the size of the object in at least two consecutive time-series images. In addition, the information generating unit 1032 may generate driving assist information for a vehicle on the basis of the state of the vehicle in addition to the size of the object.

In addition, the information generating unit 1032 may generate driving assist information in accordance with a potential hazard predicted from the change information regarding a change if the vehicle travels in a direction to be closer to the traffic mirror. The information generating unit 1032 may generate vehicle control information in accordance with a potential hazard predicted by the hazard predicting unit 1031.

The information generating unit 1032 may generate, as driving assist information, information representing the significance of a potential hazard predicted by the hazard predicting unit 1031. For example, the information generating unit 1032 may generate, as driving assist information, information representing the significance of a potential hazard determined by the hazard predicting unit 1031 in accordance with an amount of change in the size of an object in at least two consecutive time-series images.

In addition, the information generating unit 1032 may generate vehicle control information for causing a vehicle to temporarily stop on the basis of the determination result of a blind spot image obtained by the blind spot determining unit 103. Specifically, the information generating unit 1032 may generate vehicle control information when an object detected (recognized) by the detection processing unit 12*a* in at least one image among a plurality of consecutive time-series images is not detected (recognized) by the detection processing unit 12*a* in an image subsequent to the at least one image in time series. In addition, the information generating unit 1032 may generate vehicle control information (driving assist information) when an object detected (recognized) in different sizes by the detection processing unit 12*a* in at least two consecutive time-series images among a plurality of images is not detected (recognized) by the detection processing unit 12*a* in an image subsequent to the at least two consecutive time-series images in time series.

The information output unit 1033 outputs the driving assist information generated by the information generating unit 1032.

An example of an output process performed by the output processing unit 102 thus configured will be described below with reference to the drawings.

Figure 14:
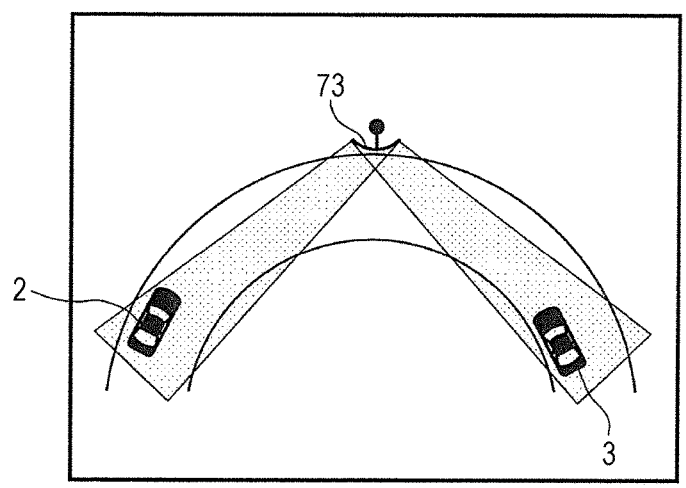
FIG. 14 is a diagram illustrating an example of a circular-curve road assumed in the first embodiment.
Figures 15, 16:
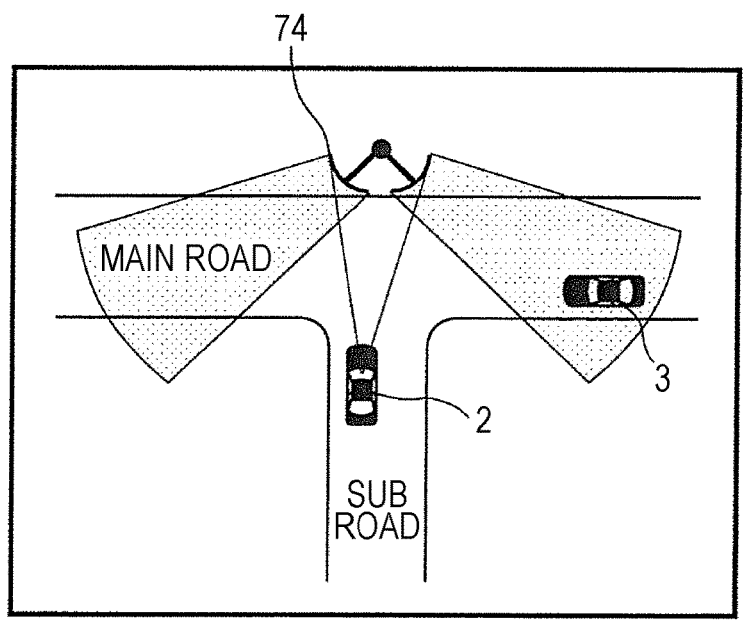
FIG. 15 is an explanatory diagram illustrating an example of an output process performed by the output processing unit in accordance with the first embodiment.
FIG. 16 is a diagram illustrating an example of a T-intersection assumed in the first embodiment.

FIG. 14 is a diagram illustrating an example of a circular-curve road in accordance with the first embodiment. FIG. 15 is an explanatory diagram illustrating an example of an output process performed by the output processing unit 102 in accordance with the first embodiment.

The circular-curve road illustrated in FIG. 14 is an example of a place where the view from the vehicle is obstructed or restricted. FIG. 14 illustrates a circumstance where the vehicle 2 having the information processing apparatus 10 or the system 1 according to the first embodiment mounted therein travels along the circular-curve road. FIG. 14 also illustrates a vehicle 3, which is an example of object, and the vehicle 3 in a traffic mirror 73 is visible from the vehicle 2.

In this case, the output processing unit 102, specifically, the hazard predicting unit 1031, determines the significance of a potential hazard in accordance with a change in the size of the object reflected in the traffic mirror that is enlarged or reduced to (i.e., normalized based on) the reference size by the calculating unit 101.

More specifically, the hazard predicting unit 1031 determines that the significance of a potential hazard is low when the size of the object reflected in the traffic mirror having the normalized size decreases or does not substantially change as illustrated in FIG. 15. In this case, the output processing unit 102, specifically, the information generating unit 1032, may generate information indicating that the significance of a potential hazard determined by the hazard predicting unit 1031 is low. In addition, the information generating unit 1032 may generate vehicle control information indicating that there is no change in control in terms of the speed of the vehicle 2 or the like in accordance with the low significance of a potential hazard as illustrated in FIG. 15. Since it can be determined that the vehicle 3 is traveling in a direction to be away from the vehicle 2 or is stationary when the size of the vehicle 3 in the traffic mirror 73 having the normalized size decreases or does not substantially change in the example illustrated in FIG. 14, the hazard predicting unit 1031 determines that the significance of a potential hazard is low. The information generating unit 1032 may generate information indicating that the determined significance of a potential hazard is low or vehicle control information indicating that there is no change in control in terms of the speed of the vehicle 2 or the like.

The hazard predicting unit 1031 determines that the significance of a potential hazard is intermediate when the size of the object reflected in the traffic mirror having the normalized size gradually increases as illustrated in FIG. 15. In this case, the information generating unit 1032 may generate information indicating that the determined significance of a potential hazard is intermediate or may generate vehicle control information for causing the vehicle to decelerate on the basis of the intermediate significance of a potential hazard as illustrated in FIG. 15. Since it can be determined that the vehicle 3 is traveling in a direction to be closer to the vehicle 2 when the a change in the size of the vehicle 3 in the traffic mirror 72 having the normalized size is greater than a threshold a and the size of the vehicle 3 gradually increases in the example illustrated in FIG. 14, the hazard predicting unit 1031 determines that the significance of a potential hazard is intermediate. The information generating unit 1032 may generate information indicating that the determined significance of a potential hazard is intermediate or vehicle control information for causing the vehicle 2 to decelerate.

The hazard predicting unit 1031 determines that the significance of a potential hazard is high when the size of the object reflected in the traffic mirror having the normalized size suddenly increases as illustrated in FIG. 15. In this case, the information generating unit 1032 may generate information indicating that the determined significance of a potential hazard is high. The information generating unit 1032 may also generate vehicle control information for causing the vehicle to decelerate or for causing the vehicle to travel in a direction to be away from the object on the basis of the high significance of a potential hazard as illustrated in FIG. 15. Since it can be determined that the vehicle 3 is traveling at a high speed in a direction to be closer to the vehicle 2 when the change in the size of the vehicle 3 in the traffic mirror 73 having the normalized size is greater than a threshold b that is larger than the threshold a in the example illustrated in FIG. 14, the hazard predicting unit 1031 determines that the significance of a potential hazard is high. The information generating unit 1032 may generate information indicating that the determined significance of a potential hazard is high or vehicle control information for causing the vehicle 2 to decelerate and for causing the vehicle 2 to travel in a direction to be away from the vehicle 3 so that the vehicle 2 is located at a position where no collision occurs even if the vehicle 3 deviates from the lane at the circular-curve road.

The case where the vehicle 2 is traveling (i.e., running) along the circular-curve road has been described with reference to FIGS. 14 and 15; however, the case is not limited to this one. The same applies to the case where the vehicle 2 travels into an intersection of roads.

Figures 17, 18:
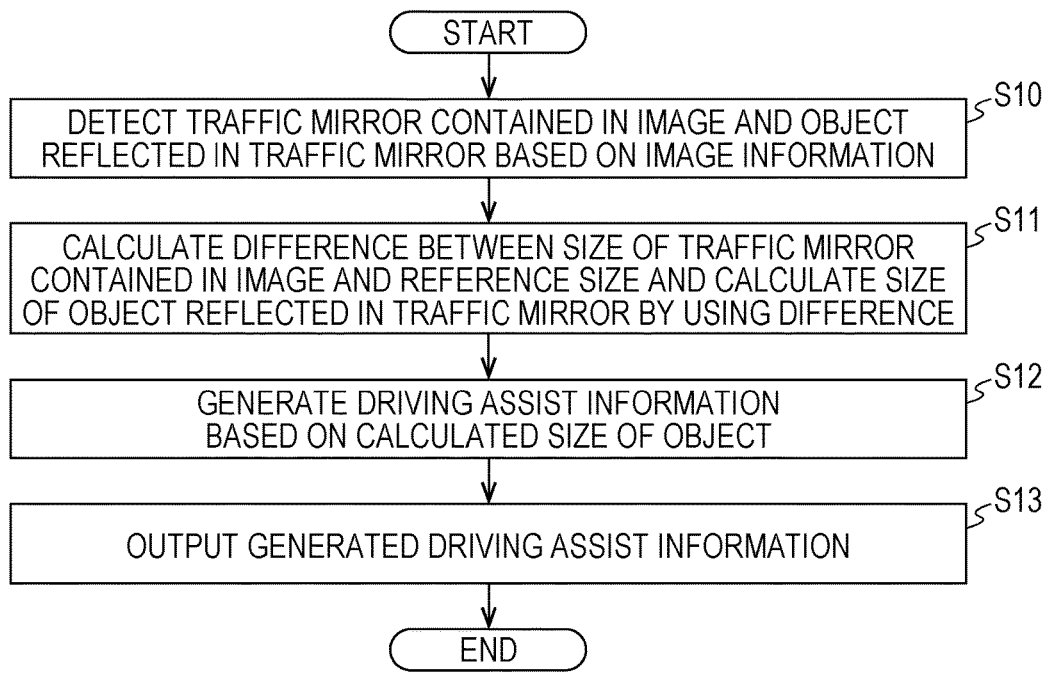
FIG. 17 is an explanatory diagram illustrating another example of the output process performed by the output processing unit in accordance with the first embodiment.
FIG. 18 is a flowchart illustrating an outline of an information processing method performed by the system in accordance with the first embodiment.

FIG. 16 is a diagram illustrating an example of a T-intersection assumed in the first embodiment. FIG. 17 is an explanatory diagram illustrating another example of the output process performed by the output processing unit 102 in accordance with the first embodiment.

The T-intersection illustrated in FIG. 16 is an example of a place where the view from the vehicle is obstructed or restricted. FIG. 16 illustrates a circumstance where the vehicle 2 having the information processing apparatus 10 or the system 1 according to the first embodiment mounted therein is to enter a T-intersection. FIG. 16 also illustrates the vehicle 3, which is an example of an object, and the vehicle 3 reflected in a traffic mirror 74 is visible from the vehicle 2.

In this case, the output processing unit 102, specifically, the hazard predicting unit 1031, determines that the significance of a potential hazard is low when the size of the object reflected in a traffic mirror having the normalized size decreases or substantially remains unchanged as illustrated in FIG. 17. In this case, the output processing unit 102, specifically, the information generating unit 1032, may generate information indicating that the significance of a potential hazard determined by the hazard predicting unit 1031 is low. In addition, the information generating unit 1032 may generate vehicle control information for causing the vehicle 2 to be temporarily stationary and then start traveling on the basis of the low significance of a potential hazard as illustrated in FIG. 17. Since it can be determined that the vehicle 3 is traveling in a direction to be away from the vehicle 2 or is stationary when the size of the vehicle 3 reflected in the traffic mirror 74 having the normalized size decreases or substantially remains unchanged in the example illustrated in FIG. 16, the hazard predicting unit 1031 determines that the significance of a potential hazard is low. The information generating unit 1032 may generate information indicating that the determined significance of a potential hazard is low or vehicle control information for causing the vehicle 2 to be temporarily stationary and then start traveling.

The hazard predicting unit 1031 determines that the significance of a potential hazard is high when the size of the object reflected in the traffic mirror having the normalized size increases as illustrated in FIG. 17. In this case, the information generating unit 1032 may generate information indicating that the significance of a potential hazard determined by the hazard predicting unit 1031 is high. The information generating unit 1032 may generate vehicle control information for causing the vehicle 2 to temporarily stop and then start traveling after passage of the vehicle 2, which is the target, is confirmed using a sensor or the like, on the basis of the high significance of a potential hazard as illustrated in FIG. 17. Since it can be determined that the vehicle 3 is traveling in a direction to be closer to the vehicle 2 when the size of the vehicle 3 in the traffic mirror 74 having the normalized size increases in the example illustrated in FIG. 16, the hazard predicting unit 1031 determines that the significance of a potential hazard is high. The information generating unit 1032 may generate information indicating that the determined significance of a potential hazard is high or vehicle control information for causing the vehicle 2 to be temporarily stationary and then start traveling after passage of the vehicle 2 is confirmed using a sensor or the like.

The example where the change information regarding a change in size is an amount of change in size has been described above; however, the change information regarding a change in size may be information indicating the type of the change. For example, the type of the change in the size may be an increase (or decrease) in the size or the size becoming greater than or equal to a predetermined size (or becoming less than the predetermined size).

In addition, the example where driving assist information is control command information has been described above; however, the driving assist information may be indication information. For example, the indication information may be information indicating a potential hazard (described later) or information indicating a recommended operation for the driver.

Operation of System 1

Figure 19:
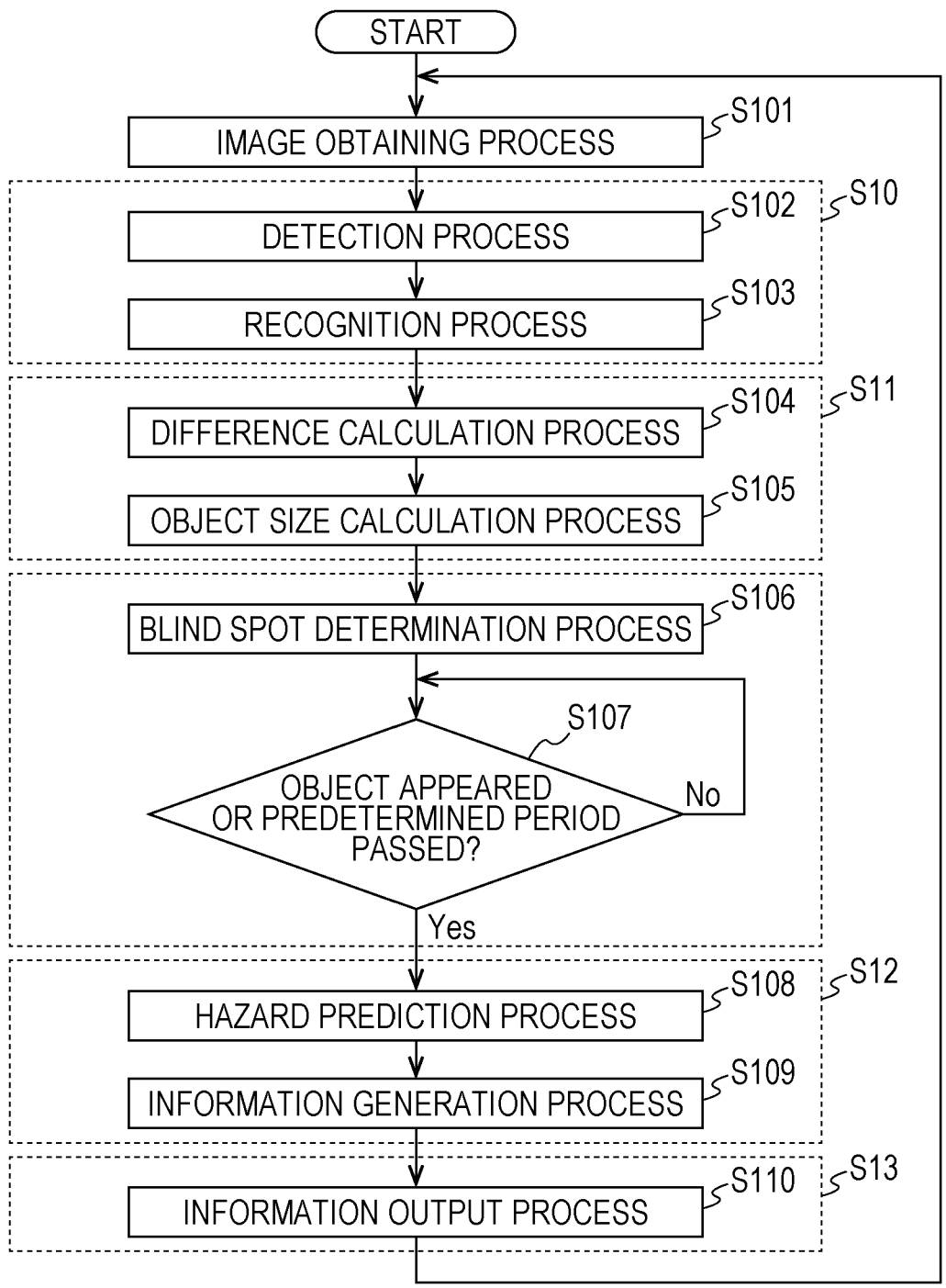
FIG. 19 is a flowchart illustrating details of the information processing method performed by the system in accordance with the first embodiment.

An information processing method performed by the system 1 thus configured will be described next. FIG. 18 is a flowchart illustrating an outline of the information processing method performed by the system 1 in accordance with the first embodiment. FIG. 19 is a flowchart illustrating details of the information processing method performed by the system 1 in accordance with the first embodiment. The same or substantially the same steps in FIGS. 18 and 19 are denoted by the same reference signs to omit a detailed description thereof.

As illustrated in FIG. 18, the system 1 detects a traffic mirror contained in an image and an object reflected in the traffic mirror on the basis of image information (S10). Then, the system 1 calculates a difference between the size of the traffic mirror contained in the image and a reference size and calculates the size of the object reflected in the traffic mirror by using the difference (S11). Then, the system 1 generates driving assist information for a vehicle on the basis of the size of the object calculated in S11 (S12). Then, the system 1 outputs the driving assist information generated in S12 (S13).

More specifically, as illustrated in FIG. 19, the image obtaining unit 11 of the system 1 performs an image obtaining process to obtain image information representing images captured by an image capturing apparatus mounted in a traveling vehicle (S101).

Then, the system 1 performs the process of S10 described in FIG. 18. More specifically, in S10, the system 1 performs a detection process to detect a traffic mirror contained in each image represented by the image information obtained in S101 (S102). Then, the system 1 performs a recognition process to recognize (detect) an object reflected in the traffic mirror contained in the image represented by the image information obtained in S101 (S103).

Then, the system 1 performs the process of S11 described in FIG. 18. More specifically, in S11, the system 1 performs a difference calculation process to calculate a difference between the size of the traffic mirror detected in S102 and the reference size (S104). Then, the system 1 performs an object size calculation process for the object recognized in the traffic mirror in S103 to calculate the size of the object by using the difference calculated in S104 (S105). Since details of the processes performed in S104 and S105 are as described above, a detailed description thereof is omitted.

Then, the system 1 performs a blind spot determination process to determine, when an object recognized in S103 in two consecutive time-series images among three consecutive time-series images is not recognized in S103 in an image subsequent to the two consecutive time-series images, that the subsequent image is a blind spot image in which the object is possibly present in a blind spot of the traffic mirror (S106).

Then, the system 1 determines whether the object is recognized in S103 after the blind spot image is determined in S106 or whether a predetermined period has passed from the determination of the blind spot image (S106). When the object reappears in S103 after the blind spot image is determined in S106 or when timeout occurs, that is, when no object is recognized in S103 over the predetermined period from the determination of the blind spot image in S106 (Yes in S107), the process proceeds to the subsequent step (S12); otherwise (No in S107), the determination process of S107 is repeated.

Then, the system 1 performs the process of S12 described in FIG. 18. More specifically, in S12, the system 1 performs a hazard prediction process to predict the significance of a potential hazard anticipated if the vehicle travels without any precautions, on the basis of the size of the object calculated in S105 (S108). Then, the system 1 performs an information generation process to generate, as driving assist information, information indicating the significance of a potential hazard determined in S108 or generate vehicle control information for controlling the vehicle on the basis of the significance of a potential hazard determined in S108 (S109). Since details of the processes performed in S108 and S109 are described above, a detailed description thereof is omitted.

Then, the system 1 performs the process of S13 described in FIG. 18. More specifically, in S13, the system 1 performs an information output process to output the driving assist information or the like generated in S109 (S110).

Note that the order in which the processes of S103, S104, and S105 are performed is not limited to the order illustrated in FIG. 19. That is, the process of S103 may be performed after the process of S104, and then the process of S105 may be performed. In addition, the processes of S106 and S107 may be performed prior to the calculation process of S11.

Advantageous Effects of First Embodiment

As described above, the information processing apparatus 10 or the system 1 according to the first embodiment is able to determine the significance of a potential hazard by using a traffic mirror at a place such as an intersection where the view from the vehicle is obstructed or restricted and is able to generate driving assist information for a vehicle on the basis of the determined significance of a potential hazard and output the driving assist information. Consequently, the information processing apparatus 10 or the system 1 according to the first embodiment is able to assist safe driving of a vehicle having the information processing apparatus 10 or the system 1 mounted therein.

Specifically, when an amount of movement of an object, such as a person, reflected in a traffic mirror is large at a place such as an intersection where the view from the vehicle is obstructed or restricted, it is highly probable that the object suddenly comes out to the place. In such a case, the vehicle needs to be decelerated quickly to avoid a potential hazard.

Since the size of the traffic mirror contained in images captured from a traveling vehicle changes, normalization is performed to make the sizes of the traffic mirror uniform to a predetermined reference size in the first embodiment. Consequently, an amount of movement of an object, such as a person, reflected in the traffic mirror is successfully converted into an amount of change in the size of the object reflected in the traffic mirror. Thus, the significance of a potential hazard is successfully determined in accordance with the amount of change in the size. In this way, the information processing apparatus 10 according to the first embodiment is able to determine the significance of a possible hazard by using a traffic mirror.

For example, in the case where a vehicle in which automated driving is enabled includes the information processing apparatus 10, since the vehicle is able to determine the significance of a potential hazard by using a traffic mirror in a manner as described above, the vehicle is able to perform control in accordance with the determined significance of a potential hazard.

In addition, the driving assist information may be generated in accordance with change information regarding a change in the size of the object in at least two consecutive time-series images, and the change information may indicate an increase in the size, as described above. In this case, the driving assist information may include at least one of information for causing the vehicle to decelerate and information for causing the vehicle to travel in a direction to be away from the object or may include information for causing the vehicle to start traveling after the object is away from the vehicle because of the following reason. With these pieces of information, the safety of the object and the vehicle that are approaching the intersection can be guaranteed.

In addition, the driving assist information may be generated on the basis of a state of the vehicle in addition to the size of the object because appropriate control can be implemented in accordance with the state of the vehicle (such as a traveling state or a stationary state).

In addition, the driving assist information may be generated in accordance with the size of the object because a potential hazard is successfully predicted without performing a process using the change information regarding a change in the size.

As described above, the information processing apparatus 10 or the system 1 according to the first embodiment is able to assist safe driving of a vehicle by using a traffic mirror at a place such as an intersection where the view from the vehicle is obstructed or restricted.

First Modification

In the first embodiment, the description has been given of the case where the significance of a potential hazard is determined in accordance with an amount of change in the size of an object reflected in a traffic mirror having a normalized size; however, the criterion used is not limited to this one. The recognizing unit 13 may recognize an attribute of an object reflected in a traffic mirror, and the calculating unit 101 may determine the significance of a potential hazard by taking into account the attribute. In a first modification, a description will be given of the case where the significance of a potential hazard is determined by further taking into account an attribute regarding the moving speed of an object reflected in a traffic mirror.

FIGS. 20 and 21 are explanatory diagrams each illustrating an example of a hazard prediction process performed by the output processing unit 102 in accordance with the first modification of the first embodiment. In FIGS. 20 and 21, content that is the same or substantially the same as that illustrated in FIGS. 15 and 17 is denoted by the same expression to omit a detailed description thereof.

FIG. 20 illustrates an example of the hazard prediction process performed for a circular-curve road by the output processing unit 102 in accordance with the first modification. FIG. 21 illustrates an example of the hazard prediction process performed for a T-intersection by the output processing unit 102 in accordance with the first modification. Since the vehicle control information based on the low, intermediate, or high significance of a potential hazard may be the same as that illustrated in FIGS. 15 and 17, an illustration thereof is omitted in FIGS. 20 and 21.

As illustrated in FIGS. 20 and 21, in the case where an object is a person, the hazard predicting unit 1031 determines the significance of a potential hazard in the same manner as that in the cases illustrated in FIGS. 15 and 17, respectively. On the other hand, in the case where the object is a bicycle, a motor cycle, or an automobile having a higher moving speed than a person, the hazard predicting unit 1031 determines that the significance of a potential hazard is higher than that in the case where the object is a person in accordance with the moving speed.

As described above, in the first modification, the output processing unit 102 generates driving assist information in accordance with an attribute of an object recognized by the recognizing unit 13 and outputs the generated driving assist information.

Second Modification

In the first modification, the description has been given of the case where the significance of a potential hazard is determined by further taking into account an attribute regarding the moving speed of an object reflected in a traffic mirror; however, the attribute used in determination is not limited to the attribute regarding the moving speed. In the case where an object reflected in a traffic mirror is a person, the hazard predicting unit 1031 may determine the significance of a potential hazard by further taking into an attribute regarding the age of the person. This case will be described below as a second modification.

FIGS. 22 and 23 are explanatory diagrams each illustrating an example of a hazard prediction process performed by the output processing unit 102 in accordance with the second modification of the first embodiment. In FIGS. 22 and 23, content that is the same or substantially the same as that illustrated in FIGS. 15 and 17 is denoted by the same expression to omit a detailed description thereof.

FIG. 22 illustrates an example of the hazard prediction process performed for a circular-curve road by the output processing unit 102 in accordance with the second modification. FIG. 23 illustrates an example of the hazard prediction process performed for a T-intersection by the output processing unit 102 in accordance with the second modification. Since the vehicle control information based on the low, intermediate, or high significance of a potential hazard may be the same as that illustrated in FIGS. 15 and 17, an illustration thereof is omitted also in FIGS. 22 and 23.

As illustrated in FIGS. 22 and 23, in the case where an object is a person and the person is a child or an elderly person, the hazard predicting unit 1031 determines the significance of a potential hazard in the same or substantially same manner as that in FIGS. 15 and 17, respectively. On the other hand, if the object is a person and the person is neither a child nor an elderly person, the hazard predicting unit 1031 determines that the significance of a potential hazard is higher than that in the case where the person is a child or an elderly person.

As described above, in the second modification, in the case where an object recognized by the recognizing unit 13 is a person, the output processing unit 102 outputs driving assist information that changes depending on information regarding the age of the object recognized by the recognizing unit 13. The example where the information regarding the age represents a generation of the person has been described above; however, the information regarding the age may represent the age or the age range of the person.

Third Modification

In the second modification, the description has been given of the case where, in the case where an object reflected in a traffic mirror is a person, the significance of a potential hazard is determined by further taking into account an attribute regarding the age of the person; however, the attribute used in determination is not limited to the attribute regarding the age. In the case where an object reflected in a traffic mirror is a person, the hazard predicting unit 1031 may determine the significance of a potential hazard by further taking into account whether or not the person is behaving carelessly. Specifically, a careless behavior indicates a behavior without looking ahead. Examples of a behavior without looking ahead include looking at a mobile terminal such as a smartphone or a book while moving. This case will be described below as a third modification.

FIGS. 24 and 25 are explanatory diagrams each illustrating an example of a hazard prediction process performed by the output processing unit 102 in accordance with the third modification of the first embodiment. In FIGS. 24 and 25, content that is the same or substantially the same as that illustrated in FIGS. 15 and 17 is denoted by the same expression to omit a detailed description thereof.

FIG. 24 illustrates an example of the hazard prediction process performed for a circular-curve road by the output processing unit 102 in accordance with the third modification. FIG. 25 illustrates an example of the hazard prediction process performed for a T-intersection by the output processing unit 102 in accordance with the third modification. Since the vehicle control information based on the low, intermediate, or high significance of a potential hazard may be the same as that illustrated in FIGS. 15 and 17, an illustration thereof is omitted also in FIGS. 24 and 25.

As illustrated in FIGS. 24 and 25, in the case where an object is a person and the person does not take a behavior without looking ahead, which involves the person looking at a mobile terminal while moving, that is, the person is not looking at a mobile terminal while walking, the hazard predicting unit 1031 determines the significance of a potential hazard in the same manner as that in FIGS. 15 and 17. On the other hand, in the case where the object is a person and the person is taking a behavior without looking ahead, that is, the person is looking at a mobile terminal while walking, the hazard predicting unit 1031 determines that the significance of a potential hazard is higher than that in the case where the person is not taking a behavior without looking ahead. The example where the careless behavior is a behavior without looking ahead has been described above; however, the careless behavior may indicate the case where the person is looking ahead but looking above or below while moving or the case where the person is looking at a specific object, such as a baby buggy or a ball, located in front of the person while moving.

As described above, in the third modification, in the case where an attribute of an object recognized by the recognizing unit 13 indicates a person, the output processing unit 102 generates and outputs driving assist information depending on whether the person recognized by the recognizing unit 13 is behaving carelessly.

Second Embodiment

In the first embodiment, the description has been given of the information processing apparatus 10 and the system 1 capable of assisting safe driving of a traveling vehicle by using a traffic mirror at a place such as an intersection where the view from the vehicle is obstructed or restricted; however, the situation is not limited to this case. Safe driving of a vehicle that is temporarily stationary can be assisted by using a traffic mirror. This case will be described below as a second embodiment.

Configuration of System 1A

Figure 26:
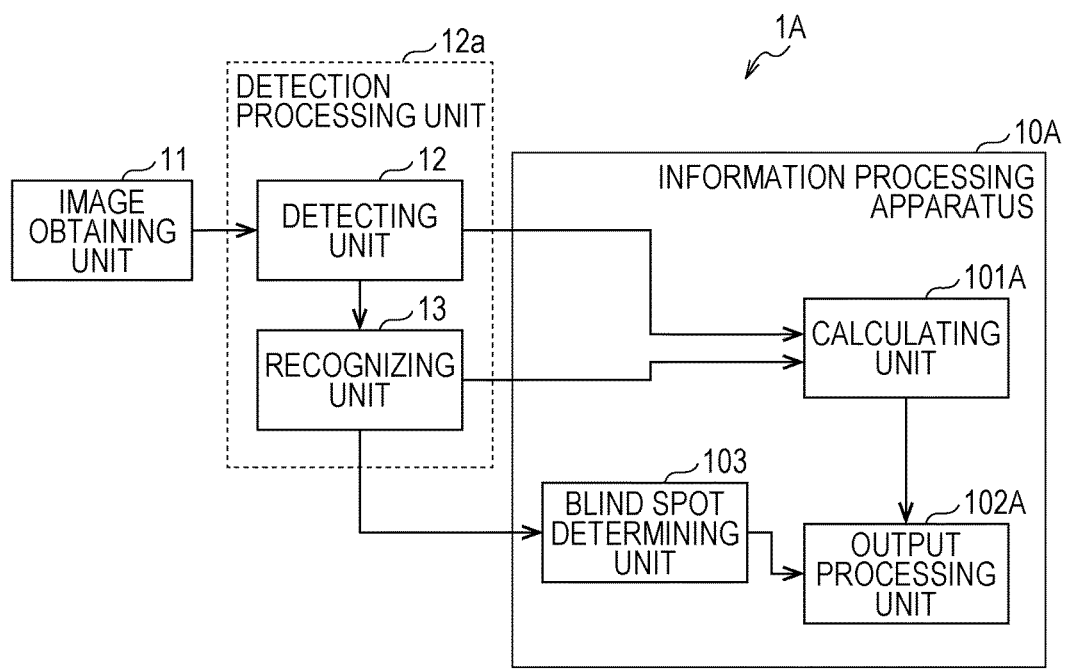
FIG. 26 is a block diagram illustrating an example of a configuration of a system in accordance with a second embodiment.

FIG. 26 is a block diagram illustrating an example of a configuration of a system 1A in accordance with the second embodiment. Components that are the same or substantially the same as those illustrated in FIG. 1 are denoted by the same reference signs to omit a detailed description thereof.

The system 1A illustrated in FIG. 26 differs from the system 1 according to the first embodiment in a configuration of an information processing apparatus 10A. The system 1A is mounted in a vehicle, for example, an automobile and is able to output driving assist information for the vehicle by using a traffic mirror, just like the system 1.

In the second embodiment, the information processing apparatus 10A takes into account the position of an object in a traffic mirror in order to assist safe driving of a vehicle that is temporarily stationary. As in the first embodiment, the image obtaining unit 11 and the detection processing unit 12a may be included in the information processing apparatus 10A.

Information Processing Apparatus 10A

Figure 27A:
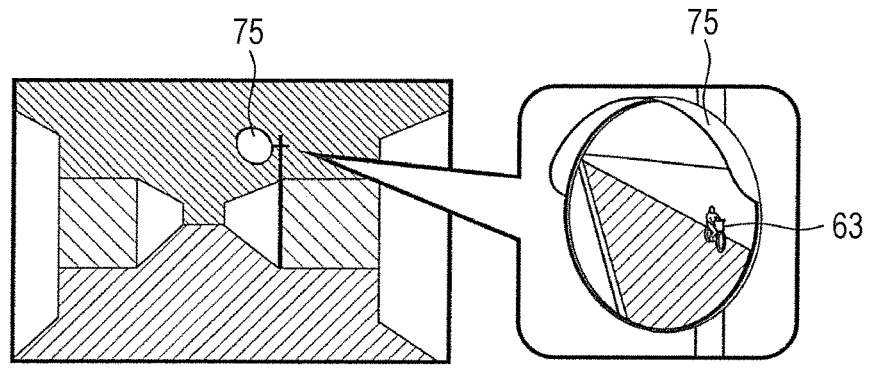
FIG. 27A is a diagram illustrating an example of an object reflected in a traffic mirror visually recognized by a driver of a vehicle that is temporarily stationary at an intersection.
Figure 27B:
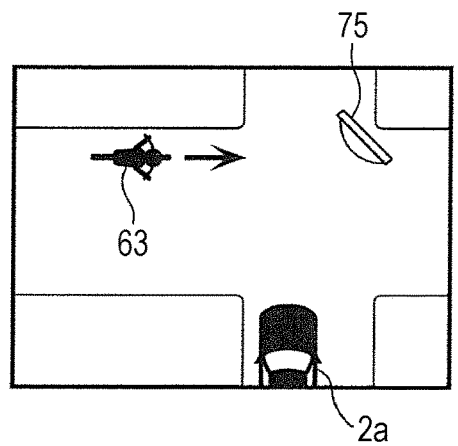
FIG. 27B is an explanatory diagram of characteristics of a traffic mirror.
Figure 27C:
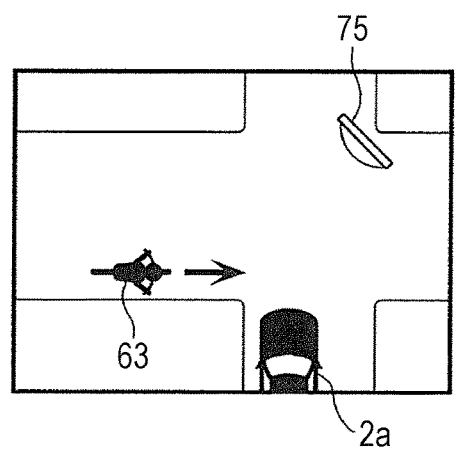
FIG. 27C is an explanatory diagram of characteristics of a traffic mirror.

The information processing apparatus 10A according to the second embodiment outputs driving assist information for a vehicle that is temporarily stationary by using a traffic mirror. In the second embodiment, the information processing apparatus 10A also takes into account the position of an object in a traffic mirror in order to assist safe driving of a vehicle that is temporarily stationary. The reason for this will be described with reference to FIGS. 27A to 27C. FIG. 27A is diagram illustrating an example of an object 63 reflected in a traffic mirror 75 visually recognized by a driver of a vehicle 2a that is temporarily stationary at an intersection. FIGS. 27B and 27C are explanatory diagrams describing characteristics of a traffic mirror.

For example, FIG. 27A illustrates an example case where, when the driver of the vehicle 2a that is temporarily stationary at an intersection looks at the traffic mirror 75 installed at the intersection, the driver can confirm a person riding a bicycle as the object 63 reflected in the traffic mirror 75. In FIG. 27A, since the object 63, which is a person, is at a distal side in the traffic mirror, that is, in an upper portion of the traffic mirror 75, it appears to the driver of the vehicle 2a that the object 63 is located on a distal side of the road distal to the vehicle 2a as illustrated in FIG. 27B. However, due to the characteristics of traffic mirrors in which the left and the right are reversed, the object 63 is actually located at a position illustrated in FIG. 27C, that is, at a proximal side of the road proximal to the vehicle 2a.

Thus, the information processing apparatus 10A according to the second embodiment also takes into account the position of the object in the traffic mirror and outputs driving assist information for the vehicle 2a.

More specifically, the information processing apparatus 10A according to the second embodiment includes a calculating unit 101A, an output processing unit 102A, and the blind spot determining unit 103 as illustrated in FIG. 26. The information processing apparatus 10A illustrated in FIG. 26 differs from the information processing apparatus 10 according to the first embodiment in the configurations of the calculating unit 101A and the output processing unit 102A. Details of the configurations of the calculating unit 101A and the output processing unit 102A will be described below.

Calculating Unit 101A

Figure 28:
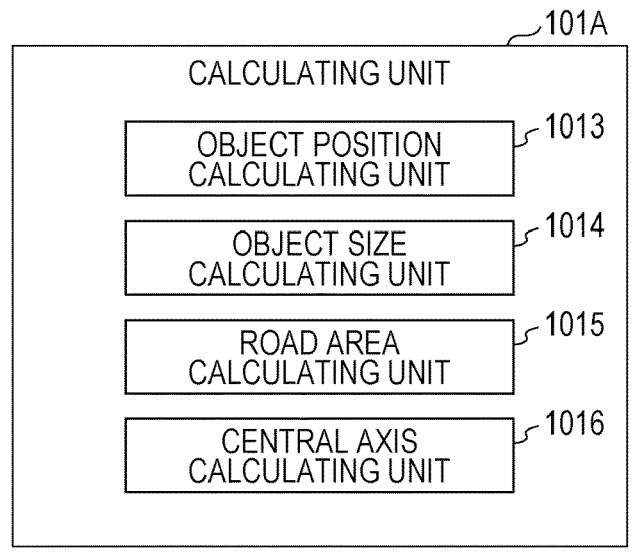
FIG. 28 is a diagram illustrating an example of a functional configuration of a calculating unit in accordance with the second embodiment.
Figure 29A:
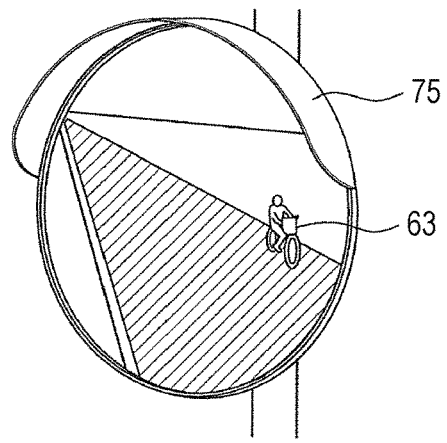
FIG. 29A is a diagram illustrating an example of a position of an object calculated by an object position calculating unit illustrated in FIG. 28.
Figure 29B:
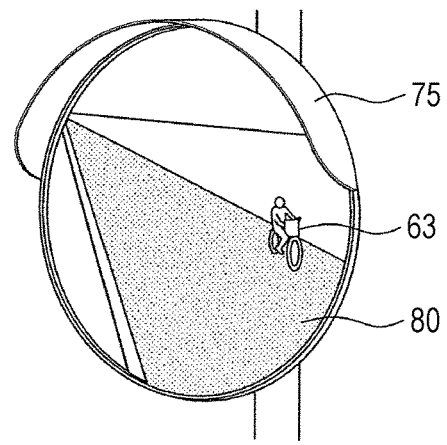
FIG. 29B is a diagram illustrating an example of a road area calculated by a road area calculating unit illustrated in FIG. 28.
Figure 30:
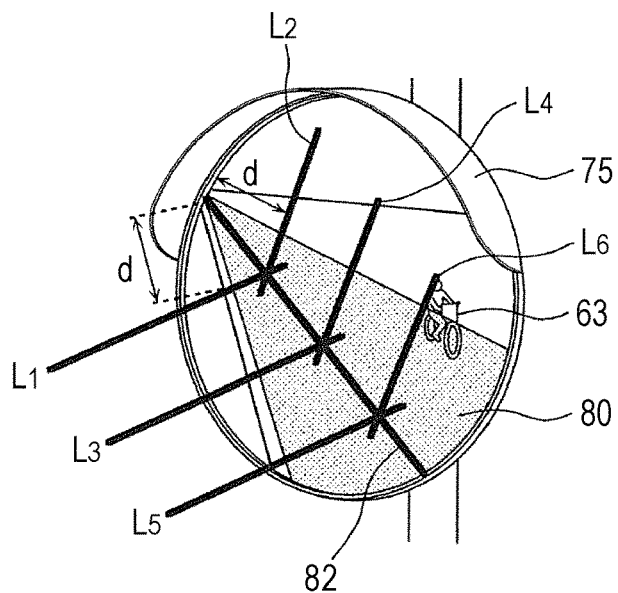
FIG. 30 is an explanatory diagram of a central axis calculation method used by a central axis calculating unit illustrated in FIG. 28.

FIG. 28 is a diagram illustrating an example of a functional configuration of the calculating unit 101A according to the second embodiment. FIG. 29A is a diagram illustrating an example of a position of an object calculated by an object position calculating unit 1013 illustrated in FIG. 28. FIG. 29B is a diagram illustrating an example of a road area calculated by a road area calculating unit 1015 illustrated in FIG. 28. FIG. 30 is an explanatory diagram describing a central axis calculation method used by a central axis calculating unit 1016 illustrated in FIG. 28.

The calculating unit 101A according to the second embodiment calculates the position of an object in a traffic mirror detected by the detection processing unit 12a. More specifically, the calculating unit 101A calculates the position, in a traffic mirror, of an object recognized by the recognizing unit 13 in the traffic mirror detected by the detecting unit 12 in an image captured by an image capturing apparatus mounted in a vehicle.

As illustrated in FIG. 28, for example, the calculating unit 101A includes the object position calculating unit 1013, an object size calculating unit 1014, the road area calculating unit 1015, and the central axis calculating unit 1016. Note that the calculating unit 101A may include only the object position calculating unit 1013 or may include only the object position calculating unit 1013 and the object size calculating unit 1014.

The object position calculating unit 1013 calculates the position of an object in a traffic mirror. More specifically, the object position calculating unit 1013 calculates the position, in a traffic mirror, of an object recognized by the recognizing unit 13 in the traffic mirror detected by the detecting unit 12 in each image obtained by continuously capturing images of the scenery ahead of a temporarily stationary vehicle in time series. For example, the object position calculating unit 1013 calculates the position of the object 63, which is a person riding a bicycle, in a area of the traffic mirror 75 as illustrated in FIG. 29A. In the case where the calculating unit 101A includes only the object position calculating unit 1013, the object position calculating unit 1013 may determine whether the position of the object in the traffic mirror is on the right or on the left with respect to a threshold indicating a predetermined position in the traffic mirror. Alternatively, the object position calculating unit 1013 may determine whether the position of the object in the traffic mirror is above or below a threshold indicating a predetermined position in the traffic mirror.

The object size calculating unit 1014 calculates the size of the object relative to the traffic mirror. More specifically, the object size calculating unit 1014 calculates the size of the object recognized by the recognizing unit 13 in the traffic mirror detected by the detecting unit 12 in an image obtained by continuously capturing images of the scenery ahead of a temporarily stationary vehicle in time series.

The road area calculating unit 1015 calculates a road area in the traffic mirror. More specifically, the road area calculating unit 1015 calculates a road area which is an area representing the road reflected in the traffic mirror detected by the detecting unit 12. For example, the road area calculating unit 1015 calculates a road area 80 representing the road that is present in the area of the traffic mirror 75 as illustrated in FIG. 29B. The road area calculating unit 1015 is able to calculate such a road area by performing in advance learning, for example, convolutional deep learning, by using numerous images of traffic mirrors that show roads therein.

The central axis calculating unit 1016 calculates a central axis of the road area calculated by the road area calculating unit 1015. More specifically, the central axis calculating unit 1016 first calculates, by using Hough transform, a straight line (referred to as a road-shoulder line) that is equivalent to the shoulder of the road in the road area 80 calculated by the road area calculating unit 1015 as illustrated in FIG. 30, for example. Then, the central axis calculating unit 1016 calculates lines $L_1$ and $L_2$ that have an equal distance d from the end of the calculated road-shoulder line, pass a position on the road-shoulder line, and are perpendicular to the road-shoulder line. Likewise, the central axis calculating unit 1016 calculates lines $L_3$ and $L_4$ that have an equal distance from the end of the calculated road-shoulder line, pass a position on the road-shoulder line, and are perpendicular to the road-shoulder line and lines $L_5$ and $L_6$ that have an equal distance from the end of the calculated road-shoulder line, pass a position on the road-shoulder line, and are perpendicular to the road-shoulder line. Then, the central axis calculating unit 1016 calculates, as a central axis 82 of the road area, a line obtained by linking an intersection point of the lines $L_1$ and $L_2$, an intersection point of the lines $L_3$ and $L_4$, and an intersection point of the lines $L_5$ and $L_6$.

The description has been given of the case where the central axis calculating unit 1016 calculates the central axis 82 by calculating the three sets of lines $L_1$ and $L_2$, $L_3$ and $L_4$, and $L_5$ and $L_6$ above; however, the calculation method is not limited to this one. Since the central axis 82 can be determined from an intersection point of at least two lines, the central axis calculating unit 1016 can calculate the central axis 82 from the intersection point of the calculated lines $L_1$ and $L_2$ and the end of the road-shoulder line. Alternatively, the central axis calculating unit 1016 may calculate four or more sets of lines and calculate, by using the least squares method, a line that minimizes the squared errors between the intersection points of the four or more sets of lines and the line, as the central axis 82.

Output Processing Unit 102A

The output processing unit 102A generates driving assist information on the basis of the position of the object in the traffic mirror calculated by the calculating unit 101A and outputs the generated driving assist information. The driving assist information may include control command information regarding a behavior of a vehicle or indication information to be provided to an occupant of the vehicle.

Figure 31:
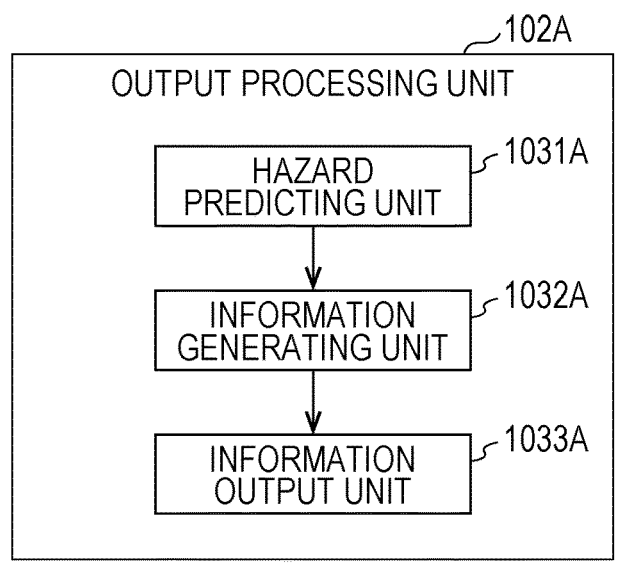
FIG. 31 is a diagram illustrating an example of a functional configuration of an output processing unit in accordance with the second embodiment.

FIG. 31 is a diagram illustrating an example of a functional configuration of the output processing unit 102A in accordance with the second embodiment. FIG. 32 is a diagram illustrating an example of the position of an object in a traffic mirror in accordance with the second embodiment.

In the second embodiment, the output processing unit 102A includes a hazard predicting unit 1031A, an information generating unit 1032A, and an information output unit 1033A as illustrated in FIG. 31.

Hazard Predicting Unit 1031A

The hazard predicting unit 1031A predicts a potential hazard on the basis of the position of the object in the traffic mirror calculated by the calculating unit 101A. For example, the hazard predicting unit 1031A may predict a potential hazard from the position of the object in the traffic mirror in the case where a vehicle travels in a direction to be closer to the traffic mirror or may predict a potential hazard in accordance with a relationship between the position of the object and the area in the traffic mirror determined from the road contained in an image.

In the second embodiment, the hazard predicting unit 1031A predicts a potential hazard on the basis of the position calculated by the object position calculating unit 1013 and the central axis calculated by the central axis calculating unit 1016. Specifically, a potential hazard may be the significance of a potential hazard or the type of a potential hazard (e.g., minor collision, major collision, or collision with a pedestrian or bicyclist when making a turn).

If the position calculated by the object position calculating unit 1013 is on the right of the central axis calculated by the central axis calculating unit 1016, the hazard predicting unit 1031A determines that the significance of a potential hazard is higher than that in the case where the position is on the left of the central axis. For example, when the lower end of the object 63 is located on the right of or above the central axis 82 of the road area as illustrated in FIG. 32, it can be defined that the object 63 is present in the distal side in the area of the traffic mirror 75. If the object 63 is present in the distal side in the area of the traffic mirror 75, the object 63 is located on the proximal side of the road when viewed from the vehicle. Thus, when the vehicle that is temporarily stationary starts traveling, the vehicle may collide with the object 63. For this reason, the hazard predicting unit 1031A determines that the significance of a potential hazard is high when the object 63 is present on the distal side in the area of the traffic mirror 75. On the other hand, if the object 63 is located on the left of or below the central axis 82, it can be defined that the object is present in the proximal side in the area of the traffic mirror 75. If the object 63 is present on the proximal side in the area of the traffic mirror 75, the object 63 is located on the distal side of the road when viewed from the vehicle. Thus, even if the vehicle that is temporarily stationary starts traveling, the likelihood of the vehicle colliding with the object 63 is low. For this reason, the hazard predicting unit 1031A can determine that the significance of a potential hazard is low when the object 63 is present on the proximal side in the area of the traffic mirror 75.

These cases will be described more specifically below with reference to the drawings.

Figure 34:
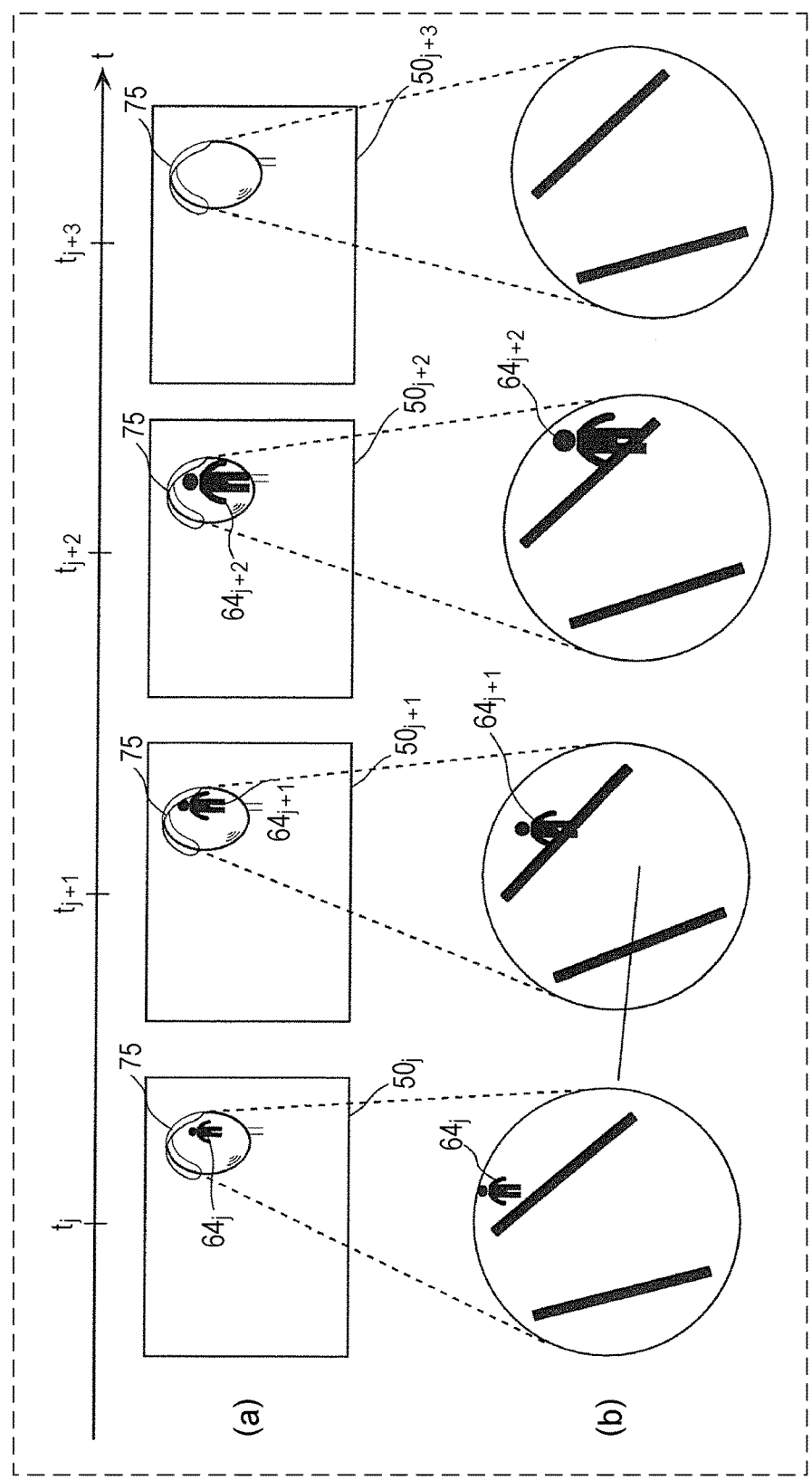
FIG. 34 is an explanatory diagram describing the significance of a potential hazard in the case where the object is located on the distal side in the traffic mirror in accordance with the second embodiment.

FIGS. 33, 34, and 35 are explanatory diagrams each describing the significance of a potential hazard in the case where an object 64 is present on the distal side in the traffic mirror 75 in accordance with the second embodiment. FIG. 33 illustrates a circumstance where images of the traffic mirror 75 having the object 64 on the distal side are captured from the vehicle 2a that is temporarily stationary. FIG. 34(*a*) illustrates the position and the size of the object 64 in the traffic mirror 75, and FIG. 34(*b*) corresponds to an enlarged view of the traffic mirror 75 and illustrates a relationship between the object 64 and the road. FIG. 35 illustrates a positional relationship among the object 64, the vehicle 2a, and the traffic mirror 75 illustrated in FIG. 34.

It is assumed that the object 64, which is a person, walks in a direction of the intersection on the proximal side of the road when viewed from the vehicle 2a as illustrated in FIG. 35. The system 1A mounted in the vehicle 2a that is temporarily stationary captures images $50_j$, $50_{j+1}$, and $50_{j+2}$ at time points $t_j$, $t_{j+1}$, and $t_{j+2}$, respectively, as illustrated in FIG. 34. In this case, the system 1A, specifically, the information processing apparatus 10A calculates the positions of objects $64_j$, $64_{j+1}$, and $64_{j+2}$ in the traffic mirror 75. Since the objects $64_j$, $64_{j+1}$, and $64_{j+2}$ are present on the distal side in the images $50_j$, $50_{j+1}$, and $50_{j+2}$, respectively, the objects $64_j$, $64_{j+1}$, and $64_{j+2}$ are actually located on the proximal side of the road when viewed from the vehicle 2a. That is, if the vehicle 2a that is temporarily stationary starts traveling, the vehicle 2a may collide with the object 64. Thus, the significance of a potential hazard is determined to be high.

The system 1A mounted in the vehicle 2a that is temporarily stationary may capture the images $50_j$, $50_{j+1}$, and $50_{j+2}$ and may calculate the positions and the sizes of the object $64_j$, $64_{j+1}$, and $64_{j+2}$. In this case, the continuously increasing sizes of the objects $64_j$, $64_{j+1}$, and $64_{j+2}$ indicates that the object 64 is approaching the vehicle 2a that is temporarily stationary at the intersection. Thus, the hazard predicting unit 1031A may determine that the significance of a potential hazard for the object $64_{j+2}$ is higher than that for the object $64_{j+1}$. As described above, the hazard predicting unit 1031A may determine the significance of a potential hazard in accordance with an amount of change in the size of the object in at least two consecutive time-series images. That is, when the size of the object is calculated by the object size calculating unit 1014 with reference to the traffic mirror, the hazard predicting unit 1031A may predict the significance of a potential hazard on the basis of the position of the object in the traffic mirror calculated by the object position calculating unit 1013 and the size of the object calculated by the object size calculating unit 1014.

In the case where the system 1A mounted in the vehicle 2a that is temporarily stationary captures the images $50_{j+2}$ and $50_{j+3}$, the object 64 is not in the traffic mirror 75 contained in the image $50_{j+3}$. However, because of the continuity which means that the object $64_{j+2}$ is in the traffic mirror 75 contained in the image $50_{j+2}$ captured at the time point $t_{j+2}$ which is immediately before, the hazard predicting unit 1031A may determine that the image $50_{j+3}$ is a blind spot image in which the object 64 may be present in a blind spot of the traffic mirror 75 and determine that the significance of a potential hazard for the image $50_{j+3}$ is higher than that for the object $64_{j+2}$.

Figure 37:
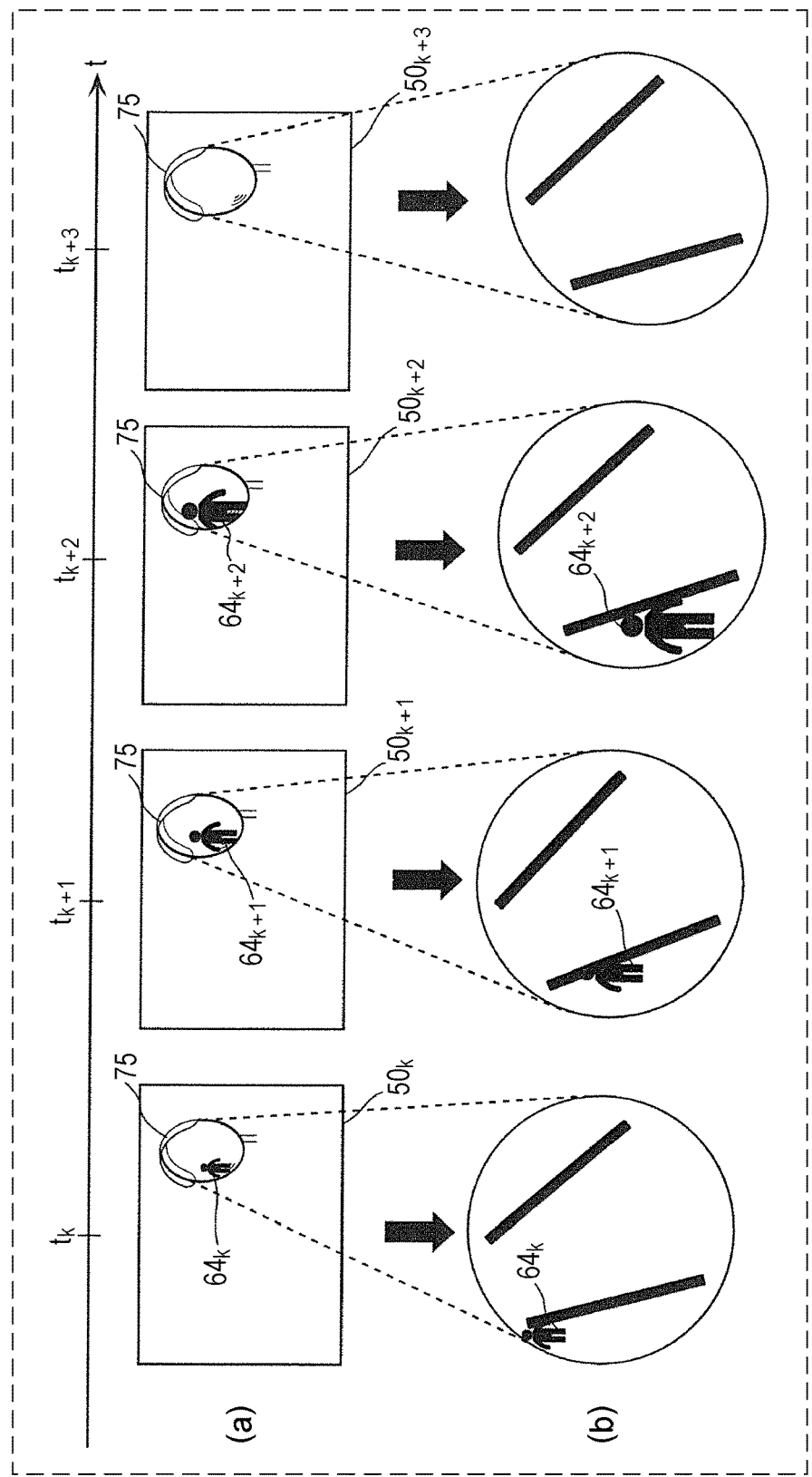
FIG. 37 is an explanatory diagram describing the significance of a potential hazard in the case where the object is located on the proximal side in the traffic mirror in accordance with the second embodiment.
Figure 38:
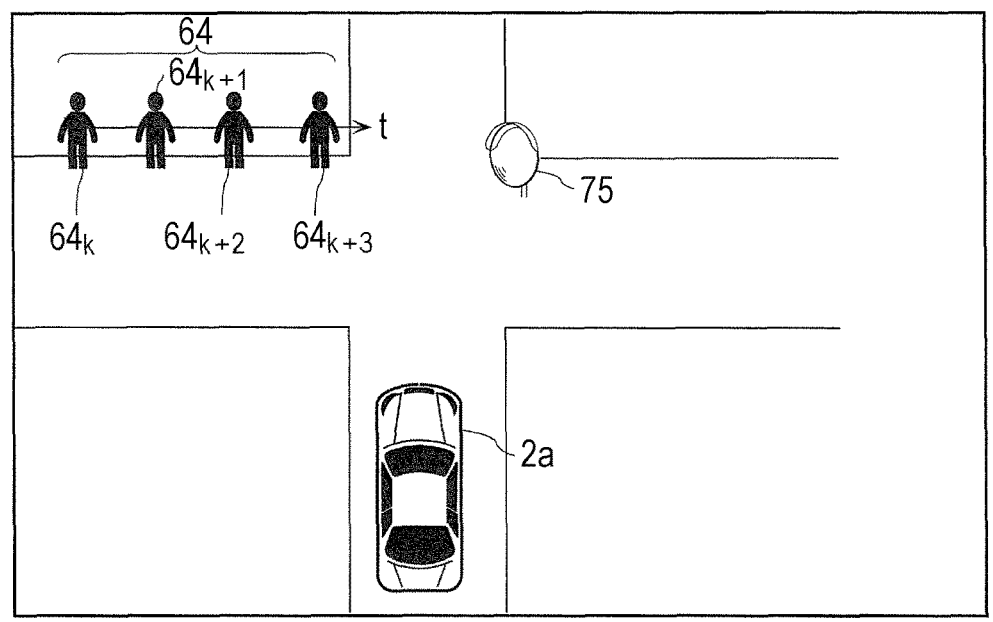
FIG. 38 is an explanatory diagram describing the significance of a potential hazard in the case where the object is located on the proximal side in the traffic mirror in accordance with the second embodiment.

FIGS. 36, 37, and 38 are explanatory diagrams describing the significance of a potential hazard in the case where the object 64 is located in the proximal side in the traffic mirror 75 in accordance with the second embodiment. FIG. 36 illustrates a circumstance where images of the traffic mirror 75 in which the object 64 is reflected on the proximal side are captured from the vehicle 2a that is temporarily stationary. FIG. 37(a) illustrates the position and the size of the object 64 in the traffic mirror 75, and FIG. 37(b) corresponds to an enlarged view of the traffic mirror 75 and illustrates a relationship between the object 64 and a road. FIG. 38 illustrates a positional relationship among the object 64, the vehicle 2a, and the traffic mirror 75 illustrated in FIG. 37.

It is assumed that the object 64, which is a person, is walking in a direction of an intersection on the distal side of the road when viewed from the vehicle 2a as illustrated in FIG. 38. It is also assumed that the system 1A mounted in the vehicle 2a that is temporarily stationary captures images $50_k$, $50_{k+1}$, and $50_{k+2}$ at time points $t_k$, $t_{k+1}$, and $t_{k+2}$, respectively, as illustrated in FIG. 37(a). In this case, the system 1A, specifically, the information processing apparatus 10A calculates the positions of the objects $64_k$, $64_{k+1}$, and $64_{k+2}$ in the traffic mirror 75. Since the objects $64_k$, $64_{k+1}$, and $64_{k+2}$ are present on the proximal side in the images $50_k$, $50_{k+1}$, and $50_{k+2}$, respectively, the objects $64_k$, $64_{k+1}$, and $64_{k+2}$ are located on the distal side of the road when viewed from the vehicle 2a. That is, when the vehicle 2a that is temporarily stationary starts traveling, the likelihood of the vehicle 2a colliding with the object 64 is low. Thus, the hazard predicting unit 1031A determines that the significance of a potential hazard is low.

The system 1A mounted in the vehicle 2a that is temporarily stationary may capture the images $50_k$, $50_{k+1}$, and $50_{k+2}$ and calculate the positions and the sizes of the objects $64_k$, $64_{k+1}$, and $64_{k+2}$, respectively. In this case, the continuity which means that the size of the object 64 increases in the order of the objects $64_k$, $64_{k+1}$, and $64_{k+2}$ indicates that the object 64 is approaching the vehicle 2a that is temporarily stationary at the intersection. Thus, the hazard predicting unit 1031A may determine that the significance of a potential hazard for the object $64_{k+2}$ is higher than that for the object $64_{k+1}$. As described above, the hazard predicting unit 1031A may predict the significance of a potential hazard in accordance with change information regarding a change in the size of an object in at least two consecutive time-series images and the position of the object in the traffic mirror. That is, the hazard predicting unit 1031A may predict the significance of a potential hazard on the basis of the position of the object in the traffic mirror calculated by the calculating unit 101A and the calculated size of the object.

The example where the change information regarding a change in the size is an amount of change in the size has been described above; however, the change information regarding a change in the size may be information indicating a type of the change. For example, the type of the change in the size may be an increase (or decrease) in the size or the size becoming greater than or equal to a predetermined size (or becoming less than the predetermined size).

In addition, in the case where the system 1A mounted in the vehicle 2a that is temporarily stationary captures the images $50_{k+2}$ and $50_{k+3}$, the object 64 is not in the traffic mirror 75 contained in the image $50_{k+3}$. However, because of the continuity which means that the object $64_{j+2}$ is in the traffic mirror 75 contained in the image $50_{j+2}$ captured at the time point $t_{j+2}$ that is immediately before, the hazard predicting unit 1031A may determine that the image $50_{j+3}$ is a blind spot image in which the object 64 may be present in a blind spot of the traffic mirror 75 and determine that the significance of a potential hazard for the object $64_{j+3}$ is higher than that for the object $64_{j+2}$.

The hazard predicting unit 1031A may also determine the significance of a potential hazard predicted if the vehicle 2a starts traveling without any precautions, on the basis of the position of the object in the traffic mirror calculated by the calculating unit 101A. For example, in the case where the position of the objet calculated by the calculating unit 101A is below the central line of the traffic mirror, the hazard predicting unit 1031A may determine that the significance of a potential hazard is higher than that in the case where the position is above the central line of the traffic mirror. In addition, in the case where the position of the object calculated by the calculating unit 101A is on the right of a predetermined position in the traffic mirror, the hazard predicting unit 1031A may determine that the significance of a potential hazard is higher than that in the case where the position is on the left of the predetermined position in the traffic mirror. The predetermined position may be a position of the central axis or a predetermined position near the center. In addition, the central line is, for example, a line passing through the center of the traffic mirror and may be a horizontal line, a vertical line, an oblique line, or a curve. If the central line is a horizontal line, the significance of a potential hazard may be determined depending on whether the position of the object is above or below the central line. If the central line is a vertical line, the significance of a potential hazard may be determined depending on whether the position of the object is on the right side or on the left side. If the central line is an oblique line or a curve, the significance of a potential hazard may be determined depending on whether the position of the object is on one side or on the other side.

Information Generating Unit 1032A

The information generating unit 1032A generates driving assist information on the basis of the position of the object in the traffic mirror calculated by the calculating unit 101A. For example, the information generating unit 1032A may generate driving assist information in accordance with a positional relationship between the object and an area in the traffic mirror determined from the road contained in the image. The information generating unit 1032A may generate driving assist information on the basis of the position of the object in the traffic mirror calculated in the calculating unit 101A and the size of the object calculated by the calculating unit 101A. For example, the information generating unit 1032A may generate driving assist information in accordance with change information regarding a change in the size of the object in at least two consecutive time-series images and the position of the object in the traffic mirror.

More specifically, the information generating unit 1032A may generate driving assist information in accordance with a positional relationship between the position of the object calculated in the object position calculating unit 1013 and the central axis calculated by the central axis calculating unit 1016. For example, in the case where the object is located above the central axis in an image, the information generating unit 1032A generates driving assist information for causing the vehicle to avoid the object.

In addition, the information generating unit 1032A may generate driving assist information on the basis of a positional relationship between the position of the object calculated by the calculating unit 101A and the central line of the traffic mirror. For example, the information generating unit 1032A may generate driving assist information for causing the vehicle to avoid the object (i) if the object is located on the right of the central line in the image in the case where the traffic mirror is directed toward left when viewed from the vehicle or (ii) if the object is located on the left of the central line in the image in the case where the traffic mirror is directed toward the right when viewed from the vehicle.

In the second embodiment, the information generating unit 1032A generates driving assist information in accordance with the significance of a potential hazard predicted by the hazard predicting unit 1031A. For example, the information generating unit 1032A may generate vehicle control information on the basis of a potential hazard predicted by the hazard predicting unit 1031A. In addition, the information generating unit 1032A may generate driving assist information in accordance with a potential hazard predicted from the position of the object in the traffic mirror in the case where the vehicle travels in a direction to be closer to the traffic mirror.

Note that the information generating unit 1032A may output, as the driving assist information, information indicating the significance of a potential hazard predicted by the hazard predicting unit 1031A. For example, the information generating unit 1032A outputs, as driving assist information, information indicating the significance of a potential hazard determined by the hazard predicting unit 1031A in accordance with an amount of change in the size of the object in at least two consecutive time-series images.

Further, the information generating unit 1032A may generate driving assist information including vehicle control information for causing the vehicle to temporarily stop on the basis of the position of the object calculated by the object position calculating unit 1013 and the determination of a blind spot image by the blind spot determining unit 103. Specifically, the information generating unit 1032A may generate driving assist information in the case where an object recognized by the recognizing unit 13 in at least one image among a plurality of consecutive time-series images is not recognized by the recognizing unit 13 in an image subsequent to the at least one image in the time series. In addition, the information generating unit 1032A may generate driving assist information on the basis of the position of the object in the at least one image and non-detection of the object in a subsequent image by the recognizing unit 13.

Information Output Unit 1033A

The information output unit 1033A outputs the driving assist information generated by the information generating unit 1032A.

The description has been given of the example where the driving assist information is control command information above; however, the driving assist information may be indication information. For example, the indication information may be information indicating a potential hazard (described later) or information indicating a recommended operation for the driver.

Now, an example of an output process performed by the output processing unit 102A thus configured is described with reference to the drawings.

Figure 39:
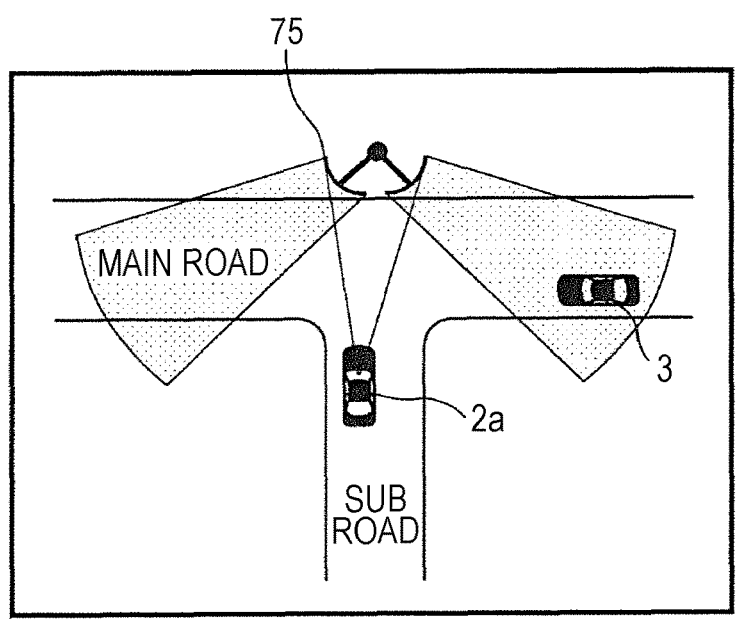
FIG. 39 is a diagram illustrating an example of a T-intersection assumed in the second embodiment.

FIG. 39 is a diagram illustrating an example of a T-intersection assumed in the second embodiment. FIG. 40 is an explanatory diagram illustrating another example of the output process performed by the output processing unit 102A in accordance with the second embodiment. FIG. 39 illustrates a circumstance where the vehicle 2a having the information processing apparatus 10A or the system 1A according to the second embodiment mounted therein is temporarily stationary at a T-intersection.

In this case, when the size of the object per period decreases or remains substantially unchanged, the output processing unit 102A, specifically, the hazard predicting unit 1031A, determines the significance of a potential hazard is low regardless of whether the position of the object in the traffic mirror 75 is on the distal side or on the proximal side as illustrated in FIG. 40. In this case, the output processing unit 102A, specifically, the information generating unit 1032A, may output information indicating that the significance of a potential hazard predicted by the hazard predicting unit 1031A is low. In addition, the information generating unit 1032A may generate vehicle control information for causing the vehicle 2a that is temporarily stationary to start traveling on the basis of the low significance of a potential hazard as illustrated in FIG. 40. In the example illustrated in FIG. 39, when the size of the vehicle 3 in the traffic mirror 75 decreases or remains substantially unchanged, it can be determined that the vehicle 3 is traveling in a direction to be away from the vehicle 2a. Thus, the hazard predicting unit 1031A determines that the significance of a potential hazard is low. The information generating unit 1032A may generate information indicating that the determined significance of a potential hazard is low or vehicle control information for causing the vehicle 2a that is temporarily stationary to start traveling.

When the position of the object in the traffic mirror 75 is on the proximal side and the size of the object in the traffic mirror 75 increases, the hazard predicting unit 1031A determines that the significance of a potential hazard is intermediate as illustrated in FIG. 40. In this case, the information generating unit 1032A may generate information indicating that the significance of a potential hazard determined by the hazard predicting unit 1031A is intermediate. In addition, the information generating unit 1032A may generate vehicle control information for causing the vehicle 2a that is temporarily stationary to start traveling slowly on the basis of the intermediate significance of a potential hazard as illustrated in FIG. 40. In the example illustrated in FIG. 39, when the position of the vehicle 3 in the traffic mirror 75 is on the proximal side and the size of the vehicle 3 in the traffic mirror 75 increases, it can be determined that the vehicle 3 is traveling in a direction to be closer to the vehicle 2a on the distal side of the road from the vehicle 2a. Thus, the hazard predicting unit 1031A determines that the significance of a potential hazard is intermediate. The information generating unit 1032A may generate information indicating that the determined significance of a potential hazard is intermediate or vehicle control information for causing the vehicle 2a that is temporarily stationary to start traveling slowly.

When the position of the object in the traffic mirror 75 is on the distal side and the size of the object in the traffic mirror 75 increases, the hazard predicting unit 1031A determines that the significance of a potential hazard is high as illustrated in FIG. 40. In this case, the information generating unit 1032A may generate information indicating that the significance of a potential hazard determined by the hazard predicting unit 1031A is high. In addition, the information generating unit 1032A may generate, on the basis of the high significance of a potential hazard, vehicle control information for causing the vehicle 2a that is temporarily stationary to start traveling after passage of the vehicle 3, which is a target, is confirmed using a sensor or the like as illustrated in FIG. 40. In the example illustrated in FIG. 39, when the size of the vehicle 3 in the traffic mirror 75 increases, it can be determined that the vehicle 3 is traveling in a direction to be closer to the vehicle 2a on the proximal side of the road. Thus, the hazard predicting unit 1031A determines that the significance of a potential hazard is high. The information generating unit 1032A may generate information indicating that the determined significance of a potential hazard is high or vehicle control information for causing the vehicle 2a that is temporarily stationary to start traveling after passage of the vehicle 3 is confirmed using a sensor or the like.

Operation of System 1A

Figure 41:
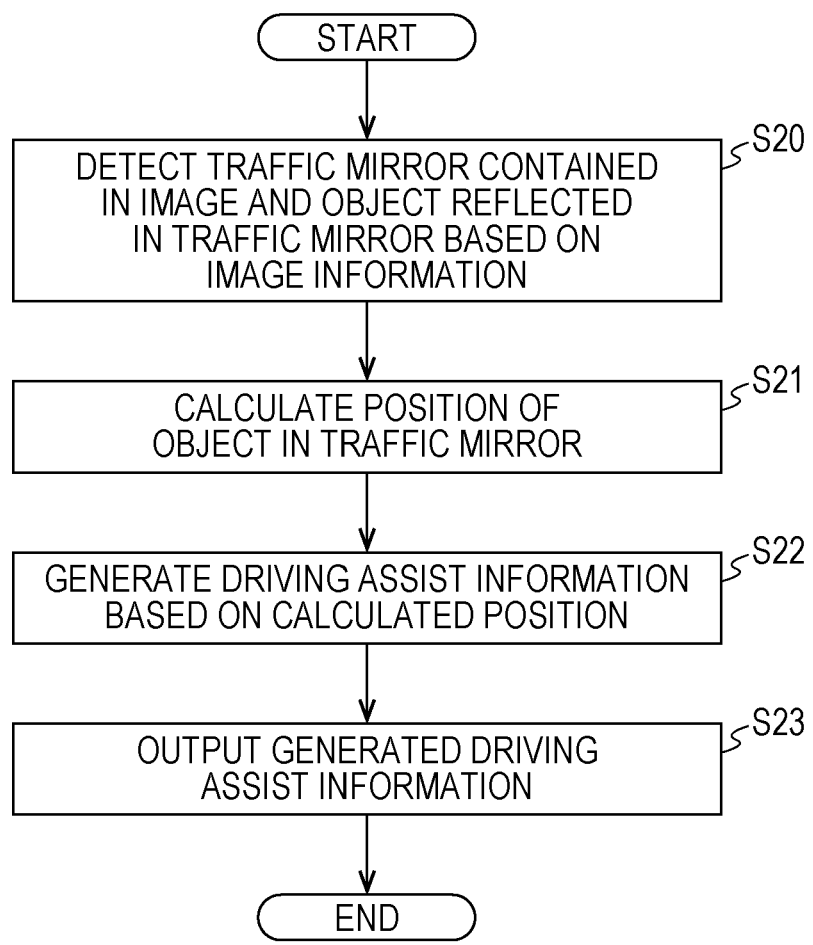
FIG. 41 is a flowchart illustrating an outline of an information processing method performed by the system in accordance with the second embodiment.
Figure 42:
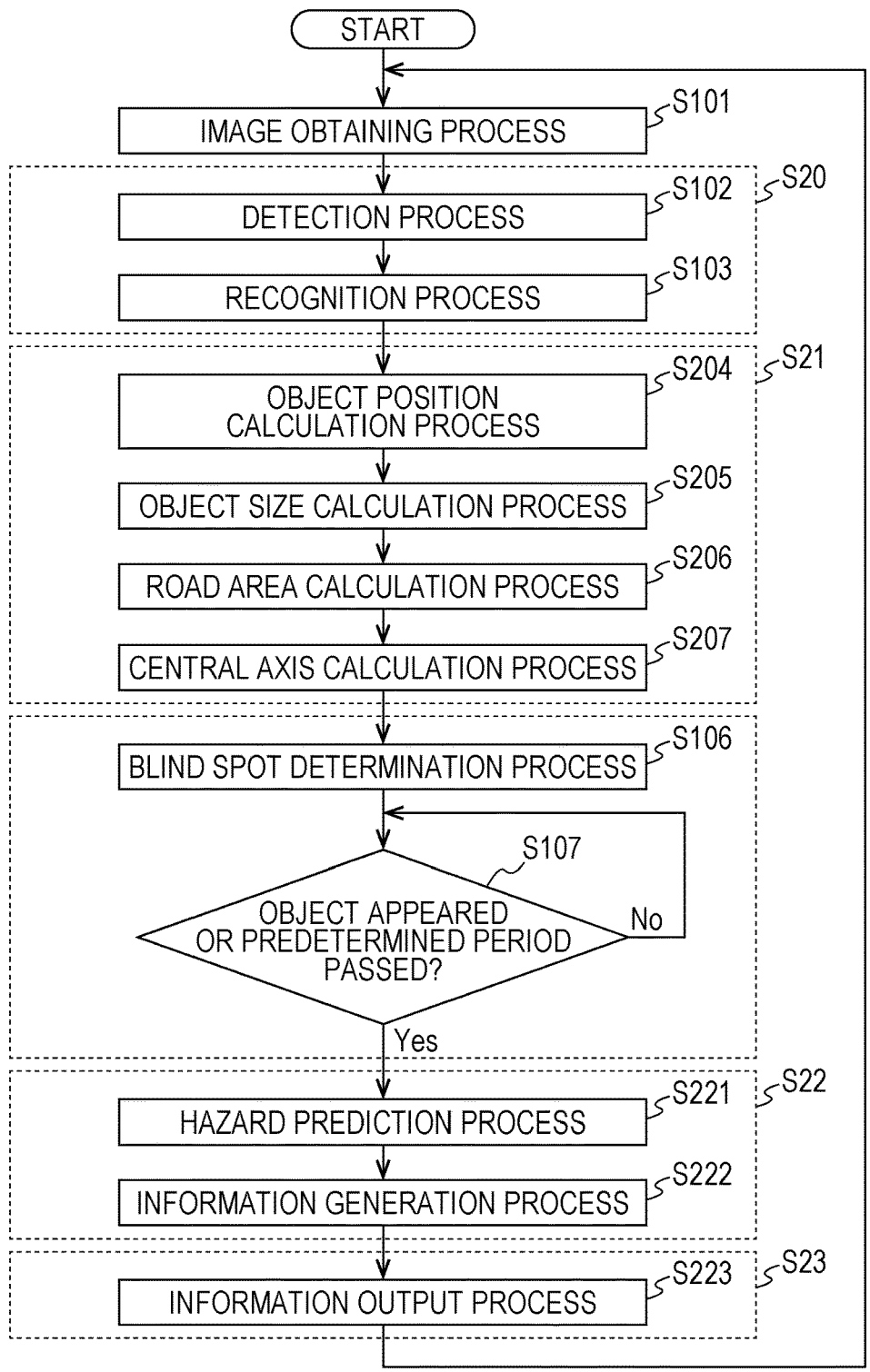
FIG. 42 is a flowchart illustrating details of the information processing method performed by the system in accordance with the second embodiment.

An information processing method performed by the system 1A thus configured will be described next. FIG. 41 is a flowchart illustrating an outline of the information processing method performed by the system 1A in accordance with the second embodiment. FIG. 42 is a flowchart illustrating details of the information processing method performed by the system 1A in accordance with the second embodiment. In FIG. 42, steps that are the same or substantially the same as those of FIG. 19 are denoted by the same reference signs to omit a detailed description thereof.

As illustrated in FIG. 41, the system 1A first detects a traffic mirror contained in an image and an object reflected in the traffic mirror on the basis of image information (S20). Then, the system 1A calculates the position of the object in the traffic mirror detected in S20 (S21). Then, the system 1A generates driving assist information on the basis of the position calculated in S21 (S22). Then, the system 1A outputs driving assist information generated in S22 (S23).

More specifically, as illustrated in FIG. 42, in the process of S21, the system 1A performs an object position calculation process to calculate the position of the object recognized in S103 in the traffic mirror detected in S102 (S204). Then, the system 1A performs an object size calculation process to calculate the size of the object recognized in S103 relative to the traffic mirror detected in S102 (S205). Then, the system 1A performs a road area calculation process to calculate a road area in the traffic mirror detected in S102 (S206). Then, the system 1A performs a central axis calculation process to calculate the central axis of the road area calculated in S206 (S207). Since details of the processes performed in S204 to S207 are as described above, a detailed description thereof is omitted here.

In the process of S22 described in FIG. 41, the system 1A performs a hazard prediction process to determine the significance of a potential hazard predicted if the vehicle starts traveling without any precautions, on the basis of the position of the object in the traffic mirror calculated in S21 (S221). Then, the system 1A performs an information generation process to generate, as driving assist information, information indicating the significance of a potential hazard determined in S221 or vehicle control information for controlling the vehicle on the basis of the significance of a potential hazard determined in S221 (S222). Since details of the processes performed in S221 and S222 are as described above, a detailed description thereof is omitted here.

Then, the system 1A performs the process of S23 described in FIG. 41. More specifically, in S23, the system 1A performs an information output process to output the driving assist information or the like generated in S222 (S223).

Advantageous Effects of Second Embodiment

As described above, the information processing apparatus 10A or the system 1A according to the second embodiment is able to determine the significance of a potential hazard by using a traffic mirror at a place such as an intersection where the view from a vehicle is obstructed or restricted and to generate and output driving assist information for the vehicle on the basis of the determined significance of a potential hazard. Consequently, the information processing apparatus 10A or the system 1A according to the second embodiment is able to assist safe driving of a vehicle having the information processing apparatus 10A or the system 1A mounted therein.

Specifically, when an object such as a person is in a traffic mirror at a place such as an intersection where the view from a vehicle is obstructed or restricted, the object may abruptly come out to the place. In such a case, if the vehicle that is temporarily stationary starts traveling soon, the vehicle may collide with the object. In addition, traffic mirrors have characteristics that the left and the right are reversed therein.

Thus, in the case where an object, such as a person, is reflected to be on the distal side in a traffic mirror, the object is moving in the vicinity of a road shoulder closer to the vehicle that is temporarily stationary at a place, compared with the case where an object, such as a person, is reflected to be on the proximal side in the traffic mirror. That is, in the case where an object, such as a person, is reflected to be on the distal side in the traffic mirror, if the vehicle that is temporarily stationary starts traveling soon, the likelihood of the vehicle colliding with the object is higher than in the case where an object, such as a person, is reflected to be on the proximal side in the traffic mirror.

For this reason, in the second embodiment, the significance of a potential hazard is determined in accordance with the position of an object in a traffic mirror contained in images that can be captured from a vehicle that is temporarily stationary and, if necessary, a change in the size of the object. In this way, the information processing apparatus 10A according to the second embodiment is able to determine the significance of a potential hazard by using a traffic mirror.

In the case where a vehicle in which automated driving is enabled includes the information processing apparatus 10A, for example, the vehicle is able to determine the significance of a potential hazard by using a traffic mirror in a manner as described above. Thus, the vehicle is able to perform control in accordance with the determined significance of a potential hazard.

In addition, as described above, the information processing apparatus 10A according to the second embodiment may generate driving assist information for causing the vehicle to avoid the object if the object is located above the central axis in the image, for example. With such information, the vehicle successfully avoids the object when the object is located closely to the vehicle, and the safety of the object and the vehicle can be guaranteed.

In addition, the information processing apparatus 10A according to the second embodiment may generate driving assist information for causing the vehicle to avoid the object (i) if the object is located on the right side of the central line in the image in the case where the traffic mirror is directed toward the left when viewed from the vehicle or (ii) if the object is located on the left side of the central line in the image in the case where the traffic mirror is directed toward the right when viewed from the vehicle, for example. With such information, the vehicle successfully avoids the object when the object is located closely to the vehicle, and the safety of the object and the vehicle can be guaranteed. In addition, complex processing such as determination of the central axis of the road can be omitted, and consequently the processing speed can be increased.

As described above, the information processing apparatus 10A or the system 1A according to the second embodiment is able to assist safe driving of a vehicle by using a traffic mirror at a place such as an intersection where the view from the vehicle is obstructed or restricted.

The description has been given of the example where the vehicle is temporarily stationary above; however, the second embodiment may be applied to a vehicle that is moving at a low speed (speed lower than a predetermined speed).

First Modification

In the second embodiment, the description has been given of the case where the significance of a potential hazard is determined in accordance with the position of the object in the traffic mirror and, if necessary, the size of the object; however, the criteria to be used in the determination of the significance of a potential hazard are not limited to these ones. The recognizing unit 13 may recognize an attribute of an object reflected in a traffic mirror, and the calculating unit 101A may determine the significance of a potential hazard by taking into account the attribute. In a first modification, a description will be given of the case where the significance of a potential hazard is determined by further taking into account an attribute regarding the moving speed of the object reflected in the traffic mirror.

FIG. 43 is an explanatory diagram illustrating an example of a hazard prediction process performed by the output processing unit 102A in accordance with the first modification of the second embodiment. In FIG. 43, content that is the same or substantially the same as that illustrated in FIG. 40 is denoted by the same expression to omit a detailed description thereof. In addition, FIG. 43 illustrates an example of the hazard prediction process performed for a T-intersection by the output processing unit 102A in accordance with the first modification. Since the vehicle control information based on the low, intermediate, or high significance of a potential hazard may be the same as that illustrated in FIG. 40, an illustration thereof is omitted in FIG. 43.

As illustrated in FIG. 43, in the case where an object is a person, the hazard predicting unit 1031A may determine the significance of a potential hazard in the same or substantially the same manner as that illustrated in FIG. 40. On the other hand, in the case where the object is a bicycle, a motor cycle, or an automobile that has a higher moving speed than a person, the hazard predicting unit 1031A may determine a higher significance of a potential hazard than in the case where the object is a person in accordance with the moving speed.

As described above, in the first modification, the output processing unit 102A generates driving assist information in accordance with an attribute of an object recognized by the recognizing unit 13 and outputs the generated driving assist information.

Second Modification

In the first modification, the description has been given of the case where the significance of a potential hazard is determined by further taking into account an attribute regarding the moving speed of an object reflected in a traffic mirror; however, the attribute used in the determination is not limited to the one regarding the moving speed. In the case where an object reflected in a traffic mirror is a person, the hazard predicting unit 1031A may determine the significance of a potential hazard by further taking into account an attribute regarding the age of the person. This case will be described below as a second modification.

FIG. 44 is an explanatory diagram illustrating an example of a hazard prediction process performed by the output processing unit 102A in accordance with the second modification of the second embodiment. In FIG. 44, content that is the same or substantially the same as that illustrated in FIG. 40 is denoted by the same expression to omit a detailed description thereof. In addition, FIG. 44 illustrates an example of the hazard prediction process performed for a T-intersection by the output processing unit 102A in the second modification. Since the vehicle control information based on the low, intermediate, or high significance of a potential hazard may be the same as that illustrated in FIG. 40, an illustration thereof is omitted in FIG. 44.

As illustrated in FIG. 44, in the case where an object is a person and the person is a child or an elderly person, the hazard predicting unit 1031A may determine the significance of a potential hazard in the same or substantially same manner as that illustrated in FIG. 40. On the other hand, if the object is a person and the person is neither a child nor an elderly person, the hazard predicting unit 1031A may determine a higher significance of a potential hazard than in the case where the person is a child or an elderly person.

As described above, in the second modification, in the case where an attribute of an object recognized by the recognizing unit 13 indicates a person, the output processing unit 102A generates driving assist information that changes depending on information regarding the age of the object recognized by the recognizing unit 13 and outputs the generated driving assist information. The example where the information regarding the age represents a generation of the person has been described above; however, the information regarding the age may represent the age or the age range of the person.

Third Modification

In the second modification, the description has been given of the case where, if an object reflected in a traffic mirror is a person, the significance of a potential hazard is determined by further taking into account an attribute regarding the age of the person; however, the attribute used in the determination is not limited to the attribute regarding the age. In the case where an object reflected in a traffic mirror is a person, the hazard predicting unit 1031A may determine the significance of a potential hazard by further taking into account an attribute regarding whether or not the person is behaving carelessly. Specifically, a careless behavior indicates a behavior without looking ahead. Examples of a behavior without looking ahead include looking at a mobile terminal, such as a smartphone, or a book while moving. This case will be described below as a third modification.

Figures 45, 46:
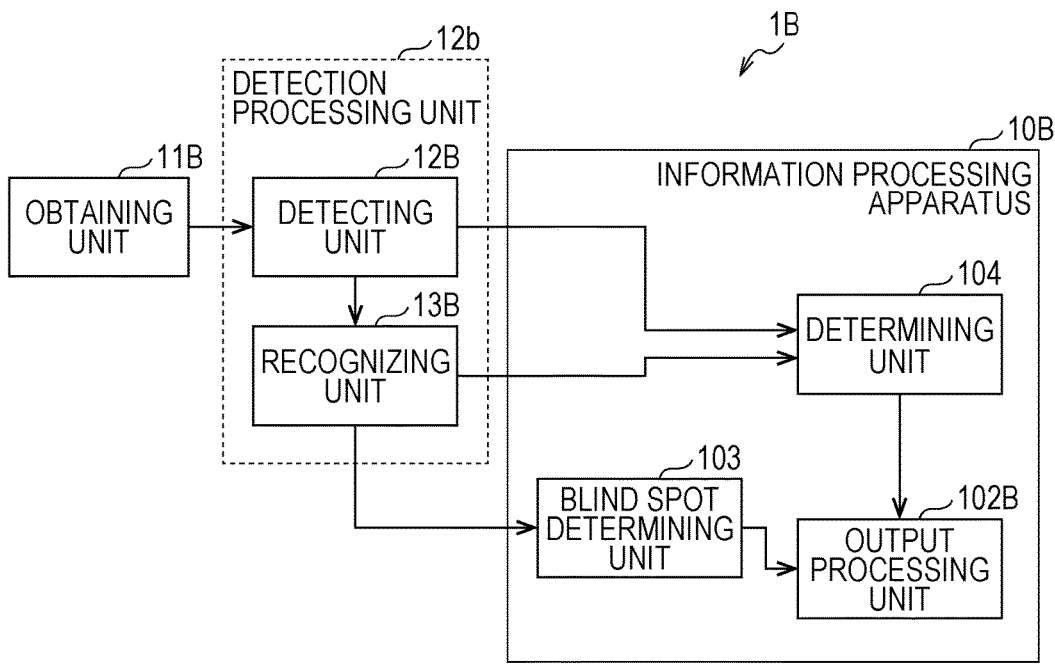
FIG. 45 is an explanatory diagram illustrating an example of a hazard prediction process performed by the output processing unit in accordance with a third modification of the second embodiment.
FIG. 46 is a block diagram illustrating an example of a configuration of a system in accordance with a third embodiment.

FIG. 45 is an explanatory diagram illustrating an example of a hazard prediction process performed by the output processing unit 102A in accordance with the third modification of the second embodiment. In FIG. 45, content that is the same or substantially the same as that illustrated in FIG. 40 is denoted by the same expression to omit a detailed description thereof. In addition, FIG. 45 illustrates an example of the hazard prediction process performed for a T-intersection by the output processing unit 102A in accordance with the third modification. Since the vehicle control information based on the low, intermediate, or high significance of a potential hazard may be the same as that illustrated in FIG. 40, an illustration thereof is omitted in FIG. 45.

As illustrated in FIG. 45, in the case where an object is a person and the person does not take a behavior without looking ahead, which involves the person looking at a mobile terminal while moving, that is, the person is not looking at a mobile terminal while walking, the hazard predicting unit 1031A may determine the significance of a potential hazard in the same or substantially the same manner as that illustrated in FIG. 40. On the other hand, in the case where the object is a person and the person is taking a behavior without looking ahead, that is, the person is looking at a mobile terminal while walking, the hazard predicting unit 1031A may determine a higher significance of a potential hazard than in the case where the person is not taking a behavior without looking ahead. The example where the careless behavior is a behavior without looking ahead has been described above; however, the careless behavior may indicate a behavior, such as the person looking ahead but looking above or below while moving or the person looking at a specific object, such as a baby buggy or a ball, located in front of the person while moving.

As described above, in the third modification, in the case where an attribute of an object recognized by the recognizing unit 13 indicates a person, the output processing unit 102A generates driving assist information that changes depending on whether the person recognized by the recognizing unit 13 is behaving carelessly and outputs the generated driving assist information.

Third Embodiment

Traffic mirrors are installed at places where the view from a vehicle is obstructed or restricted other than T-intersections or circular-curve roads mentioned in the first and second embodiments.

For example, it is highly likely that a vehicle comes out fast without slowing down at places near the exit of a limited-access road. It is also highly likely that a person or a vehicle abruptly comes out at an entrance/exit of a parking lot of a shopping mall. In addition, it is highly likely that a person abruptly comes out at an entrance/exit of a shopping mall since many people go into and come out from the shopping mall. It is also likely that a vehicle that does not slow down departs from the lane, that is, veers at places where bends follow the straight road where the speed of a vehicle often becomes high, for example. The likelihood of a traffic accident is high at such places where the view from the vehicle is obstructed or restricted and where traffic mirrors are installed. However, the significance of a potential hazard changes depending on the position of a vehicle of interest or the installed place of a traffic mirror because conditions, such as whether the place of interest is a place where many people are present or a place where vehicles travel at high speed, change.

Accordingly, in the third embodiment, a description will be given of an information processing apparatus and the like capable of assisting safe driving of a vehicle that is temporarily stationary or is traveling by taking into account characteristics of an installed place of a traffic mirror. Hereinafter, a vehicle having a system or an information processing apparatus according to the third embodiment mounted therein is referred to as a vehicle of interest.

Configuration of System 1B

FIG. 46 is a block diagram illustrating an example of a configuration of a system 1B according to the third embodiment. Components that are the same or substantially the same as the components illustrated in FIGS. 1 and 26 are denoted by the same reference signs to omit a detailed description thereof.

The system 1B illustrated in FIG. 46 differs from the system 1 according to the first embodiment in configurations of an obtaining unit 11B, a detection processing unit 12b, and an information processing apparatus 10B. Like the system 1, the system 1B is mounted in a vehicle, for example, an automobile and is able to output driving assist information for the vehicle, that is, the vehicle of interest, by using a traffic mirror.

In the third embodiment, the information processing apparatus 10B also takes into account characteristics of an installed place of a traffic mirror, in order to assist safe driving of the vehicle of interest that is temporary stationary or is traveling.

Obtaining Unit 11B

Like the image obtaining unit 11, the obtaining unit 11B obtains image information representing images captured by an image capturing apparatus mounted in the vehicle of interest. The obtaining unit 11B may obtain map information. Map information is information representing a dynamically changing state at a geographical position or static geographical information. Map information includes additional map information representing at least one of a traffic accident, a traffic jam, a road construction, a road surface condition, and weather on a map.

Note that the obtaining unit 11B differs from the image obtaining unit 11 according to the first embodiment in that the obtaining unit 11B is capable of obtaining map information; however, the rest is the same. In the obtaining unit 11B, the sensing unit 111 may obtain map information via communication, and the obtained map information may be stored in the image storage unit 112.

Detection Processing Unit 12b

The detection processing unit 12b detects a traffic mirror and an object reflected in the traffic mirror. In the third embodiment, the detection processing unit 12b detects a traffic mirror located near the vehicle of interest on the basis of the map information or image information representing images captured by the image capturing apparatus mounted in the vehicle.

The detection processing unit 12b includes a detecting unit 12B and a recognizing unit 13B as illustrated in FIG. 46.

Detecting Unit 12B

The detecting unit 12B detects a traffic mirror. More specifically, the detecting unit 12B detects a traffic mirror located near the vehicle of the interest on the basis of the image information. For example, the detecting unit 12B detects a traffic mirror located near the vehicle of interest on the basis of the image information by using traffic mirror identification information or a traffic mirror classifier. Note that a method for detecting a traffic mirror located near the vehicle of interest on the basis of the image information is substantially the same as the method for detecting a traffic mirror in an image described in the first embodiment.

The detecting unit 12B may also detect a traffic mirror located near the vehicle of interest on the basis of map information. For example, the detecting unit 12B detects a traffic mirror located near the vehicle of interest on the basis of the position of the vehicle and an installed place of the traffic mirror indicated by the map information.

Recognizing Unit 13B

The recognizing unit 13B recognizes an object reflected in a traffic mirror on the basis of image information representing images captured by the image capturing apparatus mounted in the vehicle of interest. The recognizing unit 13B also recognizes an environment near the traffic mirror on the basis of the image information by using traffic mirror identification information or a traffic mirror classifier. In this way, the recognizing unit 13B recognizes an object in a traffic mirror contained in an image obtained by the obtaining unit 11B and an environment near the traffic mirror.

Note that the obtaining unit 11B and the detection processing unit 12b may be included the information processing apparatus 10B, as in the first and second embodiments.

Information Processing Apparatus 10B

The information processing apparatus 10B according to the third embodiment outputs driving assist information for the vehicle of interest that is temporarily stationary or is traveling by using a traffic mirror. In the third embodiment, the information processing apparatus 10B also takes into account characteristics of an installed place of the traffic mirror, in order to assist safe driving of the vehicle of interest that is temporarily stationary or is traveling. In this case, the significance of a potential hazard that changes depending on the position of the vehicle of interest or the installed place of the traffic mirror can be taken into account as described above.

More specifically, the information processing apparatus 10B includes an output processing unit 102B, the blind spot determining unit 103, and a determining unit 104 as illustrated in FIG. 46. The information processing apparatus 10B illustrated in FIG. 46 differs from the information processing apparatus 10 according to the first embodiment in that the determining unit 104 is added and the output processing unit 102B has a different configuration. Details of the configurations of the determining unit 104 and the output processing unit 102B will be described below.

Determining Unit 104

Figure 47:
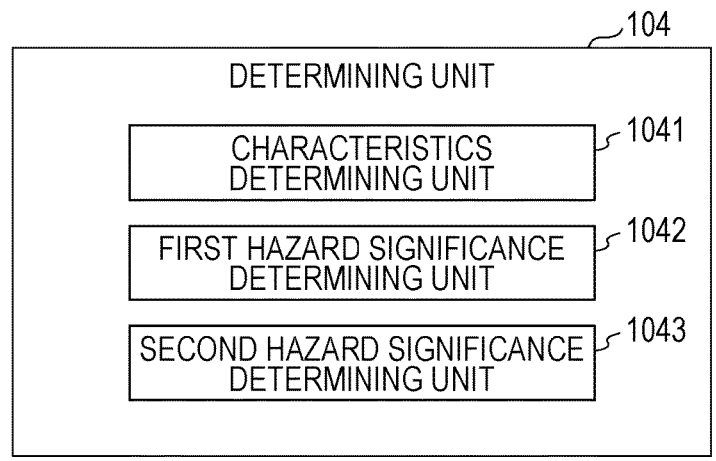
FIG. 47 is a diagram illustrating an example of a functional configuration of a determining unit in accordance with the third embodiment.

FIG. 47 is a diagram illustrating an example of a functional configuration of the determining unit 104 in accordance with the third embodiment.

The determining unit 104 includes a characteristics determining unit 1041, a first hazard significance determining unit 1042, and a second hazard significance determining unit 1043 as illustrated in FIG. 47.

Characteristics Determining Unit 1041

The characteristics determining unit 1041 determines characteristics of an installed place of a traffic mirror. The characteristics include a state of the road at the installed place of the traffic mirror and a passage state of an object at the installed place of the traffic mirror.

More specifically, the characteristics determining unit 1041 determines characteristics of an installed place of a traffic mirror on the basis of map information. For example, the characteristics determining unit 1041 determines the characteristics on the basis of map information for an area near the traffic mirror. The characteristics determining unit 1041 may determine a state of the road and a passage state of an object from additional map information.

In addition, the characteristics determining unit 1041 may determine characteristics of an installed place of a traffic mirror on the basis of image information. For example, the characteristics determining unit 1041 may determine characteristics on the basis of an environment near the traffic mirror. The characteristics determining unit 1041 may determine a state of the road or a passage state of an object from the environment near the traffic mirror.

Further, the characteristics determining unit 1041 may determine the characteristics on the basis of an object reflected in a traffic mirror. In this case, the characteristics determining unit 1041 may determine the characteristics on the basis of whether an object is reflected in the traffic mirror or whether many objects are reflected in the traffic mirror.

Note that the characteristics determining unit 1041 may further include an installed place obtaining unit that obtains information regarding characteristics of the installed place of a traffic mirror contained in an image obtained by continuously capturing images of the scenery ahead of the vehicle of interest in time series. The installed place obtaining unit is not necessarily included in the characteristics determining unit 1041 and may be included in the detection processing unit 12b or the obtaining unit 11B.

For example, the installed place obtaining unit is capable of determining an installed place of a traffic mirror contained in an image obtained by continuously capturing images of the scenery ahead of the vehicle of interest in time series, from Global Positioning System (GPS) information indicating the position of the vehicle of interest. In this case, the installed place obtaining unit obtains information regarding characteristics of the installed place of a traffic mirror from the obtained installed place and a local dynamic map containing accident blackspot information, traffic jam information, road construction information, traffic accident site information, and road surface information.

Characteristics of the installed place of a traffic mirror are the aforementioned road conditions. Specifically, the road conditions include accident blackspots where accidents often occur or actually occurred, a road congestion degree such as the number of vehicles or whether a traffic jam is present, a road surface condition such as the road being covered with fallen leaves, fallen rocks, or snow or the road being frozen, and the presence or absence of a road construction. Examples of the accident blackspots include a place near the exit of a limited-access road, an entrance/exit of a parking lot of a shopping mall or an entrance/exit of a shopping mall, or a corner that follows a straight road where vehicles often travel at high speed.

Figure 48:
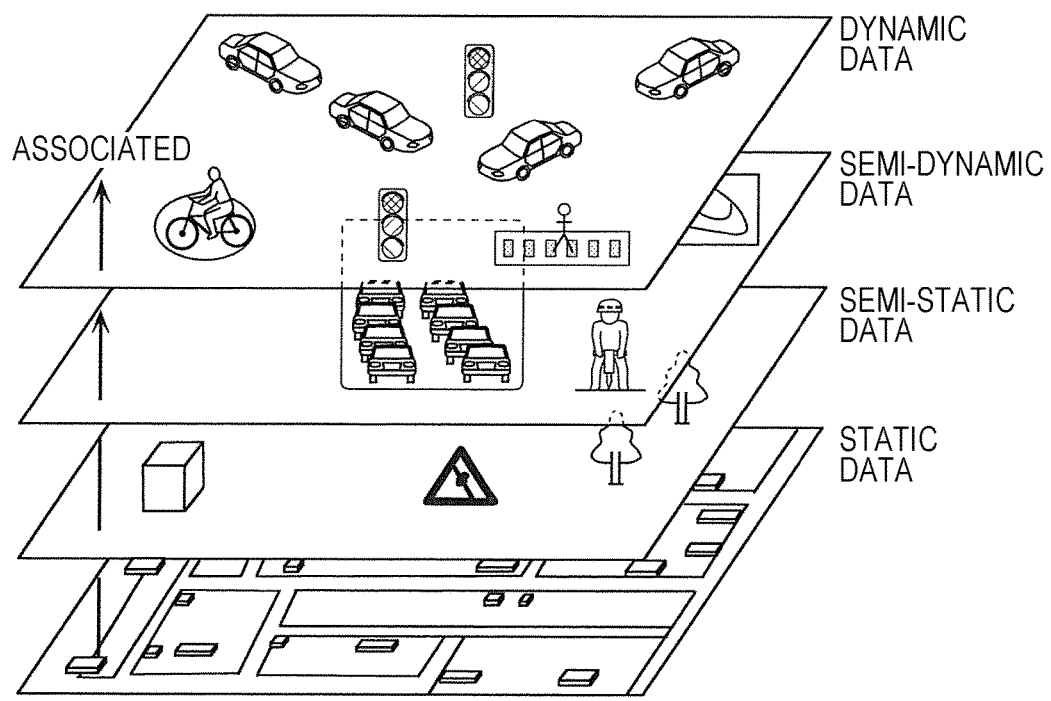
FIG. 48 is an explanatory diagram illustrating an example of a dynamic map.
Figure 49A:
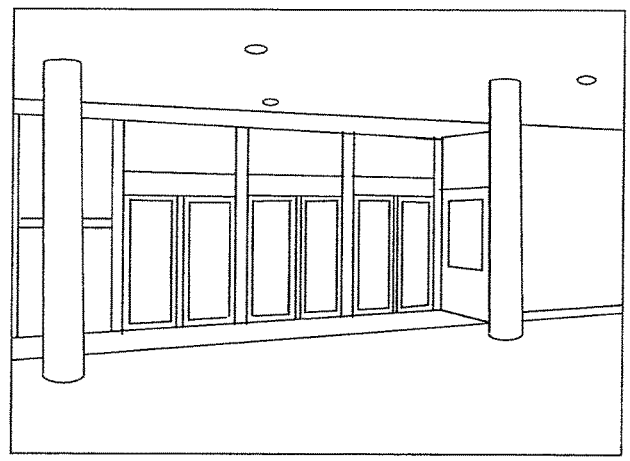
FIG. 49A illustrates an example of an environment near a traffic mirror contained in an image in accordance with the third embodiment.
Figure 49B:
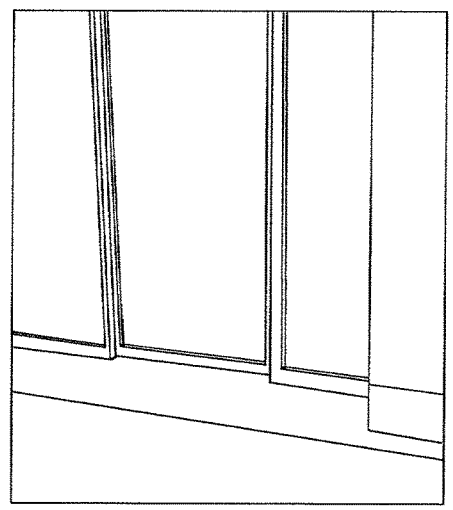
FIG. 49B illustrates an example of an environment near the traffic mirror contained in an image in accordance with the third embodiment.
Figure 49C:
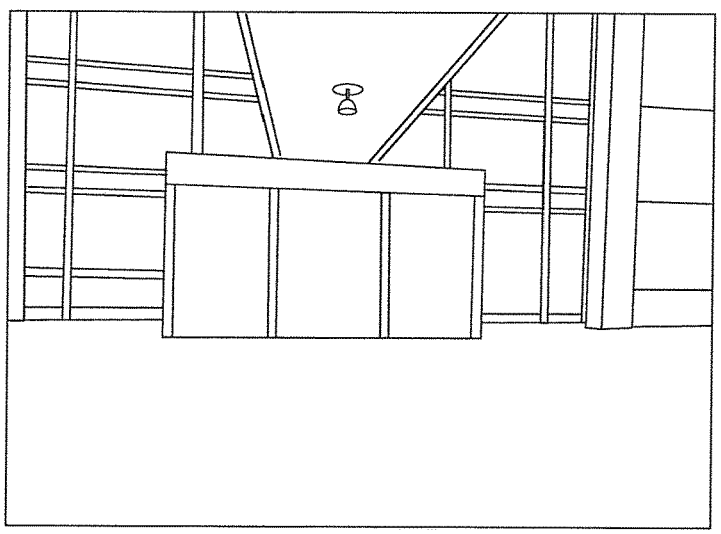
FIG. 49C illustrates an example of an environment near the traffic mirror contained in an image in accordance with the third embodiment.
Figure 49D:
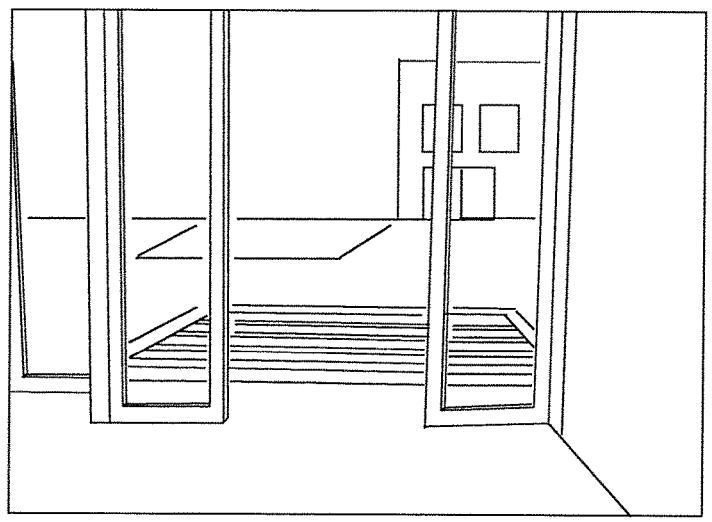
FIG. 49D illustrates an example of an environment near the traffic mirror contained in an image in accordance with the third embodiment.
Figure 49E:
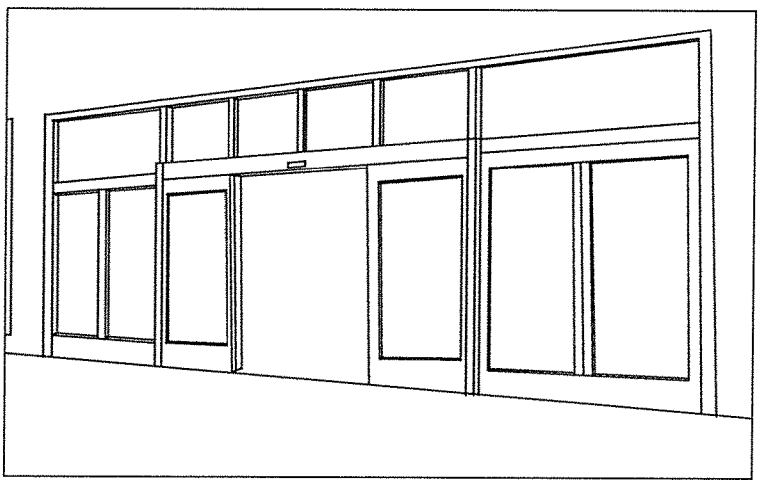
FIG. 49E illustrates an example of an environment near the traffic mirror contained in an image in accordance with the third embodiment.

FIG. 48 is an explanatory diagram illustrating an example of a dynamic map. A local dynamic map is a partial dynamic map near a predetermined place and is enhanced map information obtained by superimposing dynamic information that instantly changes near the position of the vehicle of interest onto high-definition map data of the roads and features, which is static information. In the local dynamic map, semi-static data, semi-dynamic data, and dynamic data are superimposed on lowest-layer base data, which is static information including road surface information, lane information, and three-dimensional structure information as illustrated in FIG. 48, for example. Examples of the semi-static data include traffic restrictions information, road construction information, and wide-area weather information. Examples of the semi-dynamic data include traffic accident information, traffic jam information, and narrow-area weather information. Examples of the dynamic data include anticipated information obtained by intelligent transport systems (ITS), such as near vehicle information, pedestrian information, and traffic signal information.

In addition, the installed place obtaining unit may obtain the information regarding characteristics of an installed place of a traffic mirror from the installed position obtained by using GPS information and an environment near the traffic mirror contained in an image captured by an onboard camera mounted in the vehicle of interest. Further, the characteristics of the installed place of the traffic mirror may be a passage state of an object at the installed place. Specifically, the passage state of an object at the installed place indicates whether people or vehicles enter or exit or a degree at which people or vehicles enter or exit.

In the third embodiment, the information regarding characteristics of an installed place of a traffic mirror is information that is obtained by using map information or a captured image described above and that indicates whether the installed place is a place where a traffic accident is likely to occur.

Each of FIGS. 49A to 49E illustrates an example of an environment near a traffic mirror assumed in the third embodiment. Examples of the environment near the traffic mirror include an entrance/exit of a commercial facility, such as a shopping mall, illustrated in FIGS. 49A to 49E. Since the entrances/exits of commercial facilities have variations as illustrated in FIGS. 49A to 49E, the installed place obtaining unit may include a commercial-facility-entrance/exit classifier obtained by performing learning (such as deep learning) in which images of entrances/exists of commercial facilities are used as the input. In this way, the installed place obtaining unit is able to obtain information representing places where a traffic accident is likely to occur, such as an entrance/exit of a parking lot of a shopping mall or an entrance/exit of a shopping mall, from images of an environment near the traffic mirror.

Figure 50:
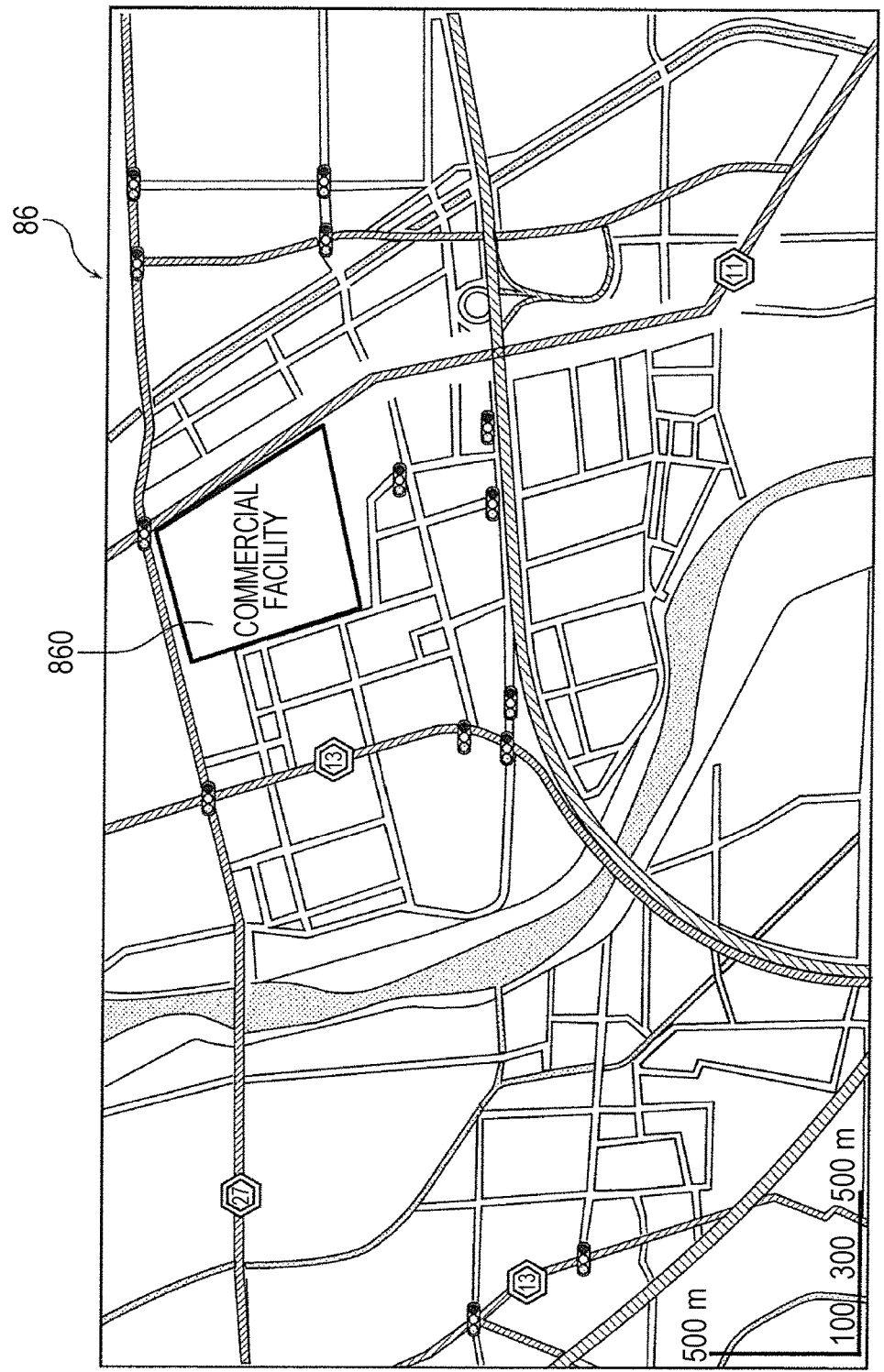
FIG. 50 is a diagram illustrating an example of a map used by an installed position obtaining unit in accordance with the third embodiment.

FIG. 50 is a diagram illustrating an example of a map 86 used by the installed place obtaining unit in accordance with the third embodiment.

The installed place obtaining unit may obtain information regarding characteristics of the installed place of a traffic mirror from an environment near the traffic mirror contained in an image after the map 86 illustrated in FIG. 50 indicating the current position of the vehicle of interest is acquired because of the following reason. In the case where the vehicle of interest is currently located near a commercial facility 860, such as a shopping mall, on the map 86 illustrated in FIG. 50 and the vehicle of interest is then located in an indoor parking lot of the commercial facility 860, where GPS information is not obtainable, it can be determined that the current location of the vehicle of interest is at the commercial facility 860. In this way, the installed place obtaining unit is able to more accurately obtain information representing a place where a traffic accident is likely to occur, such as an entrance/exit of a parking lot of the commercial facility 860, from an environment near a traffic mirror contained in an image.

In the case where the vehicle of interest is currently located at an outdoor parking lot of a shopping mall, where GPS information is obtainable, the installed place obtaining unit may obtain information regarding characteristics of the installed place of the traffic mirror from geographic information.

First Hazard Significance Determining Unit 1042

The first hazard significance determining unit 1042 determines the first significance of a potential hazard, which indicates how high a traffic accident involving the vehicle of interest is likely to occur on the basis of the information regarding the characteristics of the installed place of the traffic mirror obtained by the installed place obtaining unit. The first hazard significance determining unit 1042 may determine the first significance of a potential hazard on the basis of the information regarding the characteristics of the installed place of the traffic mirror which is determined (obtained) on the basis of the current position of the vehicle of interest and the map information, or may determine the first significance of a potential hazard on the basis of the information regarding the characteristics of the installed place of the traffic mirror which is determined (obtained) on the basis of an environment near the traffic mirror contained in an image.

First, an example of how the first hazard significance determining unit 1042 determines the first significance of a potential hazard on the basis of geographical information will be described with reference to FIGS. 51 to 54. FIGS. 51 to 54 are diagrams each illustrating an example of a local dynamic map used by the first hazard significance determining unit 1042 for the determination in accordance with the third embodiment. The same or substantially the same components are denoted by the same reference signs in FIGS. 51 to 54.

Figure 51:
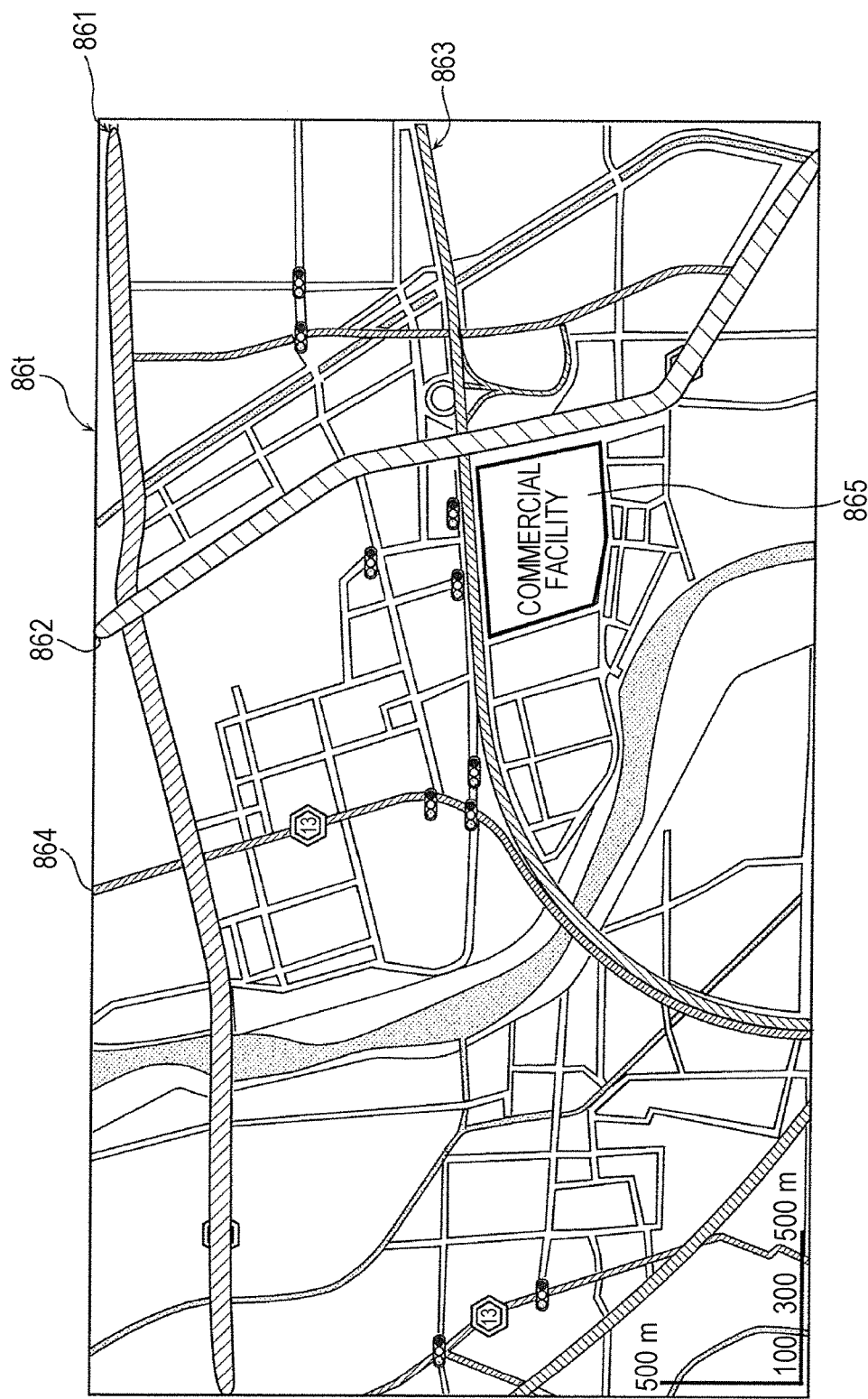
FIG. 51 is a diagram illustrating an example of a local dynamic map used by a first hazard significance determining unit in determination in accordance with the third embodiment.

FIG. 51 illustrates an example of a local dynamic map 86$t$ obtained based on the current position of the vehicle of interest during commuting hours. It is assumed in FIG. 51 that roads 861, 862, and 864 and an expressway 863 are roads along which the vehicle of interest possibly travels. It is also assumed that the local dynamic map 86$t$ contains traffic accident information and traffic jam information that dynamically change and information indicating that there are many commuters who use the road 861.

In this case, the first hazard significance determining unit 1042 determines that the likelihood of a traffic accident involving the vehicle of interest occurring is the highest for the road 861 that is hatched and determines that the first significance of a potential hazard of the road 861 is high. In addition, the first hazard significance determining unit 1042 determines that the likelihood of a traffic accident involving the vehicle of interest occurring is the next highest for the road 862 that is hatched, links to the road 861, and extends near a commercial facility 865, and determines that the first significance of a potential hazard of the road 862 is intermediate. The first hazard significance determining unit 1042 determines that the likelihood of a traffic accident involving the vehicle of interest occurring is low for the expressway 863 and the road 864, other than the roads 861 and 862, and determines that the first significance of a potential hazard of the expressway 863 and the road 864 is low.

Figure 52:
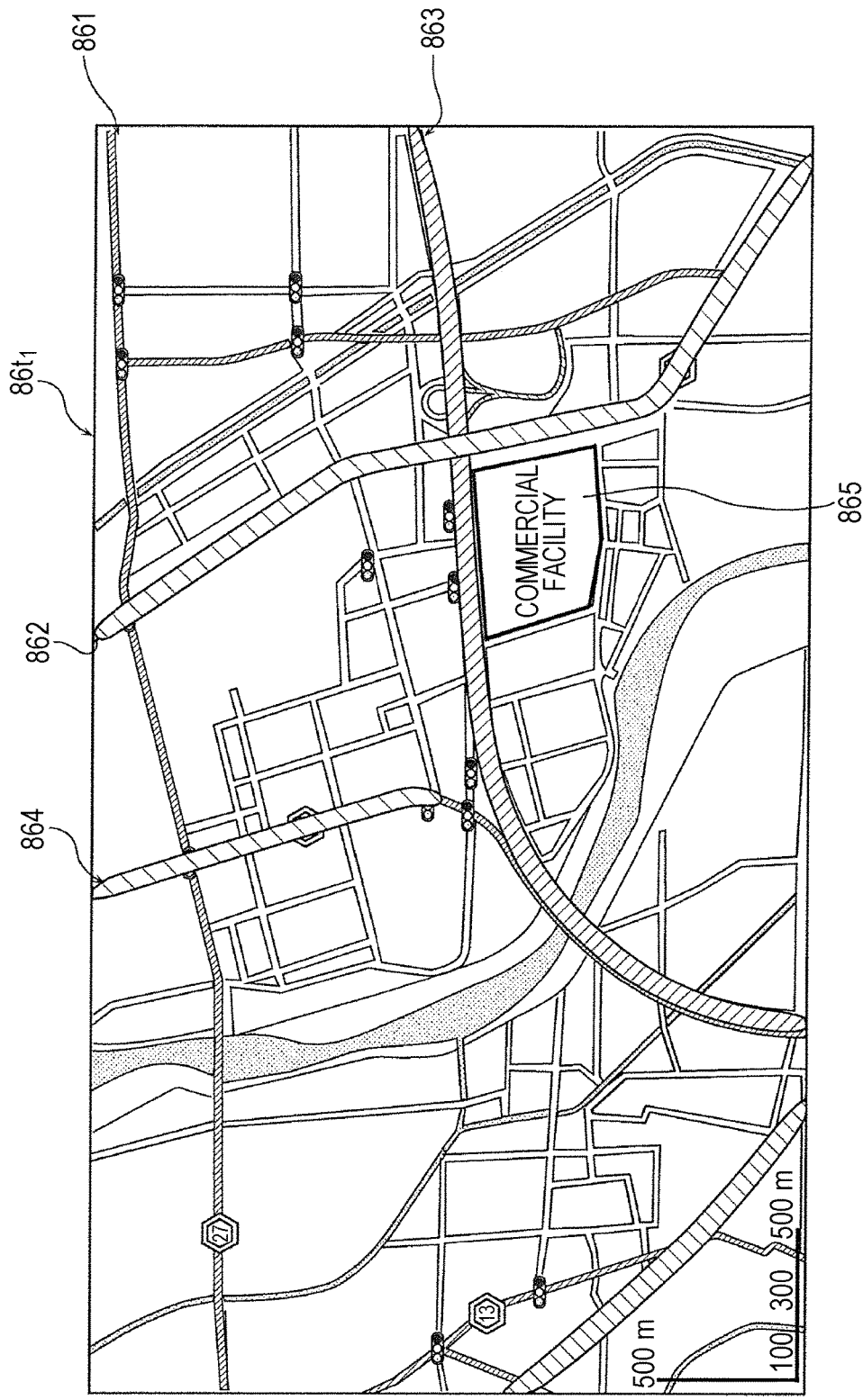
FIG. 52 is a diagram illustrating an example of a local dynamic map used by the first hazard significance determining unit in determination in accordance with the third embodiment.

FIG. 52 illustrates an example of a local dynamic map 86$t_1$ obtained based on the current position of the vehicle of interest during long consecutive holidays. It is assumed that the local dynamic map 86$t_1$ contains, as traffic accident information and traffic jam information that dynamically change, information indicating that a traffic jam and a traffic accident are likely to occur at the expressway 863. In this case, the first hazard significance determining unit 1042 determines that the likelihood of a traffic accident involving the vehicle of interest occurring is the highest for the expressway 863 that is hatched and determines that the first significance of a potential hazard of the expressway 863 is high. In addition, the first hazard significance determining unit 1042 determines that the likelihood of a traffic accident involving the vehicle of interest occurring is the next highest for the roads 862 and 864 that are hatched and link to the expressway 863 and determines that the first significance of a potential hazard of the roads 862 and 864 is intermediate. The first hazard significance determining unit 1042 determines that the likelihood of a traffic accident involving the vehicle of interest occurring is low for the road 862 other than the expressway 863 and the roads 862 and 864 and determines that the first significance of a potential hazard is low.

Figure 53:
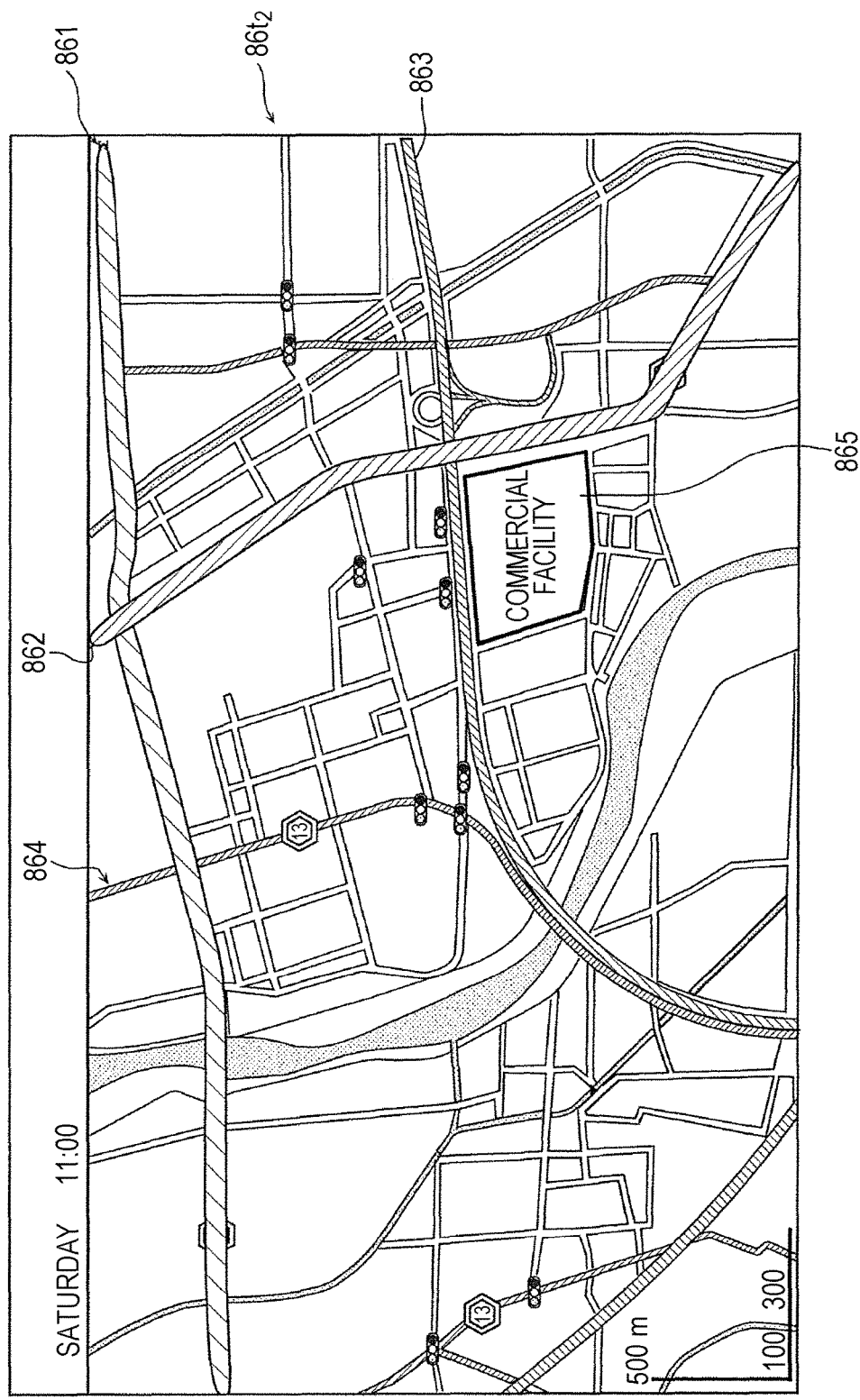
FIG. 53 is a diagram illustrating an example of a local dynamic map used by the first hazard significance determining unit in determination in accordance with the third embodiment.

FIG. 53 illustrates an example of a local dynamic map 86$t_2$ obtained on the basis of the current position of the vehicle of interest on Saturday or Sunday afternoon. It is assumed that the local dynamic map 86$t_2$ contains, as traffic accident information and traffic jam information that dynamically change, a graph indicating hours in which the commercial facility 865 such as a shopping mall is crowded and information indicating that a traffic jam and a traffic accident often occur at the road 862 that links to the commercial facility 865.

In this case, the first hazard significance determining unit 1042 determines that the likelihood of a traffic accident involving the vehicle of interest occurring is the highest for the road 862 that is hatched and determines that the first significance of a potential hazard of the road 862 is high. In addition, the first hazard significance determining unit 1042 determines that the likelihood of a traffic accident involving the vehicle of interest occurring is the next highest for the road 861 that is hatched and links to the road 862 and determines that the first significance of a potential hazard is intermediate. The first hazard significance determining unit 1042 determines that the likelihood of a traffic accident involving the vehicle of interest occurring is low for the expressway 863 and the road 864 other than the roads 861 and 862 and determines that the first significance of a potential hazard is low.

Figure 54:
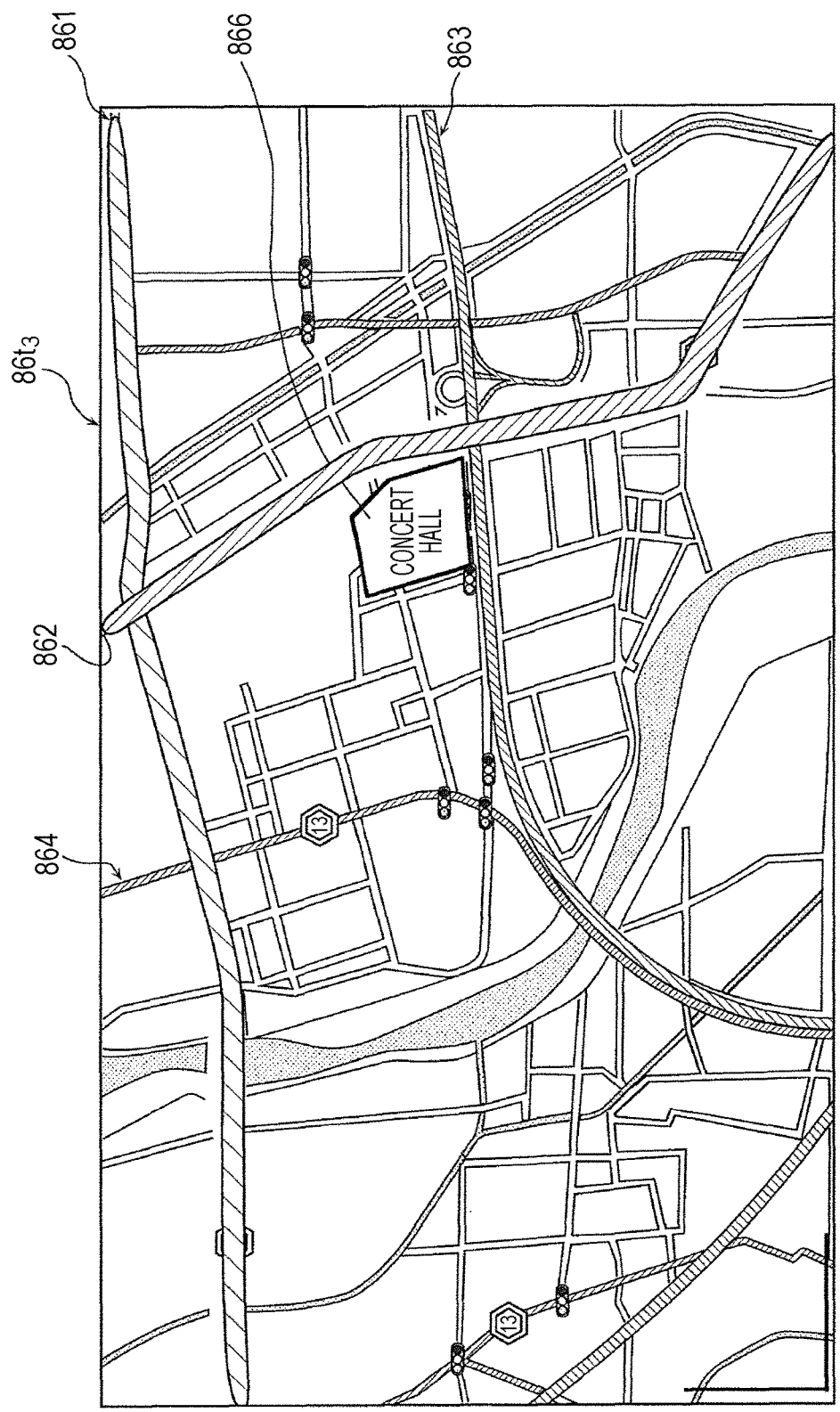
FIG. 54 is a diagram illustrating an example of a local dynamic map used by the first hazard significance determining unit in determination in accordance with the third embodiment.

FIG. 54 illustrates a local dynamic map 86$t_3$ obtained based on the current position of the vehicle of interest when an event is held. In addition, it is assumed that the local dynamic map 86$t_3$ contains, as traffic accident information and traffic jam information that dynamically change, information indicating that a traffic jam and a traffic accident often occur at the road 862 that links to a concert hall 866 where an event such as a concert is held.

In this case, the first hazard significance determining unit 1042 determines that the likelihood of a traffic accident involving the vehicle of interest occurring is the highest for the road 862 that is hatched and determines that the first significance of a potential hazard of the road 862 is high. In addition, the first hazard significance determining unit 1042 determines that the likelihood of a traffic accident involving the vehicle of interest occurring is the next highest for the road 861 that is hatched and links to the road 862 and determines that the first significance of a potential hazard of the road 861 is intermediate. The first hazard significance determining unit 1042 determines that the likelihood of a traffic accident involving the vehicle of interest occurring is low for the expressway 863 and the road 864 other than the roads 861 and 862 and determines that the first significance of a potential hazard is low.

As described above, the first hazard significance determining unit 1042 is able to determine the first significance of a potential hazard on the basis of geographical information representing traffic accident information and traffic jam information that dynamically change depending on the current position of the vehicle of interest, the current time or the season, and whether or not an event or the like is currently held.

An example of how the first hazard significance determining unit 1042 determines the first significance of a potential hazard on the basis of an environment near a traffic mirror contained in an image will be described next. It is assumed that the installed place obtaining unit has obtained information regarding characteristics of the installed place of a traffic mirror, such as the entrance/exit of a shopping mall or a parking lot, from the environment near the traffic mirror contained in an image.

When it is deduced that the vehicle of interest is currently located at a parking lot of a commercial facility such as a shopping mall on the basis of the information regarding the characteristics of the installed place of the traffic mirror, the first hazard significance determining unit 1042 determines the likelihood of a traffic accident involving the vehicle of interest occurring is intermediate and determines that the first significance of a potential hazard is intermediate because of the following reason. Since many cars are parked at the parking lot, the view from the vehicle is obstructed or restricted in the parking lot when the vehicle of interest moves around. When the information regarding the characteristics of the installed place of the traffic mirror indicates that the vehicle of interest is currently located at an entrance/exit of a commercial facility such as a shopping mall or of a parking lot, the first hazard significance determining unit 1042 determines that the likelihood of a traffic accident involving the vehicle of interest occurring is high and determines that the first significance of a potential hazard is high because of the following reason. Since many people are moving around at the entrance/exit of the commercial facility, the likelihood of the vehicle of interest colliding with a person is high. In addition, since the road is usually sloped at the entrance/exist of the parking lot of a shopping mall, an automobile or a motor cycle may accelerate or suddenly comes out after stopping temporarily. Thus, the likelihood of the vehicle of interest colliding with an automobile or a motor cycle is high.

Second Hazard Significance Determining Unit 1043

The second hazard significance determining unit 1043 determines the second significance of a potential hazard, which is the significant of a potential hazard predicted if the vehicle of interest starts traveling, on the basis of the first significance of a potential hazard determined by the first hazard significance determining unit 1042 and the presence or absence of an object in a traffic mirror.

When there is an object reflected in a mirror, the likelihood of the vehicle of interest colliding with the object increases if the vehicle of interest starts traveling. Thus, the second hazard significance determining unit 1043 determines the second significance of a potential hazard by taking into account such a likelihood. More specifically, in the case where the first significance of a potential hazard determined by the first hazard significance determining unit 1042 is low, the second hazard significance determining unit 1043 determines that the second significance of a potential hazard is intermediate if an object is in a traffic mirror and determines that the second significance of a potential hazard is low if no object is in a traffic mirror. In the case where the first significance of a potential hazard determined by the first hazard significance determining unit 1042 is intermediate, the second hazard significance determining unit 1043 determines that the second significance of a potential hazard is intermediate if an object is in a traffic mirror and determines that the second significance of a potential hazard is low if no object is in a traffic mirror. In addition, in the case where the first significance of a potential hazard determined by the first hazard significance determining unit 1042 is high, the second hazard significance determining unit 1043 determines that the second significance of a potential hazard is high if an object is in a traffic mirror and determines the second significance of a potential hazard is intermediate if no object is in a traffic mirror.

For example, when the vehicle of interest is located at an entrance/exit of a parking lot of a shopping mall, the first hazard significance determining unit 1042 determines that the first significance of a potential hazard is intermediate as described above since an automobile or a motor cycle may accelerate or suddenly come out after stopping temporarily at the entrance/exit. When an automobile is in a traffic mirror, the likelihood of the vehicle of interest located near the entrance/exit colliding with the automobile is high. Thus, the second hazard significance determining unit 1043 determines that the second significance of a potential hazard is intermediate. On the other hand, when no automobile is in the traffic mirror, the likelihood of the vehicle of interest colliding with an automobile is low. Thus, the second hazard significance determining unit 1043 determines that the second significance of a potential hazard is low.

In addition, when the vehicle of interest is located near an entrance/exit of a shopping mall, the first hazard significance determining unit 1042 determines that the first significance of a potential hazard is high as described above since many people go into or come out from the shopping mall at the entrance/exit and the likelihood of a traffic accident occurring increases. When a person is in a traffic mirror, the likelihood of the vehicle of interest located near the entrance/exit colliding with the person is high. Thus, the second hazard significance determining unit 1043 determines that the second significance of a potential hazard is high. On the other hand, when no person is in a traffic mirror, the likelihood of the vehicle of interest colliding with a person is low. Thus, the second hazard significance determining unit 1043 determines that the second significance of a potential hazard is intermediate.

The second hazard significance determining unit 1043 may determine the second significance of a potential hazard on the basis of only the first significance of a potential hazard determined by the first hazard significance determining unit 1042. In this case, the second hazard significance determining unit 1043 may determine that the second significance of a potential hazard is high if the first significance of a potential hazard determined by the first hazard significance determining unit 1042 is high. Similarly, the second hazard significance determining unit 1043 may determine that the second significance of a potential hazard is intermediate or low if the first significance of a potential hazard determined by the first hazard significance determining unit 1042 is intermediate or low.

In this way, the determining unit 104 determines the second significance of a potential hazard, as the characteristics of an installed place of a traffic mirror contained in an image obtained by continuously capturing images of the scenery ahead of the vehicle of interest in time series.

When the vehicle of interest is located in an area near an exit of a limited-access road or the like, for example, it is probable that an automobile exits from the limited-access road or an expressway without slowing down and the likelihood of a traffic accident occurring increases in the area. Thus, the first hazard significance determining unit 1042 may determine that the first significance of a potential hazard is high. Then, if an automobile is in a traffic mirror, the second hazard significance determining unit 1043 may determine that the second significance of a potential hazard is high since the likelihood of the vehicle of interest colliding with the automobile is high. On the other hand, no automobile is in a traffic mirror, the second hazard significance determining unit 1043 may determine that the second significance of a potential hazard is intermediate since the likelihood of the vehicle of interest colliding with an automobile is low.

The description has been given of the example where the presence or absence of an object reflected in a traffic mirror is used to determine the second significance of a potential hazard above; however, the kind of an object reflected in a traffic mirror, the number of objects reflected in the traffic mirror, or a density of objects reflected in the traffic mirror may be used to determine the second significance of a potential hazard.

Output Processing Unit 102B

The output processing unit 102B generates driving assist information on the basis of the characteristics determined by the determining unit 104 and outputs the generated driving assist information. The driving assist information may include control command information regarding a behavior of the vehicle or indication information to be provided to an occupant of the vehicle. The indication information may include information indicating a potential hazard predicted from the characteristics of the installed place of a traffic mirror.

Figure 55:
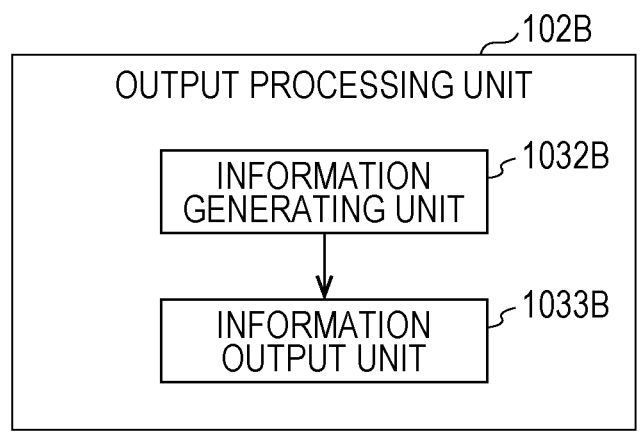
FIG. 55 is a diagram illustrating an example of a functional configuration of an output processing unit in accordance with the third embodiment.

FIG. 55 is a diagram illustrating an example of a functional configuration of the output processing unit 1026 in accordance with the third embodiment.

In the third embodiment, the output processing unit 102B includes an information generating unit 1032B and an information output unit 1033B as illustrated in FIG. 55.

Information Generating Unit 1032B

The information generating unit 1032B generates driving assist information on the basis of the characteristics determined by the determining unit 104. The information generating unit 1032B may generate driving assist information in accordance with the determined state of the road or the determined passage state of an object. For example, if the determined state of the road or the determined passage state of an object indicates that the vehicle of interest is hindered from traveling safely, the information generating unit 10326 generates driving assist information for causing the vehicle to decelerate, stop, or detour. In addition, for example, the information generating unit 10326 may generate driving assist information for causing the vehicle to decelerate, stop, or detour when it is determined by the determining unit 104 that an object is in a traffic mirror or many objects are in the traffic mirror.

The information generating unit 1032B may generate driving assist information in accordance with a potential hazard predicted from the characteristics.

The output processing unit 102B may generate driving assist information also when a blind spot image described above is determined as in the second embodiment. For example, when the blind spot determining unit 103 determines a blind spot image, the output processing unit 102B may generate, as driving assist information, information for causing the vehicle to temporarily stop for a predetermined period.

Information Output Unit 1033B

The information output unit 10336 outputs the driving assist information generated by the information generating unit 1032B.

An example of an output process performed by the output processing unit 1026 thus configured will be described below with reference to the drawings. FIGS. 56 and 57 are explanatory diagrams illustrating an example of the output process performed by the output processing unit 102B in accordance with the third embodiment. FIG. 56 illustrates an example of vehicle control information for the vehicle of interest output for a circular-curve road by the output processing unit 102B in accordance with the third embodiment. FIG. 57 illustrates an example of vehicle control information for the vehicle of interest output for a T-intersection by the output processing unit 102B in accordance with the third embodiment. FIGS. 56 and 57 also illustrate the first significance of a potential hazard based on the installed place of a traffic mirror and the presence or absence of an object reflected in a traffic mirror in addition to the second significance of a potential hazard and the vehicle control information.

When the vehicle of interest is located at a circular-curve road, the output processing unit 102B may generate and output vehicle control information for controlling the vehicle as illustrated in FIG. 56 on the basis of the second significance of a potential hazard determined by the second hazard significance determining unit 1043. On the other hand, when the vehicle of interest is located at a T-intersection, the output processing unit 102B may generate and output vehicle control information for controlling the vehicle as illustrated in FIG. 57 on the basis of the second significance of a potential hazard determined by the second hazard significance determining unit 1043.

Since a relationship between the second significance of a potential hazard and the vehicle control information is substantially the same as the relationship between the significance of a potential hazard and the vehicle control information described in FIGS. 16 and 17, a detailed description thereof is omitted.

Operation of System 1B

Figure 59:
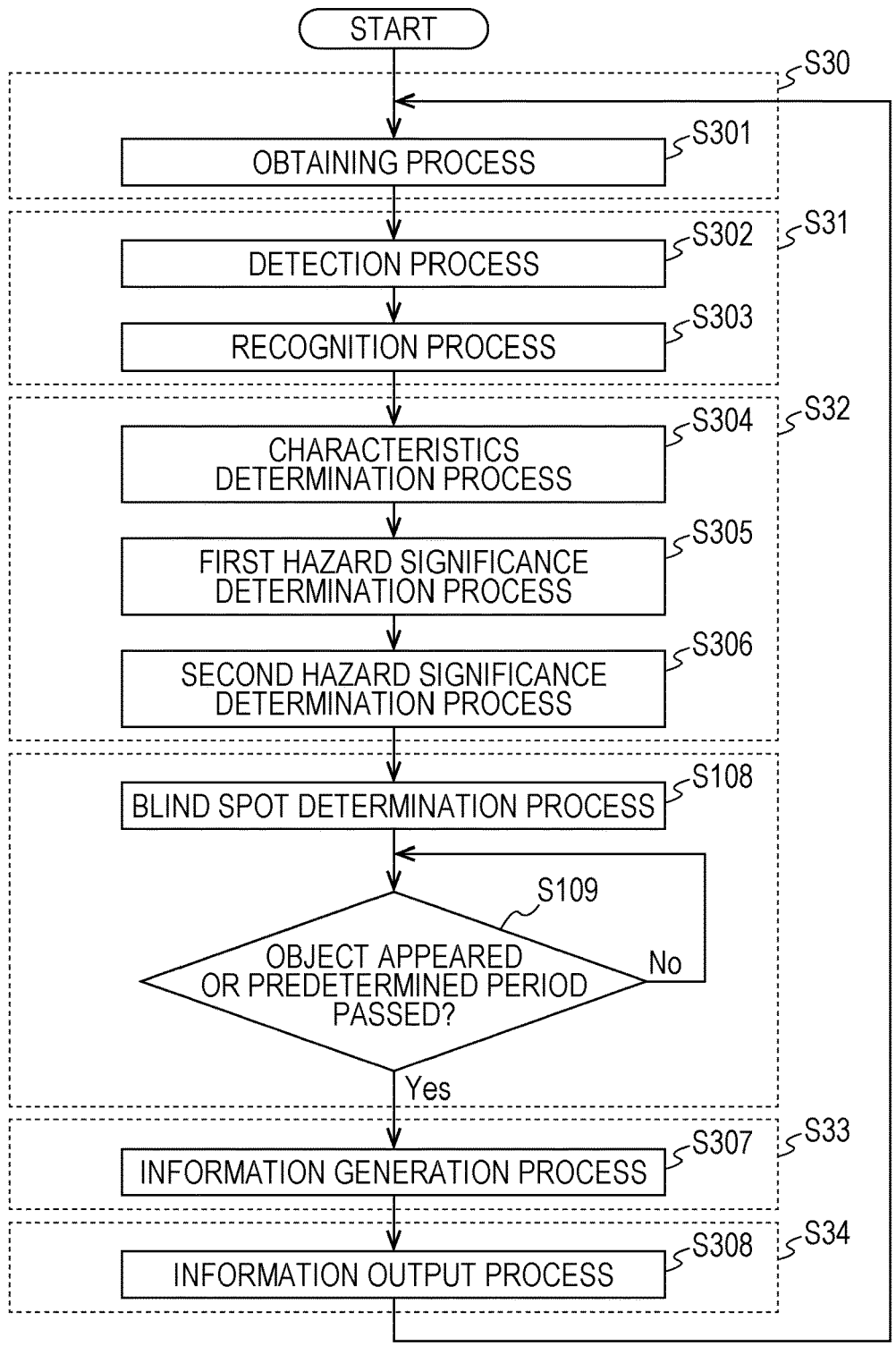
FIG. 59 is a flowchart illustrating details of the information processing method performed by the system in accordance with the third embodiment.

An information processing method performed by the system 1B thus configured will be described next. FIG. 58 is a flowchart illustrating an outline of the information processing method performed by the system 1B in accordance with the third embodiment. FIG. 59 is a flowchart illustrating details of the information processing method performed by the system 1B in accordance with the third embodiment. In FIG. 59, steps that are the same or substantially the same as those of FIG. 19 are denoted by the same reference signs to omit a detailed description thereof.

As illustrated in FIG. 58, the system 1B first obtains map information or image information representing an image captured by an image capturing apparatus mounted in a vehicle (S30). Then, the system 1B detects a traffic mirror located near the vehicle on the basis of the map information or image information obtained in S30 (S31). Then, the system 1B determines characteristics of the installed place of the traffic mirror on the basis of the map information or the image information (S32). Then, the system 1B generates driving assist information on the basis of the characteristics determined in S32 (S33). Then, the system 1B outputs the driving assist information generated in S33 (S34).

More specifically, the system 1B first performs the process of S30 described in FIG. 58, as illustrated in FIG. 59. Specifically, in the process of S30, the system 1B performs an obtaining process to obtain map information or image information representing an image captured by an image capturing apparatus mounted in the vehicle (S301).

Then, the system 1B performs the process of S31 described in FIG. 58. More specifically, in the process of S31, the system 1B performs a detection process to detect a traffic mirror located near the vehicle on the basis of the map information or image information obtained in S301 (S302). The system 1B also performs a recognition process to recognize an object in the traffic mirror on the basis of the image information obtained in S301 (S303).

Then, the system 1B performs the process of S32 described in FIG. 58. More specifically, in the process of S32, the system 1B performs a characteristics determination process to determine characteristics of the installed place of the traffic mirror on the basis of the map information or the image information (S304). Then, the system 1B performs a first hazard significance determination process to determine the first significance of a potential hazard, which indicates the likelihood of a traffic accident involving the vehicle of interest occurring, on the basis of information regarding the characteristics of the installed place of the traffic mirror (S305). Then, the system 1B performs a second hazard significance determination process to determine the second significance of a potential hazard, which is the significance of a potential hazard predicted if the vehicle of interest starts traveling, on the basis of whether there is an object reflected in the traffic mirror and the first significance of a potential hazard determined in S305 (S306). Since details of the processes performed in S304 to S306 are as described above, a detailed description thereof is omitted.

In addition, in the process of S33, the system 1B performs an information generation process to generate driving assist information in accordance with the second significance of a potential hazard determined in S306 (S307). Since details of the process performed in S307 is as described above, a description thereof is omitted.

Then, the system 1B performs the process of S34 described in FIG. 57. More specifically, in S34, the system 1B performs an information output process to output the driving assist information or the like generated in S307 (S308).

Advantageous Effects of Third Embodiment

As described above, the information processing apparatus 10B or the system 1B according to the third embodiment is able to determine, by using a traffic mirror, the significance of a potential hazard (i.e., the second significance of a potential hazard) predicted if the vehicle starts traveling at places, such as an entrance/exit of a parking lot or a commercial facility in addition to an intersection, where the view from the vehicle is obstructed or restricted. The information processing apparatus 10B or the system 1B according to the third embodiment is also able to generate and output driving assist information for the vehicle on the basis of the determined second significance of a potential hazard. Consequently, the information processing apparatus 10 or the system 1A according to the third embodiment is able to assist safe driving of the vehicle having the information processing apparatus 10A or the system 1A mounted therein.

Specifically, if characteristics of the installed place of a traffic mirror indicate, that is, the installed place of the traffic mirror is a place where the view from the vehicle is obstructed or restricted and a traffic accident is likely to occur, such as an intersection, an entrance/exit of a parking lot or a commercial facility, or an area near an exit of a limited-access road, a traffic accident involving the vehicle of interest may occur. That is, if the vehicle located at or near such a place starts traveling, a traffic accident involving the vehicle may occur. Further, in the case where the installed place of the traffic mirror is a place where the view from the vehicle is obstructed or restricted and a traffic accident is likely to occur, the likelihood of a traffic accident involving the vehicle occurring increases if an object is in the traffic mirror.

Accordingly, in the third embodiment, the second significance of a potential hazard, which is the significance of a potential hazard predicted if the vehicle starts traveling, is determined on the basis of the characteristics of the installed place of the traffic mirror contained in an image obtained from the vehicle that is temporarily stationary or is traveling and the presence or absence of an object reflected in the traffic mirror.

In this way, the information processing apparatus 10B according to the third embodiment is able to determine, by using a traffic mirror, the second significance of a potential hazard, which is the significance of a potential hazard predicted if the vehicle travels.

As described above, the second significance of a potential hazard, which is the significance of a potential hazard predicted if the vehicle travels, may be determined only from the characteristics of the installed place of the traffic mirror contained in an image that can be obtained from the vehicle that is temporarily stationary or is traveling.

In addition, in the case where a vehicle in which automated driving is enabled includes the information processing apparatus 10B mounted therein, for example, the vehicle is able to determine the second significance of a potential hazard by using a traffic mirror in a manner as described above. Thus, the vehicle is able to perform control in accordance with the determined second significance of a potential hazard.

As described above, the information processing apparatus 10B or the system 1B according to the third embodiment is able to assist safe driving of a vehicle by using a traffic mirror at a place where the view from the vehicle is obstructed or restricted.

First Modification

In the third embodiment, the description has been given of the case where the second significance of a potential hazard, which is the significance of a potential hazard predicted if the vehicle travels, is determined on the basis of the characteristics of the installed place of a traffic mirror and the presence or absence of an object reflected in the traffic mirror; however, the criteria used in the determination are not limited to these ones. The recognizing unit 13B may recognize an attribute of an object reflected in a traffic mirror, and the determining unit 104 may determine the significance of a potential hazard by taking into account the attribute. In a first modification, a description will be given of the case where the significance of a potential hazard is determined by further taking into account an attribute regarding the moving speed of an object reflected in a traffic mirror.

FIG. 60 is an explanatory diagram illustrating an example of the second hazard significance determination process performed by the second hazard significance determining unit 1043 in accordance with the first modification of the third embodiment. In FIG. 60, content that is the same or substantially the same as that illustrated in FIGS. 56 and 57 is denoted by the same expression to omit a detailed description thereof. In addition, since vehicle control information based on the low, intermediate, or high second significance of a potential hazard is the same as that illustrated in FIG. 56 or 57, an illustration thereof is omitted in FIG. 60.

As illustrated in FIG. 60, in the case where an object is a person, the second hazard significance determining unit 1043 may determine the second significance of a potential hazard in the same or substantially the same manner as in the case illustrated in FIGS. 56 and 57. On the other hand, in the case where the object is a bicycle, a motor cycle, or an automobile having a higher moving speed than a person, the second hazard significance determining unit 1043 may determine a higher second significance of a potential hazard than in the case where the object is a person in accordance with the moving speed.

As described above, in the first modification, the second hazard significance determining unit 1043 determines the second significance of a potential hazard that changes depending on an attribute of an object recognized by the recognizing unit 13B. As a result, the output processing unit 102B is able to generate driving assist information in accordance with the attribute of the object recognized by the recognizing unit 13B and output the generated driving assist information.

Second Modification

In the first modification, the description has been given of the case where the second significance of a potential hazard is determined by further taking into account an attribute regarding the moving speed of an object reflected in a traffic mirror; however, the attribute used in the determination is not limited to the attribute regarding the moving speed. In the case where an object reflected in a traffic mirror is a person, the second significance of a potential hazard may be determined by further taking into an attribute regarding the age of the person. This case will be described below as a second modification.

FIG. 61 is an explanatory diagram illustrating an example of a second hazard significance determination process performed by the second hazard significance determining unit 1043 in accordance with the second modification of the third embodiment. In FIG. 61, content that is the same or substantially the same as that illustrated in FIGS. 56 and 57 is denoted by the same expression to omit a detailed description thereof. Since vehicle control information based on the low, intermediate, or high second significance of a potential hazard is the same or substantially the same as that illustrated in FIG. 56 or 57, an illustration thereof is omitted in FIG. 61.

As illustrated in FIG. 61, if an object is a person and the person is a child or an elderly person, the second hazard significance determining unit 1043 may determine the second significance of a potential hazard in the same or substantially same manner as in FIGS. 56 and 57. On the other hand, if the object is a person and the person is neither a child nor an elderly person, the second hazard significance determining unit 1043 may determine a higher second significance of a potential hazard than in the case where the person is a child or an elderly person.

As described above, in the second modification, if an object recognized by the recognizing unit 13B is a person, the second hazard significance determining unit 1043 determines the second significance of a potential hazard that changes depending on the age of the object recognized by the recognizing unit 13B. As a result, if the attribute of the object recognized by the recognizing unit 13B indicates a person, the output processing unit 102B is able to generate driving assist information that changes depending on the age of the object recognized by the recognizing unit 13 and output the generated driving assist information. The example where the information regarding the age represents a generation of the person has been described above; however, the information regarding the age may represent the age or the age range of the person.

Third Modification

In the second modification, the description has been given of the case where, if an object reflected in a traffic mirror is a person, the second significance of a potential hazard is determined by further taking into account an attribute regarding the age of the person; however, the attribute used in the determination is not limited to the attribute regarding the age. In the case where an object reflected in a traffic mirror is a person, the second hazard significance determining unit 1043 may determine the second significance of a potential hazard by further taking into account an attribute regarding whether or not the person is behaving carelessly. Specifically, a careless behavior indicates a behavior without looking ahead. Examples of a behavior without looking ahead include looking at a mobile terminal, such as a smartphone, or a book while moving. This case will be described below as a third modification.

FIG. 62 is an explanatory diagram illustrating an example of a second hazard significance determination process performed by the second hazard significance determining unit 1043 in accordance with the third modification of the third embodiment. In FIG. 62, content that is the same as or substantially the same as that illustrated in FIGS. 56 and 57 is denoted by the same expression to omit a detailed description thereof. In addition, since vehicle control information based on the low, intermediate, or high second significance of a potential hazard is the same or substantially the same as that illustrated in FIG. 56 or 57, an illustration thereof is omitted in FIG. 62.

As illustrated in FIG. 62, if an object is a person and the person does not take a behavior without looking ahead, which involves the person looking at a mobile terminal while moving, that is, the person is not looking at a mobile terminal while walking, the second hazard significance determining unit 1043 may determine the second significance of a potential hazard in the same manner as that in FIGS. 56 and 57. On the other hand, if the object is a person and the person is taking a behavior without looking ahead, that is, the person is looking at a mobile terminal while walking, the second hazard significance determining unit 1043 may determine a higher second significance of a potential hazard than in the case where the person is not taking a behavior without looking ahead. The example where the careless behavior is a behavior without looking ahead has been described above; however, the careless behavior may indicate a behavior such as the person looking ahead but looking above or below while moving or the person looking at a specific object, such as a baby buggy or a ball, located in front of the person while moving.

As described above, in the third modification, in the case where an attribute of an object recognized by the recognizing unit 13B indicates a person, the second hazard significance determining unit 1043 determines the second significance of a potential hazard that changes depending on whether the object recognized by the recognizing unit 13B is behaving carelessly. As a result, in the case where the attribute of the object recognized by the recognizing unit 13B indicates a person, the output processing unit 102B is able to generate and output driving assist information that changes depending on whether the object recognized by the recognizing unit 13B is behaving carelessly.

As described above, the information processing apparatuses, the information processing methods, and the like according to the embodiments of the present disclosure successfully assist the safe driving of a vehicle by using a traffic mirror installed at a place such as an intersection where the view from the vehicle is obstructed or restricted. Traffic mirrors may be not installed everywhere in some of counties other than Japan; however, some kinds of equipment for preventing traffic accidents may be installed in the future at places where the view from the vehicle is obstructed or restricted to prevent traffic accidents. The use of the information processing apparatuses and the like according to the embodiments of the present disclosure can eliminate the necessity of installing costly equipment (radars, for example) and can increase transportation safety by using traffic mirrors which are less costly.

The description has been given using traffic mirrors having a circular or quadrangular shape in the embodiments above; however, the shapes of the traffic mirrors are not limited to these shapes. The scope of the present disclosure includes the case where the shape of the installed traffic mirror has deformed somehow and the mirror consequently has an uneven surface or the case where the surface of the traffic mirror is fogged. In such a case, the reliability may be introduced for recognition of an object reflected in a traffic mirror. If the reliability is lower than or equal to a threshold, it may be determined that information regarding an object reflected in the traffic mirror is unreliable, and the information processing methods according to the embodiments of the present disclosure may be unused.

While the information processing apparatuses, the information processing methods, and the like according to the present disclosure have been described above on the basis of the embodiments, the present disclosure is not limited to these embodiments. Embodiments obtained by making various modifications conceivable by a person skilled in the art and embodiments obtained by combining elements of different embodiments together may be within the scope of one or a plurality of aspects of the present disclosure as long as such embodiments do not depart from the essence of the present disclosure. For example, the following cases are included in the present disclosure.

(1) Each of the apparatuses described above is specifically a computer system including a microprocessor, a read-only memory (ROM), a random access memory (RAM), a hard disk unit, a display unit, a keyboard, a mouse, etc. The RAM or the hard disk unit stores a computer program. The microprocessor operates in accordance with the computer program, and consequently the apparatus implements functions thereof. The computer program is constituted by a combination of a plurality of instruction codes representing commands to the computer system in order to implement predetermined functions.

(2) Some or all of components of each of the apparatuses described above may be configured as a single system large scale integration (LSI) chip. A system LSI chip is an advanced multi-function LSI chip fabricated by integrating multiple components onto a single chip, and specifically is a computer system including a microprocessor, a ROM, a RAM, etc. The RAM stores a computer program. The microprocessor operates in accordance with the computer program, and consequently the system LSI chip implements functions thereof.

(3) Some or all of the components of each of the apparatuses described above may also be configured as an IC card or a separate module that may be removably inserted into each apparatus. The IC card or module is a computer system including a microprocessor, a ROM, a RAM, etc. The IC card or module may also include the aforementioned advanced multi-function LSI. The microprocessor operates in accordance with a computer program, and consequently the IC card or module implements functions thereof. The IC card or the module may also be tamper-resistant.

(4) The present disclosure may be regarded as the methods described above. In addition, these methods may be regarded as computer programs that implement the methods by using a computer, or a digital signal representing the computer program.

(5) In addition, the present disclosure may also be realized by storing the computer program or the digital signal onto a computer-readable recording medium, such as a flexible disk, a hard disk, a Compact Disc-Read Only Memory (CD-ROM), an MO, a Digital Versatile Disc (DVD), a DVD-ROM, a DVD-RAM, a Blu-ray (registered trademark) Disc (BD), or a semiconductor memory, for example. In addition, the present disclosure may also be regarded as the digital signal stored on these recording media.

(6) In addition, the present disclosure may also be realized by transmitting the computer program or the digital signal over an electrical communication network, a wired or wireless communication network, a network such as the Internet, data broadcasting, or the like.

(7) In addition, the present disclosure may also be realized by a computer system including a microprocessor and a memory. The memory stores the computer program, and the microprocessor operates in accordance with the computer program.

(8) In addition, the present disclosure may also be carried out by another independent computer system by storing and transporting a program or a digital signal on a recording medium, or transporting the program or the digital signal over a network or the like.

The embodiments of the present disclosure can be used in systems of onboard cameras that are mounted in vehicles for automated driving, Controller Area Network (CAN), and the like and in information processing apparatuses or systems for assisting driving.

What is claimed is:

1. An apparatus comprising:
   a processor; and
   a memory storing thereon a computer program, which when executed by the processor, causes the processor to perform operations including:
   detecting a traffic mirror and an object in the traffic mirror by using an image which is captured by an image capturing apparatus mounted in a vehicle;
   calculating a difference between a size of the traffic mirror in the image and a predetermined reference size;
   normalizing a size of the object in the image by using the difference;
   generating driving assist information for the vehicle by using the normalized size of the object; and
   outputting the driving assist information.

2. The apparatus according to claim 1, wherein the difference includes a scaling ratio of the traffic mirror in the image relative to the predetermined reference size.

3. The apparatus according to claim 2, wherein the size of the object is normalized by enlarging or reducing the object in the traffic mirror by using the scaling ratio.

4. The apparatus according to claim 3, wherein the driving assist information is generated in accordance with change information regarding a change in the normalized size of the object in at least two consecutive time-series images.

5. The apparatus according to claim 4, wherein if the change information indicates an increase in the normalized size of the object, the driving assist information includes at least one of information for causing the vehicle to decelerate and information for causing the vehicle to move in a direction to be away from the object.

6. The apparatus according to claim 4, wherein if the change information indicates an increase in the normalized size of the object, the driving assist information includes information for causing the vehicle to start traveling after the object moves away from the vehicle.

7. The apparatus according to claim 4, wherein the driving assist information is generated in accordance with a potential hazard predicted, from the change information, if the vehicle travels in a direction to be closer to the traffic mirror.

8. The apparatus according to claim 1, wherein in the generating, the driving assist information for the vehicle is generated by using a state of the vehicle in addition to the normalized size of the object.

9. The apparatus according to claim 1, wherein the driving assist information is generated in accordance with the normalized size of the object.

10. The apparatus according to claim 1, wherein the driving assist information includes control command information regarding a behavior of the vehicle.

11. The apparatus according to claim 1, wherein the driving assist information includes indication information to be provided to an occupant of the vehicle.

12. The apparatus according to claim 1, the operations further including:
    recognizing an attribute of the object in the traffic mirror, wherein in the generating, the driving assist information is generated in accordance with the attribute of the object.

13. The apparatus according to claim 12, wherein in the outputting, if the attribute of the object indicates a person, the driving assist information that changes depending on information regarding an age of the object is output.

14. The apparatus according to claim 12, wherein in the generating, if the attribute of the object indicates a person, the driving assist information is generated depending on whether the object is behaving carelessly.

15. The apparatus according to claim 1, wherein in the generating, the driving assist information is generated if the object detected in at least one image among a plurality of consecutive time-series images is not detected in an image subsequent to the at least one image in time series.

16. The apparatus according to claim 15, wherein in the generating, the driving assist information is generated if the object is detected in different sizes in at least two consecutive time-series images among the plurality of consecutive time-series images and the object is not detected in an image subsequent to the at least two consecutive time-series images in time series.

17. A method comprising:
    detecting a traffic mirror and an object in the traffic mirror by using an image which is captured by an image capturing apparatus mounted in a vehicle;
    calculating a difference between a size of the traffic mirror in the image and a predetermined reference size;
    normalizing a size of the object in the image by using the difference;
    generating driving assist information for the vehicle by using the normalized size of the object; and
    outputting the driving assist information.

18. A non-transitory recording medium storing thereon a computer program, which when executed by a processor, causes the processor to perform operations including:
    detecting a traffic mirror and an object in the traffic mirror by using an image which is captured by an image capturing apparatus mounted in a vehicle;

calculating a difference between a size of the traffic mirror in the image and a predetermined reference size;
normalizing a size of the object in the image by using the difference;
generating driving assist information for the vehicle by using the normalized size of the object; and
outputting the driving assist information.

\* \* \* \* \*